United States Patent [19]

Lewis et al.

[11] Patent Number: 5,059,127

[45] Date of Patent: Oct. 22, 1991

[54] COMPUTERIZED MASTERY TESTING SYSTEM, A COMPUTER ADMINISTERED VARIABLE LENGTH SEQUENTIAL TESTING SYSTEM FOR MAKING PASS/FAIL DECISIONS

[75] Inventors: Charles Lewis, Montgomery County, Somerset County; Kathleen M. Sheehan, Lambertville; Richard N. DeVore, Stockton; Leonard C. Swanson, Hopewell, all of N.J.

[73] Assignee: Educational Testing Service, Princeton, N.J.

[21] Appl. No.: 428,383

[22] Filed: Oct. 26, 1989

[51] Int. Cl.$^5$ ............................................... G09B 7/00
[52] U.S. Cl. .................................... 434/353; 434/236; 434/322; 434/362; 364/419
[58] Field of Search ............... 434/118, 322, 327, 335, 434/353, 362, 236; 364/419, 200, 900 MS File

[56] References Cited

U.S. PATENT DOCUMENTS 4,895,518  1/1990  Arnold et al. ........................ 434/118
4,996,642  2/1991  Hey .................................. 434/236 X Primary Examiner—Richard J. Apley
Assistant Examiner—Joe H. Cheng
Attorney, Agent, or Firm—White & Case

[57] ABSTRACT

A computerized mastery testing system providing for the computerized implementation of sequential testing in order to reduce test length without sacrificing mastery classification accuracy. The mastery testing system is based on Item Response Theory and Bayesian Decision Theory which are used to qualify collections of test items, administered as a unit, and determine the decision rules regarding examinee's responses thereto. The test item units are randomly and sequentially presented to the examinee by a computer test administrator. The administrator periodically determines, based on previous responses, whether the examinee may be classified as a nonmaster or master or whether more responses are necessary. If more responses are necessary it will present as many additional test item units as required for classification. The method provides for determining the test specifications, creating an item pool, obtaining IRT statistics for each item, determining ability values, assembling items into testlets, verifying the testlets, selecting loss functions and prior probability of mastery, estimating cutscores, packaging the test for administration, randomly and sequentially administering testlets to the examinee until a pass/fail decision can be made.

25 Claims, 9 Drawing Sheets

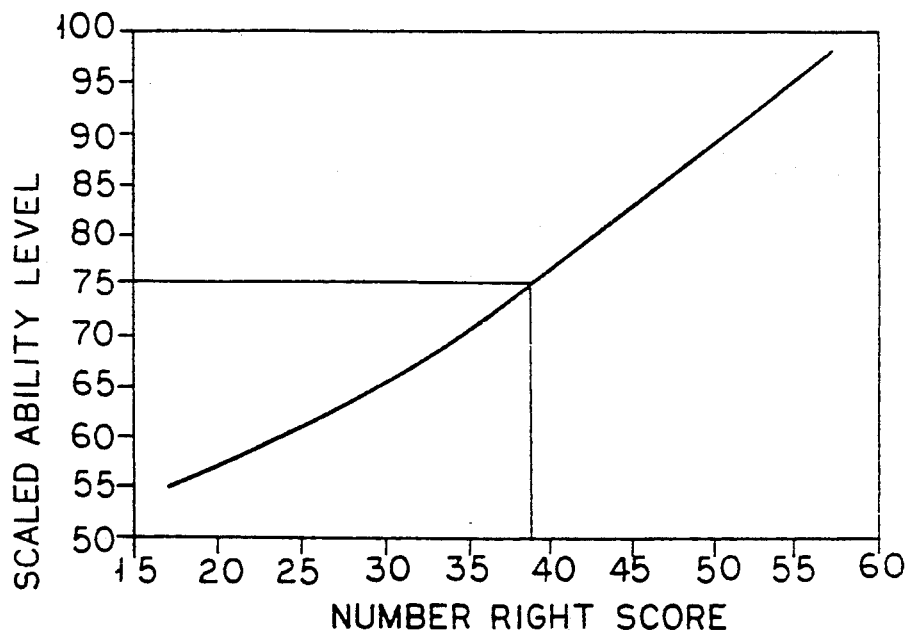
FIG. 1A  AN EQUATING FUNCTION
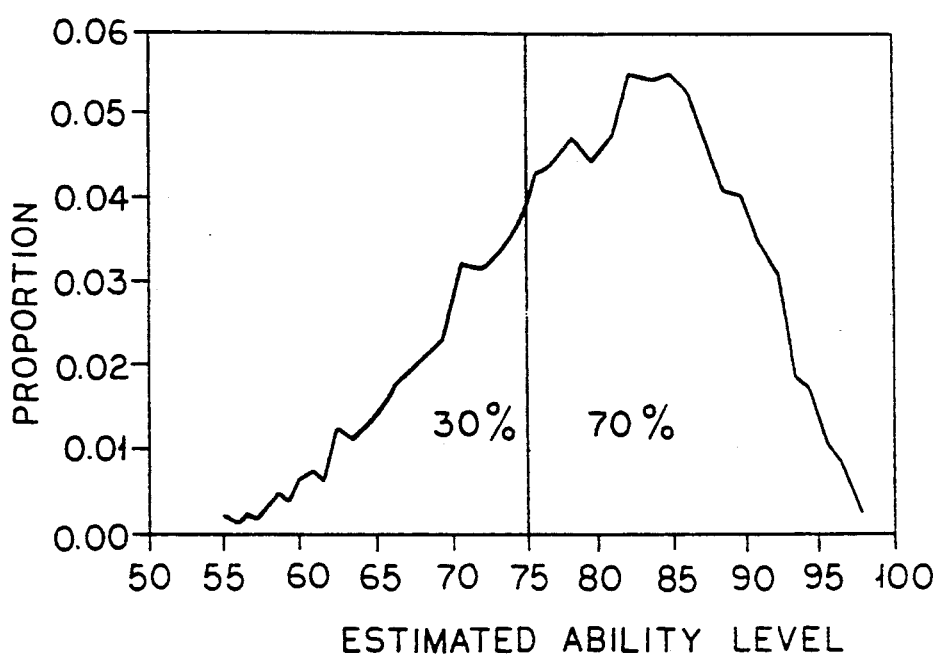
FIG. 1B  AN EMPIRICAL ABILITY DISTRIBUTION

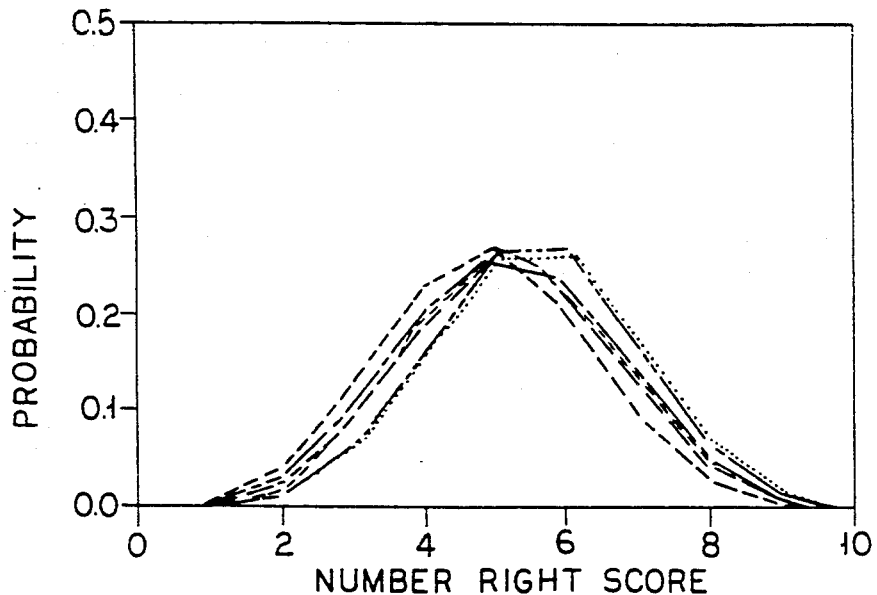
FIG. 2A
DISTRIBUTION OF NUMBER RIGHT SCORES FOR A NONMASTER AT ABILITY LEVEL OF 69
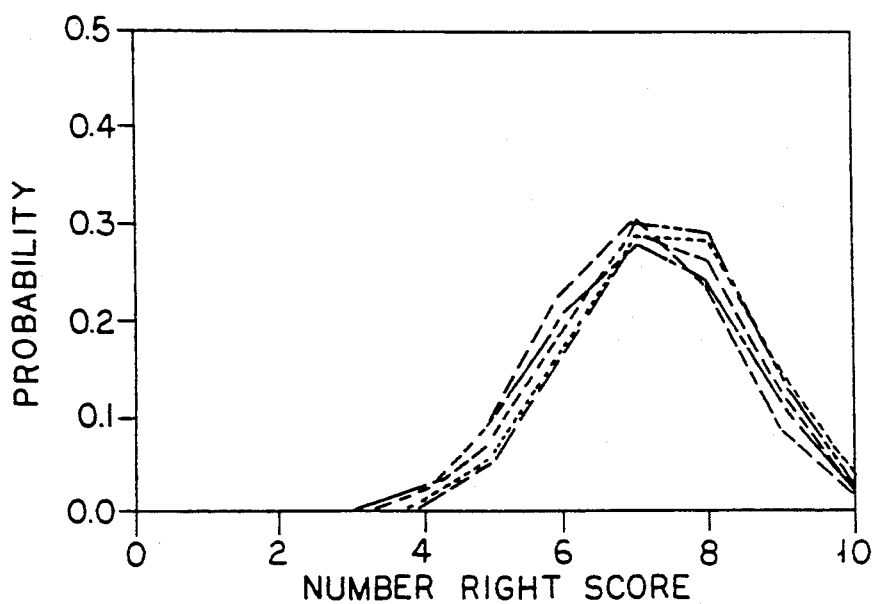
FIG. 2B  DISTRIBUTION OF NUMBER RIGHT SCORES FOR A MASTER AT ABILITY LEVEL OF 81

▧ FAIL   ▩ CONTINUE   ▨ PASS

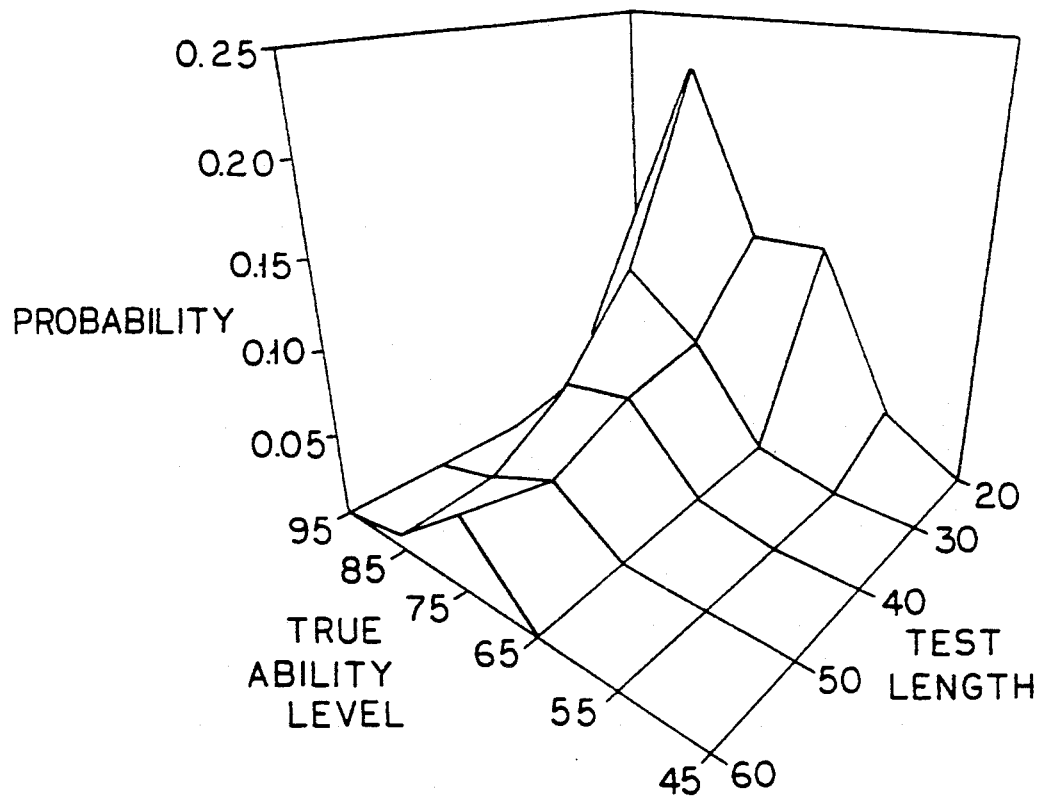
FIG. 4 BIVARIATE DISTRIBUTION OF ABILITY AND TEST LENGTH FOR A VARIABLE LENGTH CMT WITH A 40/20/1 DECISION RULE

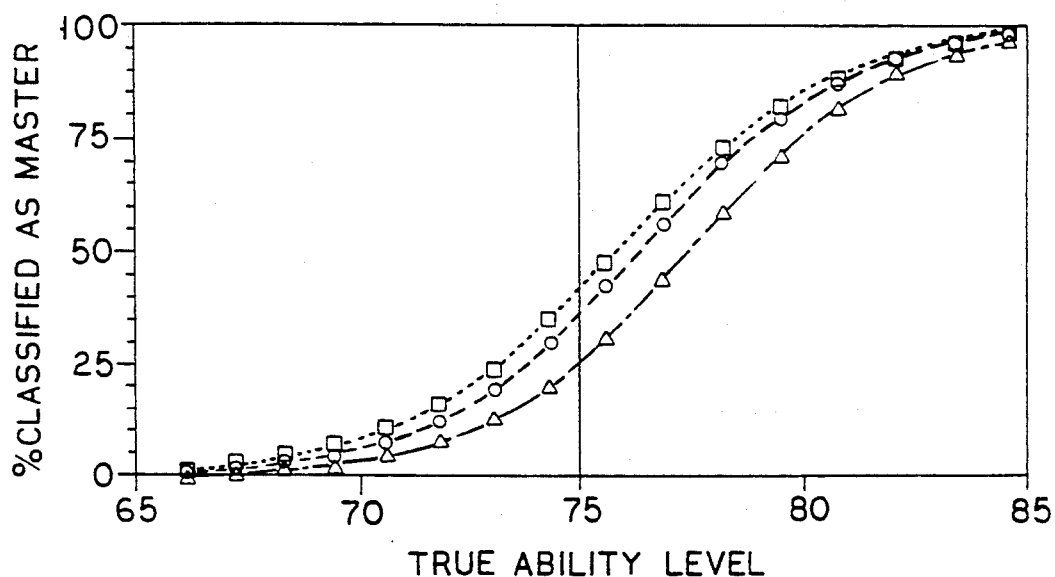
FIG.5A  A VARIABLE LENGTH TEST
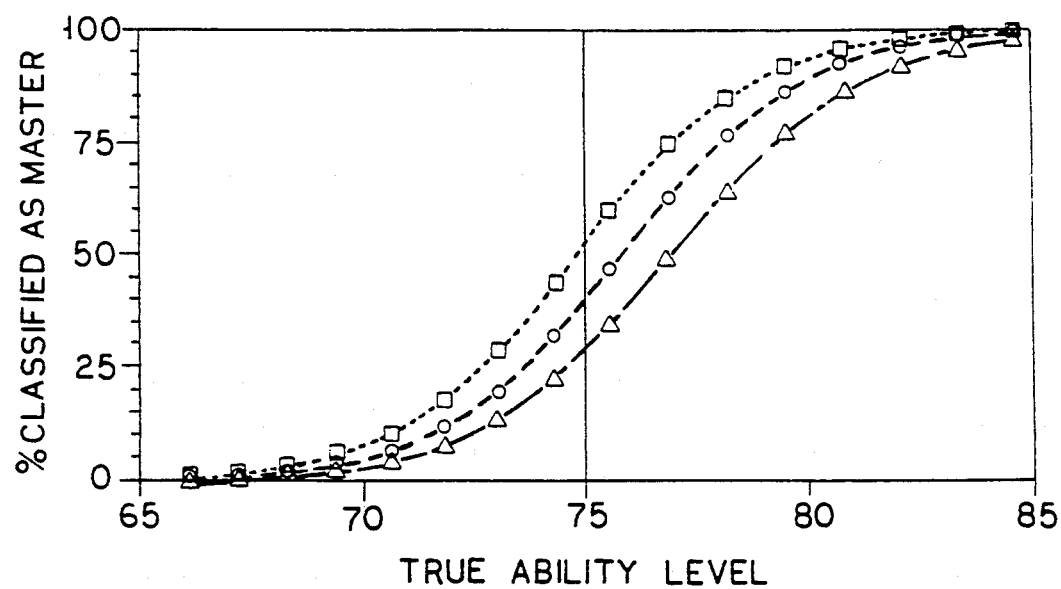
FIG.5B   A FIXED LENGTH TEST
□ 20/20/1     ○ 40/20/1     △ 100/20/1

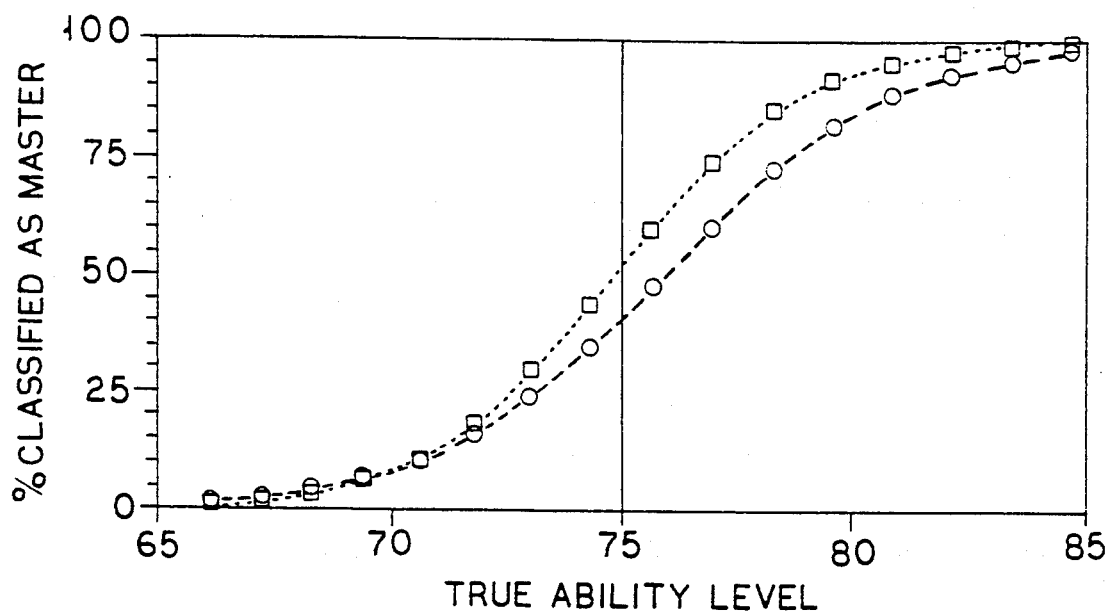
FIG. 6A THE 20/20/1 DECISION RULE
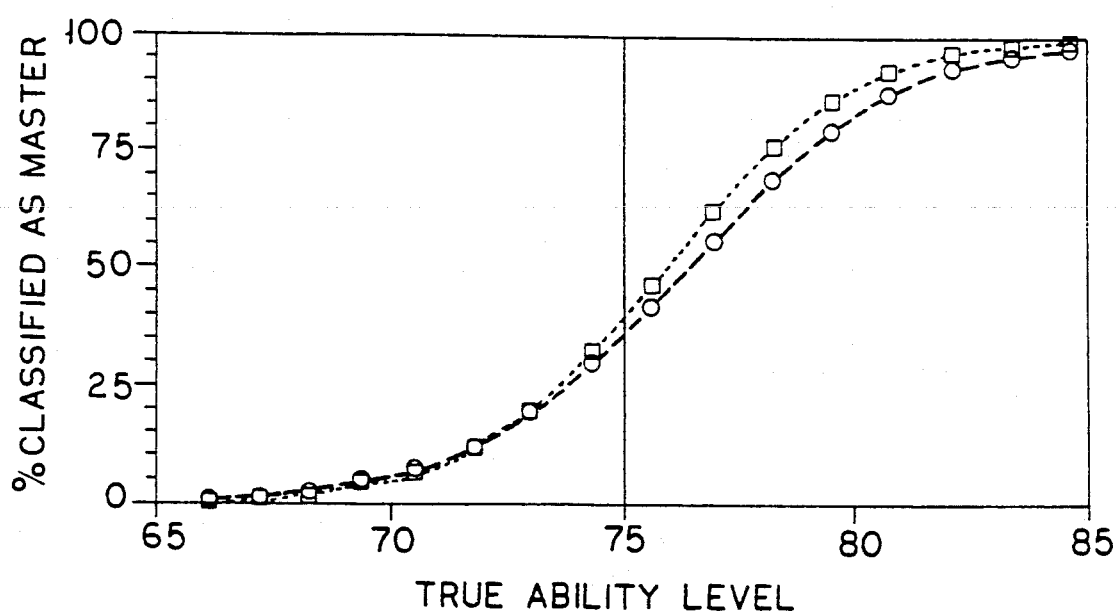
FIG. 6B THE 40/20/1 DECISION RULE
□ FIXED LENGTH
○ VARIABLE LENGTH

COMPUTERIZED MASTERY TESTING SYSTEM, A COMPUTER ADMINISTERED VARIABLE LENGTH SEQUENTIAL TESTING SYSTEM FOR MAKING PASS/FAIL DECISIONS A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

1. Field of the Invention

Testing of individuals is carried out for a wide variety of purposes. One of these purposes is achieved through mastery testing. Mastery testing is used in educational and certification contexts to decide, on the basis of test performance, whether or not an individual has attained a specified level of knowledge, or mastery, of a given subject.

2. Description of the Prior Art

A central problem in designing a mastery test is that of maximizing the probability of making a correct mastery decision while simultaneously minimizing test length. A similar problem is frequently encountered in the field of quality control: acceptance sampling plans must be designed to maximize the probability of correctly classifying the quality of a lot of manufactured material while simultaneously minimizing the number of items inspected. The solution to the acceptance sampling problem which was proposed by Wald in 1947, called the sequential probability ratio test, exploited the fact that a lot of very poor quality can be expected to reveal its character in a very small sample whereas lots of medium quality will always require more extensive testing. This may be done by testing one randomly selected unit at a time while allowing for the possibility of a decision on the quality of the lot as a whole after each drawing.

In an early application of the sequential testing approach to the mastery testing problem, disclosed in Ferguson (1969a, b) (full citations for this and other references are given in the reference section below), a sequential mastery test was designed which treated examinees' responses to items as a sequence of independent Bernoulli trials. This design requires a pool of calibrated items which can be sampled randomly. The test is conducted by presenting items to examinees, one at a time. After each item has been presented, a decision is made either to classify the examinee (as a master or a nonmaster) or to present another item. Ferguson also specified a maximum test length for those individuals for whom the mastery classification is very difficult to make. A major advantage of this approach is that it allows for shorter tests for individuals who have clearly mastered (or clearly not mastered) the subject matter, and longer tests for those for whom the mastery decision is not as clear-cut. A limitation is that, in order to maintain efficiency, the item pool must be restricted to equivalent items.

An alternative mastery testing procedure has been proposed by Lord (1980) and implemented at Educational Testing Service by Martha L. Stocking. In this alternative approach, all examinees receive the same fixed-length test, but the test is designed, constructed and scored using methods derived from Item Response Theory ("IRT"). An optimal test length is determined by specifying a maximum value for the length of the asymptotic confidence interval for estimating ability from test score in the region of the cutscore. This approach places no restrictions on the variability of items in the pool but it does require that all examinees take the same fixed-length test.

Wainer (1983) discloses IRT and computerized adaptive testing. IRT is a family of related models, differing somewhat in their assumptions, that express the relationship between an individual's ability (or skill or knowledge) and the probability that the individual will be able to answer a given test question or item correctly. Some models differ in their assumptions regarding the number of characteristics that are to be used to describe a test question. One popular IRT model, the Rasch model, assumes that items differ in a single characteristic, their difficulty. Another, the three-parameter model, which is used in a preferred embodiment of the present invention, considers variation in three characteristics—difficulty, the sharpness with which the question differentiates between high and low ability examinees, and the probability that an examinee with very low ability can answer the question correctly (roughly, the probability of guessing the answer).

IRT describes measurement characteristics of test items, including difficulty and accuracy of measurement, in a way that is independent of the particular sample tested and of the other questions administered. It is this independence that allows creation of a test in which different individuals receive different questions, yet can be scored on a common scale. Similarly, this independence permits determination in advance of test administration of the level of ability and the accuracy with which ability has been measured, represented by the individual's performance on a set of test questions. Knowing the IRT characteristics of the questions in a test and which of these an individual answered correctly, a score representing the individual's ability may be derived in a nonarbitrary manner.

The present invention is a new method of mastery testing which uses IRT and a sequential testing approach to provide a test with an adaptive stopping rule. While several others have also proposed IRT-based sequential testing procedures including Kingsbury and Weiss (1983), Reckase (1983) and Frick (1986) they did not disclose or suggest a computerized mastery testing system or important features thereof. At least one, Reckase (1983), seemed to suggest that a item-at-a-time sequential testing procedure based on an IRT model was so involved as to make any testing procedure based on it, for practical purposes, impossible.

The present invention differs from those presented previously in that, inter alia, the sequential testing process operates on ordered collections of items, called testlets, rather than individual items, the relationship between observed test performance and true mastery status is modeled using IRT, and the decision rule is determined using Bayesian decision theory. The inventors call the present invention a Computerized Mastery Testing ("CMT") system, because it is designed to be administered and scored using personal computers or the equivalent.

The CMT system also solves some problems generally associated with mastery testing.

First, it provides greater control over item order and context effects, that is, effects which arise when the administration of a particular item has an effect on the difficulty of a subsequent item.

Second, it can be adapted for use in a mastery testing program requiring diagnostic feedback, by explicitly including the losses associated with alternative feedback strategies in the loss function specification.

Third, test security is an important consideration in any mastery testing program. The CMT system described herein enhances test security since not all candidates will receive the same combination of testlets (depending on the size of the testlet pool) and candidates who have clearly not mastered the subject matter of the test will receive shorter tests, and thus will be less likely to receive the same subset of testlets should they decide to retake the test at a later date.

Fourth, the record keeping burden associated with administering tests to repeat examinees is reduced because the system must only keep track of the identifications associate with the subset of testlets, for example, five or six testlets administered to each examinee, as opposed to the identifications of, possibly, hundreds of individual test items.

SUMMARY OF THE INVENTION

The present invention provides a framework for balancing the competing goals of classification accuracy and test efficiency. This system utilizes a computerized test delivery system and a model relating observed test performance to true mastery status. Although the described system was developed using an IRT model, alternative models may also prove useful.

The CMT system is used both to determine an optimal test length and to make an accurate pass/fail decision. CMT uses IRT in order to perform two functions. First, IRT provides specifications that guide selection of questions or items for inclusion in an examination, with a particular examination or a section or division of a particular examination represented by a series of sets of questions or items that are administered together ("testlets").

Testlets ar designed to meet both content specifications and specifications as to their measurement characteristics, including their difficulty and the accuracy of the measurement they provide. Equivalence of these characteristics from one testlet to another is important, since different individuals may receive different testlets. It is achieved in part through analysis of the IRT characteristics of test items considered for inclusion.

Second, IRT is used to derive the number of test items answered correctly (or incorrectly), given the total number attempted, that determine whether an individual has passed or failed the test (the "cutscore").

CMT begins with a determination of test specifications; content specifications as well as minimum and maximum test length determination. Then it is necessary to create an item pool. A practical rule of thumb is to have about two or three times as many test items as indicated by the maximum test length. Next, a software program such as the TESTFACT program (Wilson, Wood & Gibbons 1984), available through Scientific Software, Inc. of Mooresville, Ind., is used to assess the dimensionality of the test items. While the embodiment of the CMT System described herein utilizes unidimensional logistic item response models, multidimensional models may also be suitable. In the case of multidimensional models, the TESTFACT program would also be useful. Full-information factor analysis is generally used instead of the more common linear factor analytic models because it is compatible with the assumptions of IRT.

The TESTFACT program may be programmed to extract three factors for the test items. A determination should be made establishing the statistical significance of each factor to the test items. Actually, a more critical consideration is, are any factors, other than the first one, of practical significance. A factor is typically considered to be of practical significance if it explains much of the variability in examinee scores. An acceptable rule of thumb for determining the appropriateness of using a unidimensional model is that the ratio of the variance explained by the first and second factors be large, and that the same ratio for the second and third be relatively small (preferably close to one).

Using calibration computer programs, such as LOGIST calibration program, available through Educational Testing Service of Princeton, N.J., or BILOG calibration program, distributed by Scientific Software, Inc. of Mooresville, Ind., IRT statistics for each test item are then obtained. IRT is a very powerful model for computerized tests in which different examinees may get different test items. The three-parameter logistic item response model statistics may be derived by the joint maximum likelihood estimation programs, such as LOGIST calibration program or by the marginal maximum likelihood programs, such as BILOG calibration program; LOGIST has been successfully used.

The three-parameter logistic model has two basic assumptions: (1) there is only a single latent trait underlying the scores on a test—unidimensionality; and (2) the relationship between the probability of responding correctly to a test item and underlying ability is described by a logistic curve with three parameters: "Item Difficulty" (b), "Item Discrimination" (â), and the probability of a correct response by an extremely low ability examinee the "Lower Asymptote" (c).

In one preferred embodiment of the present invention, LOGIST calibration program (Wingersky 1983) is used to derive statistics for the three-parameter logistic model. Item-ability regressions (Kingston & Dorans 1985) are analyzed to assess the assumption of three-parameter logistic form. Yen's $Q_1$ statistic may also be used for logistic form assessment. Both Item-Ability Regressions ("IAR") and Yen's $Q_1$ statistic are used to compare the probability of a correct response based on the IRT model with the observed proportion correct. Yen's $Q_1$ does this with a single summary statistic for each item. IAR does this graphically, so as to allow the user to pinpoint how the model does or does not fit the data. Test items whose IAR fit scores indicate a very poor fit to the IRT model should generally not be used with the present CMT system. However, CMT has demonstrated a certain robustness in being able to correctly determine mastery even when some of the test items are poorly fitting.

Next, a determination of the ability values, $\Theta_n$ and $\Theta_m$ must be made. Where, $\Theta_n$ is the highest ability level at which an examinee will be considered a nonmaster, and $\Theta_m$ is the lowest ability level at which an examinee will be considered a master. Expert judgments made for individual items are used to select values for $\Theta_n$ and $\Theta_m$. The test items are then assembled into testlets. For example, the average difficulty of the test items making up a testlet must be appropriate to differentiate examinees just above the cutscore from those just below it. Therefore, the IRT item difficulty measure (b) is among the characteristics employed in assembling testlets, and testlets are designed to have, as nearly as is possible, the same average value of this measure. LOTUS 1-2-3, a computer spreadsheet, distributed by Lotus Development Corporation of Cambridge, Mass., has been found useful in assembling the testlets. Generally, it is necessary to have one skilled in the subject being tested review the testlets for appropriate content and determine if any test items should be removed because they overlap unacceptably in content with or give away the correct answers to other test items. Moreover, content parallelism is established by classification by an expert or a committee of experts and then verified by expert reviewers.

Criteria are then established for the testlets. For example, one criterion is that all testlets are equivalent with respect to the likelihood of each possible number-right score at the two points $\Theta_n$ and $\Theta_m$. A second criterion is that all testlets have similar values of $\bar{b}$, $\bar{a}$ and $\bar{c}$, where $\bar{b}$ is the average b value, $\bar{a}$ is the average $\hat{a}$ value and $\bar{c}$ is the average c value. If a testlet does not meet the established criteria, then it may be broken up into test items and returned to the test item pool so the test items may be subsequently re-assembled in another testlet.

Next, the decision rule is determined and operating characteristics, such as expected error rates, average test length and pass rate are estimated. The operating characteristics are compared to minimum acceptable standards and classified as either acceptable or not acceptable. If not acceptable, new input parameters are selected, CMT cutscores are re-estimated and operating characteristics compared and classified.

If the operating characteristics are found to be acceptable, the CMT cutscores and the testlets are transferred to a computerized testing system administrator. The present invention has been implemented with the MICRODELTA ™ computer test administrator microcomputer testing system administrator of the Educational Testing Service. If need be the Microdelta ™ files may transferred to any remote testing center. The computer system administering the test serves at least four functions: each testlet to be presented is chosen randomly for each individual from those testlets not administered to that individual previously; the individual's answers to the test items are scored directly; the decision rules are applied at the end of each testlet testing based on the individual's score (with additional testlets presented if necessary); and the results of the test are stored for future reference.

One important feature of the present invention is that the examination may be administered in stages. According to one embodiment of the present invention, at each stage, an examinee's responses to the testlet(s) are evaluated in terms of test items answered correctly. After the second stage, examinees with very low or very high proportions of correct values are classified as nonmasters or masters, respectively, and examinees with intermediate proportions of correct values are required to respond to one or more additional testlets. Next, cutscores appropriate for the various stages must be determined. The CMT Cutscore Estimation Program developed by Educational Testing Service may be used to determine the proportion correct cutscores for making decisions at each stage of the sequential testlet testing. The computer software source code for a preferred embodiment of the CMT Cutscore Estimation Program appears in the Source Code Appendix hereto.

According to this embodiment, the theta metric cutscore separating nonmasters from masters remains the same at each stage. However, at intermediate stages of the examination, examinees' responses are evaluated with respect to an alternative set of proportion correct cutscores which are designed to fail only those whose responses indicate an extremely low level of knowledge and to pass only those whose responses indicate an extremely high level of knowledge. A significant aspect of this is the narrowing of the band between the proportion of correct answers needed to be classified a nonmaster and the proportion needed to be classified a master as the number of testlets administered increases.

The cutscore separating nonmasters from masters is determined using a three step procedure. First, an IRT calibration program, such as LOGIST calibration program, is used to define an IRT scale for the examination or section of the examination. The data used in this step comprise item responses collected in previous administrations of the items in the test item pool. Second, the previous examination proportion correct cutscore is translated into a cutscore on the IRT scale. Third, the cutscore on the IRT scale is translated into a set of proportion correct cutscores on the current examination. This last step is accomplished using Bayesian Decision Theory ("BDT").

Procedurally, the cutscore on the IRT scale is translated into a set of proportion correct cutscores on the current examination by minimizing the costs or "losses" associated with making an incorrect decision. The two types of incorrect decisions considered are: (i) passing an examinee whose true ability lies below the IRT cutscore (a false positive decision), and (ii) failing an examinee whose true ability lies above the IRT cutscore (a false negative decision). The relative values of these losses represent a policy decision by those seeking to offer the examination.

A sequential BDT procedure may be used to determine the intermediate cutscores, that is, the cutscores used to pass or fail an examinee at an intermediate stage of the test. In one preferred method, three costs or losses are considered at each stage of testing: the losses associated with making an incorrect decision (either a false positive decision or a false negative decision) and the cost of administering another testlet. Again, the relative value of the losses is a policy decision. Factors which may go into setting such values may comprise: which is more serious, a false positive or a false negative; and are incorrect decisions more costly than the lost time associated with administering a longer test. Given the loss function, and a set of testlets with known IRT characteristics, a unique set of intermediate cutscores which minimize the expected loss of the procedure can be calculated. Examination decision rules using intermediate cut scores reduce total testing time, since examinees are only administered additional testlets when the expected loss of continuing to test is less than the expected loss of classifying the individual as a master or a nonmaster.

Table 0 sets forth the decision rules for a hypothetical prototype test and gives the cutscores, in terms of proportion of correctly answered questions for the test.

TABLE 0

Proportion Correct Cutscores
Used With Hypothetical Prototype Test
Minimum Proportion of Correct Answers Needed

| After N questions | To continue testing | To be classified a master |
| --- | --- | --- |
| 20 | 0.60 | 0.85 |
| 30 | 0.63 | 0.77 |
| 40 | 0.63 | 0.73 |
| 50 | 0.64 | 0.70 |
| 60 | — | 0.67 |

For example, consider an individual who answers 16 of the first 20 questions contained in the first two testlets correctly. This is a proportion correct of 0.80, which is above the "continue testing" cutscore of 0.60 but just below the "master" cutscore 0.85 for scores based on 20 questions. Thus the individual would not be classified a master, but would go on to answer the next lo questions in the next testlet. Suppose that, after three testlets (30 questions), the individual has correctly answered 24 (8 of the last 10 correct). This is a proportion correct of 0.80, which is above the "master" cutscore for 30 questions, so the individual would be classified as a master without having to answer any additional testlets.

BRIEF DESCRIPTIONS OF THE DRAWINGS

FIG. 1A shows an equating function, plotting scaled ability level against number-right score, representing the results of a 60 item fixed-length paper and pencil type test of 4,280 examinees.

FIG. 1B shows an empirical ability distribution, plotting the proportion of total examinees at each estimated ability level, representing the results of a 60 item fixed-length paper and pencil type test of 4,280 examinees.

FIG. 2A shows a distribution of number-right scores for a nonmaster at an ability level of 69, plotting the probability of each possible number-right score, representing a comparision of theoretically derived distributions for six selected testlets.

FIG. 2B shows a distribution of number-right scores for a master at an ability level of 81, plotting the probability of each possible number-right score, representing a comparision of theoretically derived distributions for six selected testlets.

Figure 3A:
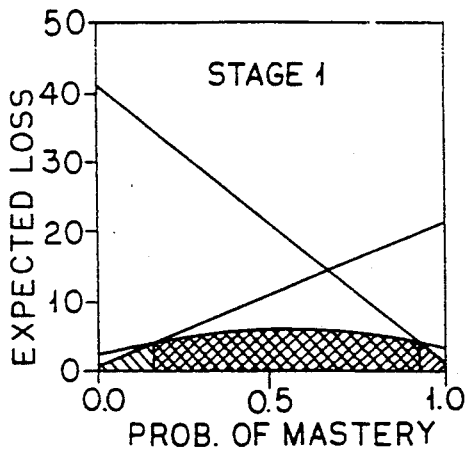
Figure 3B:
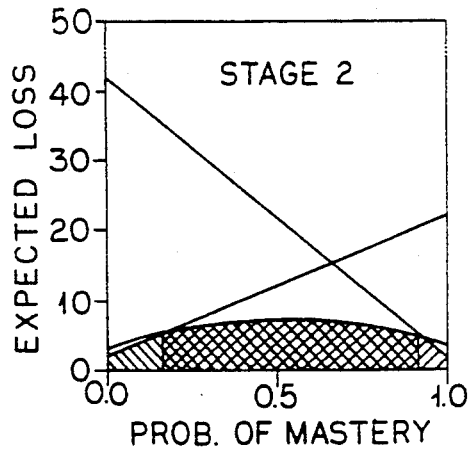
Figure 3C:
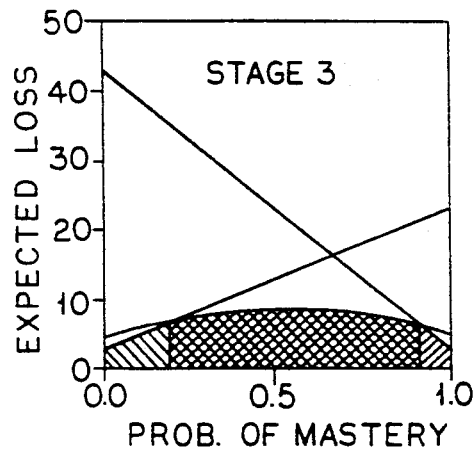
Figure 3D:
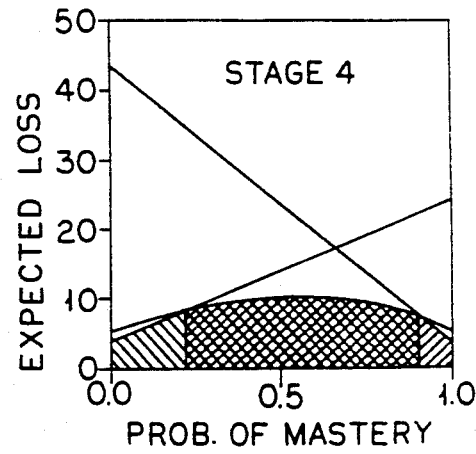
Figure 3E:
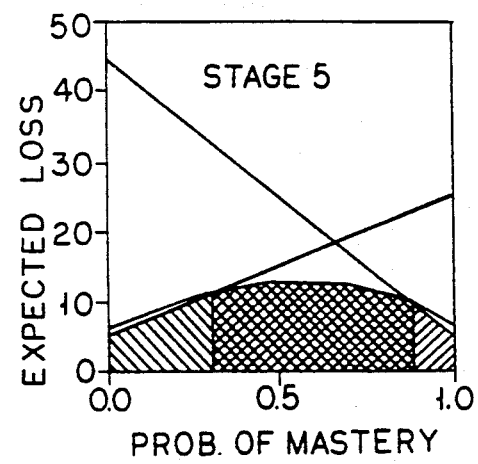
Figure 3F:
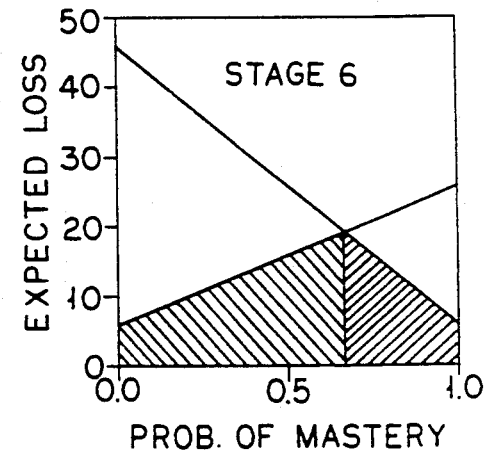

FIGS. 3A-3F show the expected posterior loss for the 40/20/1 decision rule, plotting expected loss against probability of mastery for each of six stages, with stage 1, stage 2, etc. shown by FIG. 3A, FIG. 3B, etc.

FIG. 4 shows a bivariate distribution of ability and test length for a variable length CMT with a 40/20/1 decision rule, plotting probability against true ability level and test length.

FIG. 5A shows a comparison of simulation results for three alternative decision rules (20/20/1, 40/20/1 and 100/20/1) applied to a variable length test and plotting per cent classified as master against true ability level.

FIG. 5B shows a comparison of simulation results for three alternative decision rules (20/20/1, 40/20/1 and 100/20/1) applied to a fixed-length test and plotting per cent classified as master against true ability level.

FIG. 6A shows a comparison of simulation results for two alternative test lengths (fixed and variable) applied to a 20/20/1 decision rule and plotting per cent classified as master against true ability level.

FIG. 6B shows a comparison of simulation results for two alternative test lengths (fixed and variable) applied to a 40/20/1 decision rule and plotting per cent classified as master against true ability level.

Figure 7:
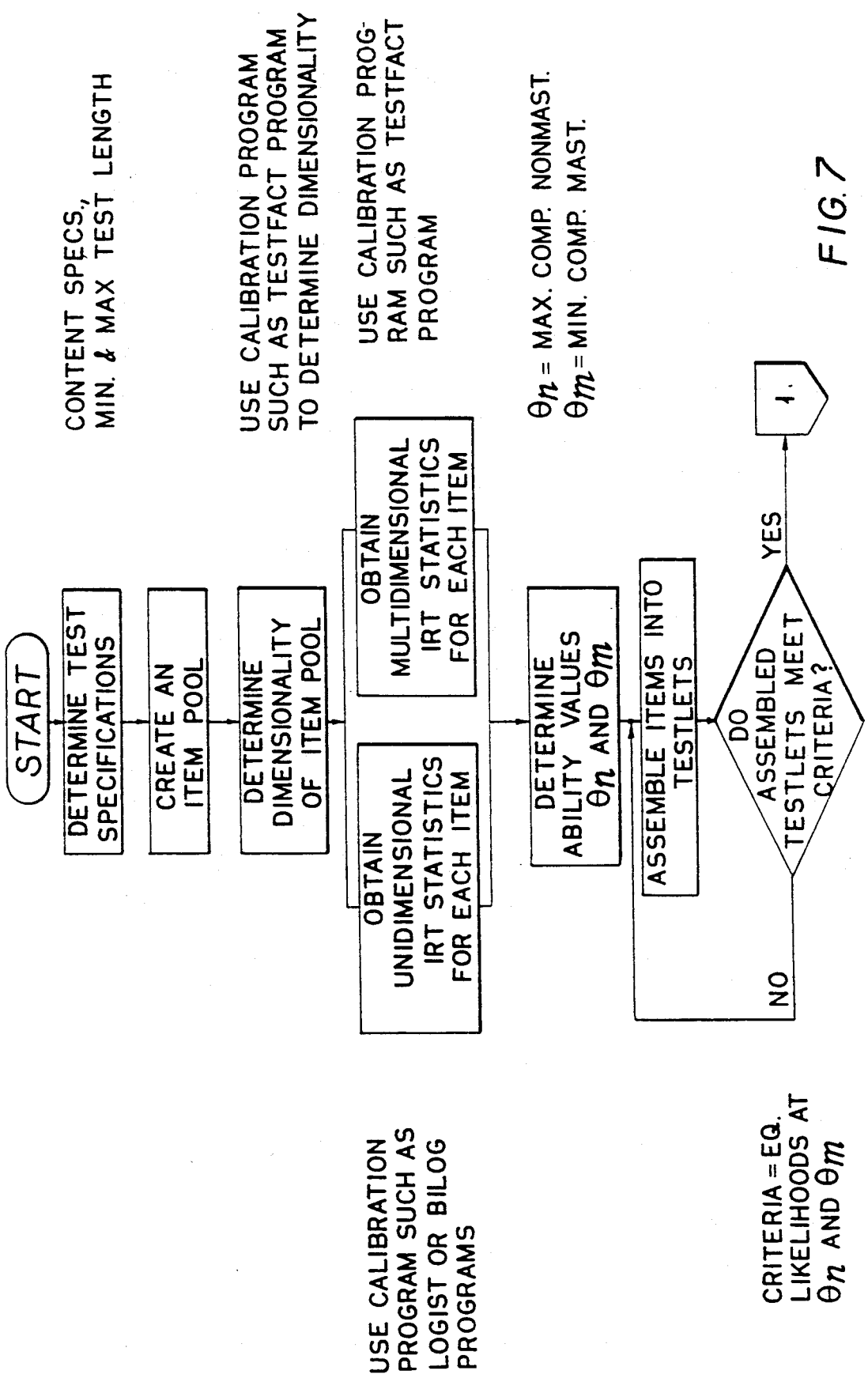
Figure 8:
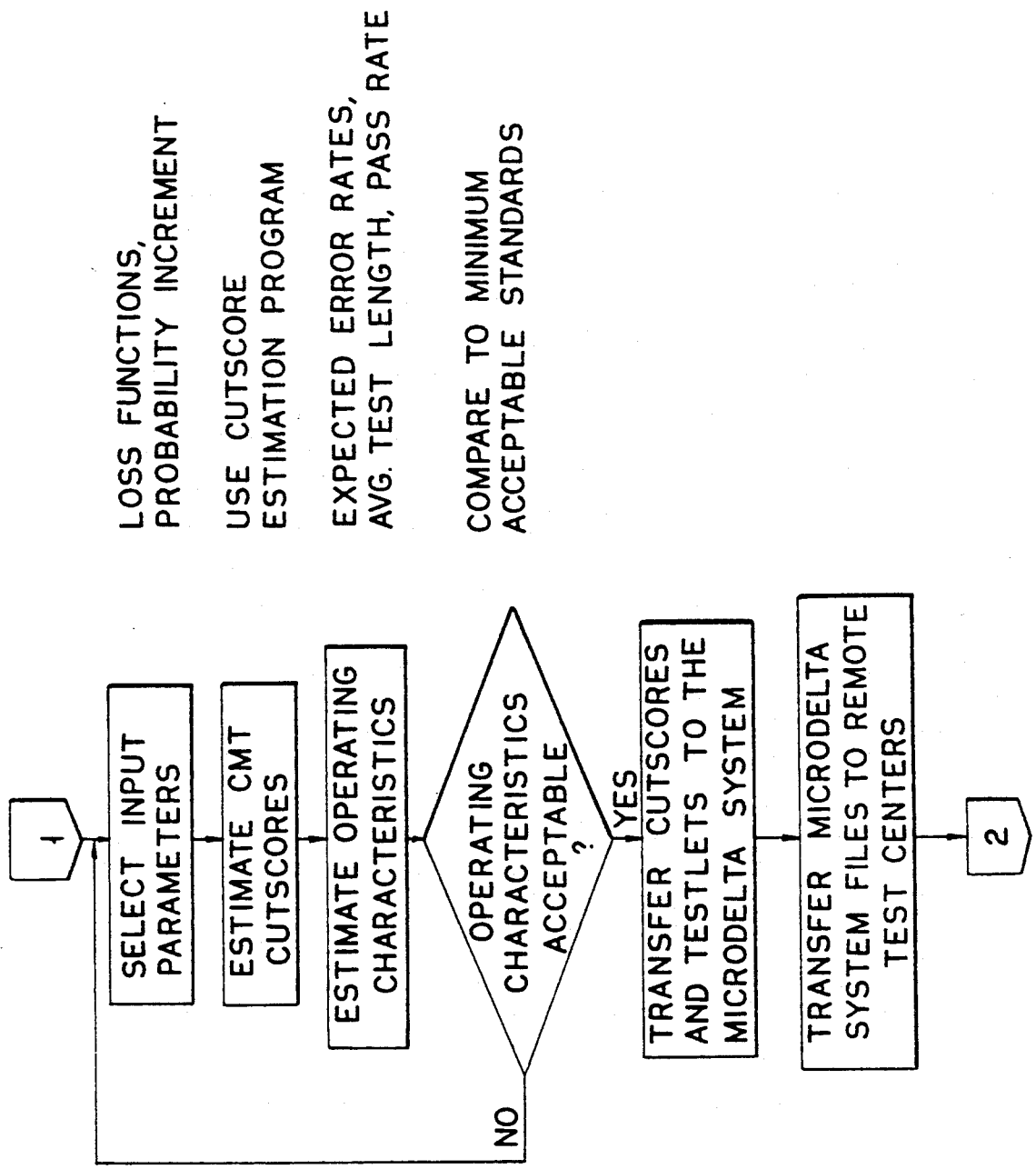

FIG. 7 is a flow chart showing the first part of the test development procedures for one embodiment of inventors' assignee's computerized mastery testing system, it is continued on FIG. 8.

FIG. 8 is a flow chart showing the next part of the test development procedures for one embodiment of inventors' assignee's computerized mastery testing system, it is a continuation of FIG. 7.

Figure 9:
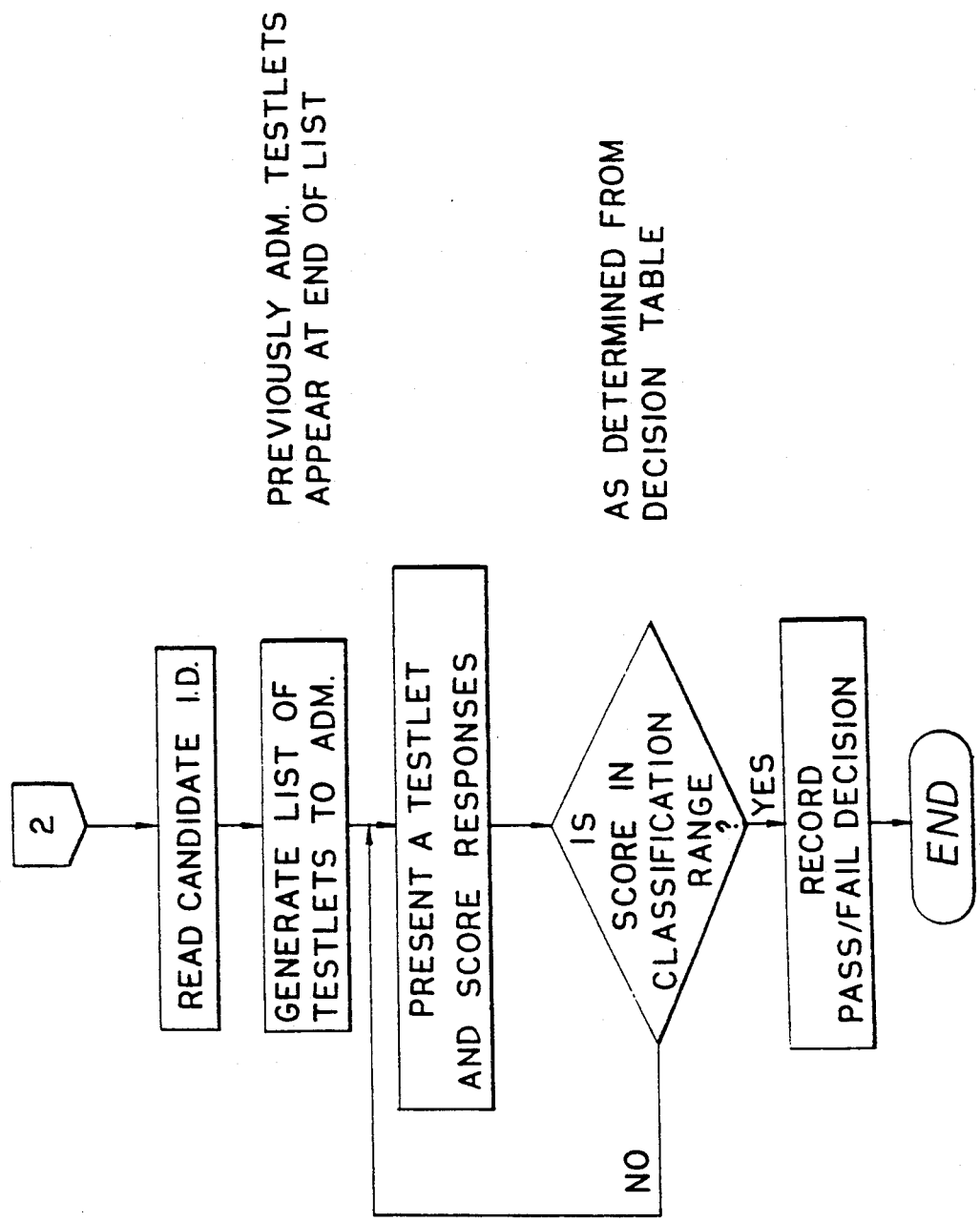

FIG. 9 is a flow chart showing the next part of the computerized mastery testing system, the computerized administration of the test to the examinee, it is a continuation of FIG. 8.

DESCRIPTION OF THE PREFERRED EMBODIMENTS

Previous attempts at applying a sequential testing approach to the mastery testing problem specified that sampling be performed with respect to individual test items. In a preferred embodiment of the present invention, sampling is performed with respect to blocks of items called testlets. A testlet is an ordered collection of items which is designed to be administered as a unit.

The advantages of defining the testlet as the basic unit for constructing and analyzing tests have been described by Wainer & Kiely (1987). In particular, testlets provide greater control over problems related to item-ordering and context effects (effects which arise when the appearance of a particular item has an effect on the difficulty of a subsequent item). Controlling for these types of problems can be quite difficult when individual items are randomly selected from a pool. When items are ordered within testlets, however, a careful screening procedure can eliminate most dependency problems before they occur. Although individual testlet screening cannot completely control for problems occurring between testlets, the impact of between-testlet item dependencies will be lessened by the fact that the items in separate testlets will necessarily be spaced further apart in the presentation sequence. This is an especially effective preventative in a computerized test, since most presentation methodologies do not allow examinees to return to items in earlier testlets.

Random vs. Optimum Selection

While prior art test methods called for random selection of items, IRT-based treatments of mastery testing often allow for alternative item selection mechanisms. For example, Lord (1980) noted that a test composed of items centered at the cutscore (i.e., a peaked test) would be more discriminating than one containing items which varied in difficulty. Kingsbury and Weiss (1979) proposed an adaptive mastery test in which the next item to be administered is selected based on the examinee's current estimated skill level. Both random selection and adaptive selection can be incorporated into a testlet presentation methodology. In addition, testlets can be designed to be optimally discriminating, as suggested by Lord (1980).

A preferred embodiment of the present invention uses random testlet selection. The primary reasons for selecting random rather than adaptive sampling are: (i) computational efficiency—unlike adaptive selection, random selection does not require the estimation of examinee skill levels at each stage of testing; (ii) simplicity—since the CMT system is inherently designed to be adaptive in the sense of an adaptive stopping rule, for most cases the additional complication of an adaptive testlet selection mechanism is not necessary and therefore not particularly desirable; and (iii) ease of implementation—unlike adaptive selection, which requires a pool of content balanced testlets spanning a range of difficulty levels, random testlet selection requires a pool of substantially parallel testlets or a method of assigning variable threshold variables to particular testlets. In many testing programs, the specialized pools required for adaptive testlet selection will be difficult to construct. However, in-place procedures for constructing parallel test forms will often be available for use in constructing pools of parallel testlets.

Random testlet selection does not preclude the use of peaked testlets. Also, since the use of parallel testlets does not restrict the item pool to equivalent items, random testlet selection will often be easier to implement than random item selection. Moreover, as described below, an existing pool of diverse, calibrated items can be reorganized into a pool of parallel testlets. It is important to note, however, that item calibration data collected before items are arranged into testlets may not necessarily agree with item calibration data collected after items are arranged into testlets. Thus, recalibration after testlet construction may sometimes be required.

The Definition of Mastery

In on prior art application of the sequential probability ratio test to the mastery testing problem (Ferguson 1969a, b), the cutscore separating masters from nonmasters was defined in terms of the minimum proportion of correct responses needed to classify an examinee as a master. In another prior art treatment of mastery testing (Lord 1980), an IRT model was used to characterize the relationship between observed test performance and true mastery status, and the cutscore was defined as a point $\Theta_c$ on the latent ability scale or IRT metric. Since it may not always be feasible to specify $\Theta_c$ precisely, Lord also suggested an alternative mastery definition in which two values, $\Theta_m$ and $\Theta_n$, are specified. $\Theta_n$ is the highest level at which an examinee will be considered a nonmaster, and $\Theta_m$ is the lowest level at which an examinee will be considered a master. In the sequential testing system of the preferred embodiment of the present invention, mastery is defined in terms of the two values $\Theta_m$ and $\Theta_n$.

The Use of Loss Functions

In making mastery decisions, two types of errors are possible: (1) classifying a nonmaster as a master (a false positive decision); and (2) classifying a master as a nonmaster (a false negative decision). Let $\alpha$ and $\beta$ denote the probability of occurrence for these two different types of errors, respectively. In the sequential probability ratio test, the decision rule is determined by specifying target values for $\alpha$ and $\beta$. In one of the fixed-length mastery tests proposed by Lord, the decision rule is determined by selecting a small value for $\alpha$, say 0.05, and then determining the decision rule which minimizes $\beta$; suggesting that the loss function approach is not of practical use in the case of unequal losses.

The decision rule of the present invention does not require the specification of values for $\alpha$ and $\beta$. Instead, misclassification rates are controlled through a decision theory approach. Some prior art disclosures of decision theory to mastery testing appear in Cronbach & Gleser (1965), Hambleton & Novick (1973), Huynh (1976), Petersen (1976), Swaminathan, Hambleton & Algina (1975), and van der Linden & Mellenbergh (1977). In this approach, the user's preferences for alternative classification outcomes are established by assigning a real valued number to each possible combination of mastery decision and true mastery status. An example of a simple loss function defined for a fixed-length mastery test is given in Table 1.

TABLE 1

A Simple Loss Function
Defined For a Fixed-length Mastery Test

| Decision | True Mastery Status | |
|---|---|---|
|  | $\theta_n$ | $\theta_m$ |
| pass | A | 0 |
| fail | 0 | B |

This loss function specifies that a correct mastery decision incurs no loss and an incorrect mastery decision incurs a loss which is equal to a real valued constant (either A if the incorrect decision is a false positive or B if the incorrect decision is a false negative). Equal values of A and B indicate that a false positive decision is just as undesirable as a false negative decision. When A is greater than B, the loss function incorporates the belief that false positives are more serious than false negatives. In designing a mastery test for professions where a false decision can cause substantial harm to life and property, a false positive is more serious than a false negative.

The prior art suggested that Bayesian Decision Theory might not be useful in situations where A did not equal B. For example, Lord (1980) disclosed that, if the loss associated with misclassifying a nonmaster as a master (A) did not equal the loss associated with misclassifying a master as a nonmaster (B), the cutscore used in making pass/fail decisions become positively infinite and therefore of no practical use.

To define a loss function for a variable length mastery test, it is necessary to specify the losses associated with each possible combination of mastery decision and true mastery status at each stage of testing. An example of a loss function for a test in which each examinee may be administered at most two testlets is given in Table 2.

TABLE 2

A Simple Loss Function
Defined For a Variable Length Mastery Test
With a Maximum of Two testlets

| | True Mastery Status | |
|---|---|---|
| | $\theta_n$ | $\theta_m$ |
| pass at Stage 1 | A + C | C |
| fail at Stage 1 | C | B + C |
| pass at Stage 2 | A + 2C | 2C |
| fail at Stage 2 | 2C | B + 2C |

In this function, the value C represents the cost of administering a single testlet. As indicated in the table, this cost is incurred regardless of whether a correct or incorrect mastery decision is made. Also, the cost of administering the second testlet is assumed to be exactly equal to the cost of administering the first testlet. Unique loss functions can be defined to accommodate the demands of particular mastery testing applications. For example, the cost of testing C can vary with the number of testlets administered.

Determining the Decision Rule

The object in adopting a decision theory approach is to determine a decision rule which, in some way, reflects the preferences for alternative outcomes which have been built into the loss function. However, since the loss function depends on the true mastery status of individuals, and that status is never known in practice, the optimal decision rule to associate with a particular loss function will not be unique. Several methods for dealing with this problem are available. In a preferred embodiment of the present invention, a Bayesian decision theory approach is followed, such as that discussed in, for instance, Chernoff and Moses (1959), Lindley (1971) and Wetherill (1975). In this approach, the unique decision rule to associate with a particular loss function is found by minimizing posterior expected loss at each stage of testing.

The Bayesian solution is based on the simple loss function defined above in which A represents the loss associated with a false positive decision, B represents the loss associated with a false negative decision, and both A and B are expressed in the same units as C, the cost of administering a single testlet. For the sake of simplicity, C is assumed to remain constant across stages. Since this loss function considers only two levels of mastery ($\Theta_m$ and $\Theta_n$) it also includes the implicit assumption that the loss of misclassification is the same, regardless of how incompetent (or competent) a particular examinee might be. That is, the loss of passing a candidate who is at $\Theta_n$ is assumed to be the same as the loss of passing a candidate who is far below $\Theta_n$. Similarly, the loss of failing a candidate who is at $\Theta_m$ is assumed to be the same as the loss of failing a candidate who is far above $\Theta_m$. In addition, this loss function also implies that there is no loss associated with misclassifying an examinee whose true ability lies in the neutral region ($\Theta_n$, $\Theta_m$). Thus, $\Theta_n$ and $\Theta_m$, (the skill levels associated with a maximally competent nonmaster and a minimally competent master), should be selected to be as close together as possible, given measurement constraints.

One of the advantages of selecting such a simplified loss function is that it limits the amount of prior information needed to determine posterior expected loss. In particular, prior beliefs about the true mastery status of examinees can be quantified in terms of two probabilities: $P_m$, the prior probability that a candidate is at $\Theta_m$, and $P_n = 1 - P_m$, the prior probability that a candidate is at $\Theta_n$.

To determine posterior expected loss, it is also necessary to have a model which characterizes the relationship between true mastery status and observed test performance. The model generally will depend on the nature of the test items. A two-parameter (item discrimination â and item difficulty b) IRT model may be used for free-response test items, while a three-parameter (â, b and the lower asymptote c) IRT model, discussed below, may be used for multiple-choice test items.

These models provide the conditional probability of observing any particular pattern of ordered item responses, given true mastery status. To further simplify the calculations, individual response vector likelihoods are replaced by the combined probability calculated for all possible response vectors having the same number-right score. This approximation will result in a degradation of measurement accuracy whenever the amount of information lost by combining probabilities within number-right score groups is significant.

The operational format of this method is as follows. A pool of parallel testlets is developed and IRT-calibrated. At each stage of testing, an n-item testlet is randomly selected from the pool and administered. After responses to all n items have been observed, a decision is made either to classify the individual or, when the examinee's cumulative number correct score indicates an intermediate level of mastery and the number of testlets administered is less than some previously defined maximum, to administer another testlet. The decision to either classify or continue testing is made by selecting the option which minimizes posterior expected loss. In determining the loss associated with the option to continue testing, all possible outcomes of future testlet administrations are considered.

The Decision Rule for a Fixed-length Test

In this section, a decision rule is derived according to the present invention which minimizes posterior expected loss for a fixed-length mastery test consisting of a single n-item testlet. In the following section the more difficult problem of deriving a decision rule for a variable length mastery test is considered again in accordance with the present invention.

First, the simple loss function which was defined for a fixed-length mastery test in the previous section is adopted. According to this loss function, there are only two possible decisions, pass or fail, and two mastery states, $\Theta_m$ and $\Theta_n$. The prior expected loss of a pass decision is calculated as follows $$E[l(\text{pass}|\theta)] = l(\text{pass}|\theta_n) \cdot P_n + l(\text{pass}|\theta_m) \cdot P_m$$
$$= A \cdot P_n,$$

where $P_m$ is the prior probability assumed for the master state ($\Theta_m$), $P_n = 1 - P_m$ is the prior probability assumed for the nonmaster state ($\Theta_n$) and $l(\cdot|\cdot)$ is the loss function. Similarly, the expected loss of a fail decision is given by $$E[l(\text{fail}|\theta)] = l(\text{fail}|\theta_n) \cdot P_n + l(\text{fail}|\theta_m) \cdot P_m$$
$$= B \cdot P_m.$$

The decision rule which minimizes expected prior loss is thus $$d(P_m) = \text{pass if } A \cdot P_n \leq B \cdot P_m$$
$$\text{fail otherwise,}$$

which is equivalent to $$d(P_m) = \text{pass iff } P_m \geq A/(A+B).$$

This decision rule does not make use of observed item responses.

For testlets composed of calibrated items, it is possible to make a more informed decision by taking expectations with respect to the posterior distribution of $\Theta$. First, the probability of observing any particular number-right score X (on a single n-item testlet) is determined from the assumed IRT model, as follows:

$$P(X = s|\theta = \theta_m) = \Sigma_{j=1}^{n} \pi P_j(\theta_m)^{x_j}(1 - P_j(\theta_m))^{1-x_j}, \quad (2.1)$$

where the summation is taken over all response patterns such that the total score is s (for s=0, ... n), and $x_j = 1$ or 0 (depending on whether the response pattern considered is defined with a correct or incorrect response to the jth item), and $P_j(\Theta_m)$ is the conditional probability of a correct response to the jth item by an examinee with proficiency level $\Theta_m$ (as given by the IRT model). The posterior distribution of $\Theta$ is then obtained as a function of observed number-right score, X, as follows:

$$P(\theta = \theta_m | X = s) = \frac{P(X = s | \theta = \theta_m) \cdot P_m}{P(X = s | \theta = \theta_m) \cdot P_m + P(X = s | \theta = \theta_n) \cdot P_n} \quad (2.2)$$

$$= P_{m|x}$$

where, as before, $P_m$ and $P_n$ represent the prior probabilities for $\Theta_m$ and $\Theta_n$, respectively. The posterior expected losses can now be calculated as $$E[l(pass|\theta)|X] = l(pass|\theta_n) \cdot P_{n|x} + l(pass|\theta_m) \cdot P_{m|x}$$
$$= C + A \cdot P_{n|x} \text{ and}$$

$$E[l(fail|\theta)|X] = l(fail|\theta_n) \cdot P_{n|x} + l(fail|\theta_m) \cdot P_{m|x}$$
$$= C + B \cdot P_{m|x}$$

where the posterior probability of mastery $P_{m|x}$ is given as in Equation 2.2 and $P_{n|x} = 1 - P_{m|x}$. The decision rule which minimizes posterior expected loss is thus $$d(P_{m|x}) = \text{pass if } A \cdot P_{n|x} \leq B \cdot P_{m|x}$$
$$\text{fail otherwise,}$$

which is equivalent to $$d(P_{m|x}) = \text{pass iff } P_{m|x} \geq A/(A+B).$$

This decision rule does not require a large number of on-line calculations. The pass/fail cutoff point $A/(A+B)$ can be calculated prior to the test administration. Also, even though the measure of examinee performance $P_{m|x}$ is a function of data which will not be available until after the test has been administered, it will not be difficult to determine ahead of time which values of X will result in values of $P_{m|x}$ which are above the cutoff point and which will result in values below the cutoff point. Thus, on-line classification decisions can be made on the basis of observed number correct scores.

The Decision Rule for a Variable-Length Test

In accordance with the present invention, a sequential testing design in which the decision to classify or continue testing is reevaluated after each testlet has been administered is now considered. Let $X_i$ be the number-right score observed for the ith testlet administered. Assume that a maximum text length of k testlets has been specified. Since each examinee may potentially be administered a different subset of testlets, care must be taken to insure that all of the testlets in the pool are parallel. For all pairs of testlets t and t', the parallel assumption implies that $$P(X_i = s | \Theta = \Theta_m, \text{testlet} = t) = P(X_i = s | \Theta = \Theta_m, \text{testlet} = t') \text{ and}$$

$$P(X_i = s | \Theta = \Theta_n, \text{testlet} = t) = P(X_i = s | \Theta = \Theta_n, \text{testlet} = t') \text{ for all possible scores } (s = 0, \ldots n).$$

In practice, the IRT derived score probabilities computed for each testlet can be averaged to create a single set of pool-wide average probabilities which can be accessed at each stage of testing, regardless of the particular testlet administered.

As in the case of a single testlet, the decision rule at each stage of testing will require the posterior probability of mastery at that stage. To simplify the notation let $$P_{m|i} = Prob(\Theta = \Theta_m | X_1, X_2, \ldots X_i)$$

where $X_i$ is the score observed for the ith testlet ($i = 1, \ldots k$). This probability can be calculated iteratively as follows:

$$P_{m|i} = \frac{P(X_i | \theta = \theta_m) \cdot P_{m|i-1}}{P(X_i | \theta = \theta_m) \cdot P_{m|i-1} + P(X_i | \theta = \theta_n) \cdot P_{n|i-1}} \quad (2.3)$$

where $P(X_i | \Theta = \Theta_m)$ and $P(X_i | \Theta = \Theta_n)$ refer to pool-wide average probabilities. When $i = 1$, $P_{m|i-1}$ is the prior probability of mastery, $P_m$.

The expected losses associated with the decisions to pass or fail at stage i are expressed as functions of $P_{m|i}$ as follows:

$$E[l(pass|\Theta)|X_1, \ldots X_i] = iC + A \cdot (1 - P_{m|i})$$

$$E[l(fail|\Theta)|X_1, \ldots X_i] = iC + B \cdot P_{m|i}$$

To determine the expected loss associated with the decision to administer another testlet at stage i (for $i < k$), it is necessary to consider all possible outcomes at state $i + 1$. For example, if stage $i + 1$ were to result in a "pass immediately" decision, then the loss of deciding to continue testing at stage i would be equal to the loss of deciding to pass the examinee at stage $i + 1$. However, since the set of all possible outcomes at stage $i + 1$ includes the option of administering another testlet, all possible outcomes at stage $i + 2$ must also be considered, and so on.

The uncertainty associated with future testlet administrations can be accounted for by averaging the expected loss associated with each of the various outcomes in proportion to the probability of observing those outcomes. In particular, the probability of observing each possible score $X_{i+1}$ at Stage $i + 1$, given the scores for the first i stages, can be calculated as a function of the posterior probability of mastery at Stage i, as follows:

$$P(X_{i+1} = s | X_1, \ldots X_i) = P(X_{i+1} = s | \theta = \theta_n) \cdot P_{n|i} + P(X_{i+1} = s | \theta = \theta_m) \cdot P_{m|i}$$

$$= P_{s|i}.$$

where again $P(X_{i+1}=s|\Theta=\Theta_n)$ and $P(X_{i+1}=s|\Theta=\Theta_m)$ represent average pool-wide probabilities. This is the predictive probability at Stage i.

To determine the expected loss of the continue testing option, it is useful to introduce risk functions at each stage of testing. Beginning with Stage k define $$r_k(P_{m|k}) = \min\{E[l(\text{pass}|\theta)|X_1,\ldots X_j], E[l(\text{fail}|\theta)|X_1,\ldots X_j]\}$$
$$= \min\{kC + A \cdot (1 - P_{m|k}), kC + B \cdot P_{m|k}\}.$$

The expected loss of deciding to administer another testlet at Stage $k-1$ can now be written in terms of the risk at Stage k as follows:

$$E[l(\text{continue testing}|\Theta)|X_1,\ldots X_{k-1}] = \Sigma_s P_{s|k-1} \cdot r_k(P_{m|k})$$

where $P_{m|k}$ is evaluated for each value which $X_k$ may take on. The risk function at Stage $k-1$ may now be defined as $$r_{k-1}(P_{m|k-1}) = \min\{E[l(\text{pass}|\theta)|X_1,\ldots X_{k-1}],$$
$$E[l(\text{fail}|\theta)|X_1,\ldots X_{k-1}],$$
$$E[l(\text{continue testing}|\theta)|X_1,\ldots X_{k-1}]\}$$
$$= \min\{(k-1)C + A \cdot (1 - P_{m|k-1}),$$
$$(k-1)C + B \cdot P_{m|k-1}, \Sigma_s \cdot P_{s|k-1} r_k(P_{m|k})\}.$$

In general, the risk at Stage i is defined in terms of the risk at Stage $i+1$ as follows:

$$r_i(P_{m|i}) = \min\{iC+A \cdot (1-P_{m|i}), iC+B \cdot P_{m|i}, \Sigma_s P_{s|i} \cdot r_{i+1}(P_{m|i+1})\}.$$

The decision rule which minimizes posterior expected loss at stage i for $i=1,\ldots k-1$ can now be defined as follows:

$$d_i(P_{m|i}) = \text{pass if } r_i(P_{m|i}) = iC + A \cdot (1 - P_{m|i}) \quad (2.4)$$
$$\text{fail if } r_i(P_{m|i}) = iC + B \cdot P_{m|i}$$
$$\text{continue testing otherwise,}$$

and for stage $i=k$:

$$d_i(P_{m|k}) = \text{pass if } kC + A \cdot (1 - P_{m|k}) \leq kC + B \cdot P_{m|k}$$
$$\text{fail otherwise,}$$

or equivalently, $$d_i(P_{m|k}) = \text{pass if } P_{m|k} \geq A/(A + B)$$
$$\text{fail otherwise.} \quad (2.5)$$

This decision rule, which can be evaluated with respect to any pool of parallel testlets, provides the optimal decision to make at each stage of testing in a multi-stage test.

In many testing situations implementation of the rule given in Equations 2.4 and 2.5 will require a significant number of on-line calculations. To see this, note that the optimal decision to make at Stage 1 depends on the risk at Stage 2, and the risk at Stage 2 depends on the risk at Stage 3, and so on. Thus, in order to make a decision at Stage 1, it is necessary to evaluate the risk at all future stages of the test. In the following section we introduce an alternative testing procedure which has been designed to reduce on-line computation.

Determining Probability Metric Threshold Values

The number of on-line calculations can be reduced by performing some of the required calculations prior to the actual test administration. A recommended procedure is as follows. First, compute the risk at stage k for a set of values of $P_{m|k}$, say 0.000, 0.001, ..., 1.000: for each value of $P_{m|k}$, select the decision which minimizes expected posterior loss by applying (2.5). Next, compute the risk at stage $k-1$ for the same set of values of $P_{m|k-1}$. Note that the task of computing the risk at stage $k-1$ is considerably simplified by the fact that the risk at stage k has already been determined. It is also the case that, at each stage $i < k$, the largest values of $P_{m|i}$ will result in the decision "pass immediately" and the smallest values will result in the decision "fail immediately". Thus, we can easily keep track of the threshold values defined as $\epsilon_{1i}$ = largest value such that application of Equation 2.4 results in the decision to fail immediately whenever $P_{m|i} < \epsilon_{1i}$, $\epsilon_{2i}$ = smallest value such that application of Equation 2.4 results in the decision to pass immediately whenever $P_{m|i} \geq \epsilon_{2i}$, (Note that application of Equation 2.4 will result in the decision to continue testing whenever $\epsilon_{1i} \leq P_{m|i} \leq \epsilon_{2i}$). It is easily seen that $\epsilon_{1k} = \epsilon_{2k} = A/(A+B)$.

The procedure outlined above can be used to determine the threshold values $\epsilon_{1i}$ and $\epsilon_{2i}$ for $i=1,\ldots k$, prior to an actual test administration. Given that the threshold values have already been determined, the testing procedures at each stage reduces to three steps: (1) administer a randomly selected testlet and observe the number correct score $X_i$; (2) update the examinee's estimate of $P_{m|i}$ using Equation 2.3; and (3) make a decision by comparing the updated estimate of a stored threshold value. Use of this alternative procedure vastly reduces the number of required on-line calculations because it is no longer necessary to calculate the risk at future stages of the test.

Translating Probability Metric Threshold Values to the Number-right Score Metric In deriving the decision rule for the fixed-length test, the number of on-line calculations was reduced by translating the threshold value $\epsilon_{11} = \epsilon_{21} = A/(A+B)$ from the probability metric to the number-right score metric. A similar translation can be performed in the case of a variable length test. That is, by computing the posterior probabilities corresponding to all possible combinations of $X_1, \ldots X_k$, we can determine a set of approximate threshold values $\{Y_{1i}, Y_{2i}, i=1, \ldots, k\}$ such that $\Sigma X_j < Y_{1i}$ for most combinations in which $P_{m|i} < \epsilon_{1i}$, and $\Sigma X_j \geq Y_{2i}$ for most combinations in which $P_{m|i} \geq \epsilon_{2i}$, for $i=1,\ldots, k$, where the summation is over $X_j$ for $j=1, \ldots, i$. Thus, in many applications, on-line classification decisions can be made on the basis of cumulative number correct scores.

Validating CMT Decision Rules

All newly estimated CMT decision rules should be validated prior to implementation in an operational setting. The source code for a preferred cutscore validation program appears in the Source Code Appendix below. In estimating CMT decision rules a number of assumptions, simplifications and approximations may be made. Although it is difficult to evaluate the effect of each assumption/simplification/approximation in isolation, the combined effect can be evaluated using simulation techniques. The simulation techniques are used to determine the operating characteristics of a particular decision rule as applied to a particular testlet pool.

One method comprises three steps. First, a set of simulated data is generated to be as similar as possible to the data which would be collected if the entire testlet pool were presented to each candidate in an operational CMT administration. The major simplifications/approximations which are built into the particular CMT decision table program should be avoided at this step. In particular, the simulated data should reflect a realistic candidate ability distribution and item responses should be generated using item specific likelihoods rather than approximate pool-wide average testlet likelihoods.

Second, the newly estimated decision rule is applied to the simulated data and the test results are tabulated in terms of the percent of simulees classified as masters at each ability level considered. These data are then used to estimate the operating characteristics of the new decision rule. The operating characteristics which will generally be of interest include: the average test length; the expected number of false positive decisions; the expected number of false negative decisions; and the overall pass rate.

Third, the operating characteristics estimated for the new decision rule are compared to a set of target operating characteristics. The target operating characteristics should be defined to reflect minimum acceptable standards. When the estimated operating characteristics of the new decision rule are found to be at least as acceptable a the target operating characteristics, the decision rule has been validated for use in an operational setting. When the operating characteristics do not meet the minimum acceptable standards, the decision rule has not been validated and should not be implemented. Subsequent investigations might include modifying some of the input parameters to the CMT Cutscore Estimation Program or removing a troublesome testlet from the pool.

While the embodiments so far described have been primarily concerned with separating masters from nonmasters, those embodiments may be extended to provide multiple cut scores to classify individuals into two, three or more levels of mastery/nonmastery.

Testlet Assembly Procedures for the CMT System

The following CMT testlet assembly procedure may be utilized to assemble testlets. Obtain an IRT calibrated item pool, classified by content. Cull the item pool to remove all items with a low a (item discrimination) parameters or high c (the probability of a correct response by an extremely low ability examinee) parameters.

Prepare a worksheet in LOTUS 1-2-3 computer spreadsheet including a unique item identifier and IRT item parameters. Set up the required number of parallel work areas into which items will be placed as testlets are composed. Work areas should track mean b (item difficulty) value, standard deviation of the mean b value, and distance of the mean b value from the target b value for the testlets.

Sort the item pool by content categories and, within these catagories, by b value. Choose the content area in which the ratio of number of items available to the number of items specified is smallest. Choosing content areas with increasingly larger ratios will provide the maximum flexibility in meeting statistical needs as the process proceeds. Working within this content area, select the first item for the first testlet as the item whose b value is nearest to the target b value and move this item to the first testlet work area. Continue by selecting the first item for the second testlet from those items remaining in the pool as the item with the b value is nearest to the target b value. Continue this process until the first item for the last testlet has been selected.

Continuing within the same content area, if appropriate to satisfy specifications, select for the second item in the last testlet the item remaining in the item pool that is closest to the target b value and which will tend to move the mean b value for the testlet toward the targeted b value. Thus, if after one selection round, the mean b value is negative, an item with the positive b value closest to the target b value should be selected. Continue this process working backwards through the testlets until testlet number 1 is reached. Continue in this way until the content specifications for the first content area have been met. Repeat the selection process, continuing to move the mean b value toward the targeted b value until all content requirements have been met.

Once all items for the testlets have been selected, check mean b values and standard deviations for outliers. Make item substitutions from the pool or item swaps among the testlets until mean b values are nearly the same and approach the target b value as closely as possible and standard deviations of the mean b values are nearly equivalent and as small as possible.

Identify and print out testlet items and check for content overlap or overemphasis. Replace offending items with items from the pool or by swapping items among testlets making sure mean b values are nearly the same and approach the target b value as closely as possible and standard deviations of the mean b values are nearly equivalent and as small as possible.

Computerized Test Administration System, Presentation and Scoring of the Testlets The following CMT testlet presentation and scoring procedure may be used to administer the testlets to each examinee in a random manner for all testlets not as yet administered to each such examinee. The computer software source code for a preferred embodiment of this procedure appears in the Source Code Appendix attached hereto.

The procedure relies on the availability of a computerized test delivery system. While inventors' assignees' present invention interfaces to the MICRODELTA TM computerized test delivery system proprietary to Educational Testing Service, the procedure could be readily interfaced to commercially available computerized test delivery systems, such as, TENCORE computerized test delivery system which is distributed by Computer Teaching Corporation of Champaign, Ill., or MICROCAT TM System which is distributed by Assessment Testing Systems Corporation of St. Paul, Minn. by a practitioner who is skilled in the technical of the particular computerized test delivery system being used.

Prior to administration to a particular examinee, the computer must read and save a list of testlets previously administered to this examinee. The decision table must also be available. The computer then generates a list of testlets to be administered, excluding any previously administered to this examinee, and randomly permutes that list. Previously administered testlets are placed at the end of the list.

If the examinee was interrupted during a previous administration then the computer must adjust the list described above to reflect that interruption. The file of previous item responses is located and read and a list of testlets started or completed is compiled (together with other administration information, such as administration time and options previously selected). This information is used to adjust the list described above so that the list ultimately contains the numbers of the testlets to be presented during this administration, in the order in which they will be presented. The first item in the first testlet in this list is then selected for presentation.

Items are presented and scored until the procedure indicates that testing is completed. As the examinee reaches the end of each testlet, the computer applies the decision table to determine whether the cumulative number right is sufficient to classify the examinee as a master or non-master. If so, the computer signals the administration system that the test is completed, and the test result is returned. If not, the computer selects the first item of the next testlet for administration.

In a preferred embodiment, the test of the decision table is actually made twice, before the examinee has answered the previous question. One test is made assuming the examinee will answer the question correctly, and one assuming the examinee will answer the question incorrectly. The results of these two tests are used to determine the item (and testlet, if the current item is the last in a testlet) that will be loaded into memory for administration following the current item. This procedure greatly speeds processing when the examinee actually answers the question.

Example of an Application of the Computerized Mastery Test System to a Professional Certification Program The CMT system described herein has been used to design a variable length mastery test for use in a professional certification program. The data available for this effort consisted of responses collected in several past administrations of a fixed-length 60-item mastery test which was administered in the standard paper-pencil format. The results of this test were reported to examinees on a scale which ranged from 0 to 100 with a cutscore of 75. The cutscore had been established using an Angoff-design study. Zieky and Livingston (1982) discloses different design studies for establishing cutscores, including Angoff-design and Ebel-design studies.

Some results of a typical paper-and-pencil administration of this exam are presented in FIG. 1. The top panel provides an equating function which can be used to translate scores from the number correct metric to the reporting scale metric. The reported cutscore of 75 corresponds to a number correct score of 39. The bottom panel provides the distribution of estimated abilities which shows that, in this administration, approximately 70% of the candidate population received a passing score.

Repeated paper-and-pencil administrations of this exam had resulted in an item pool containing 110 items. The three-parameter logistic IRT model had previously been fit to these data and estimated model parameters were available. The estimated parameters indicated a wide variation in the difficulty and discrimination levels of the items in the pool. The items also belong to two nonoverlapping content categories.

Additional constraints imposed on this test development effort included the following: (a) the test length was constrained to be between 20 and 60 items; and (b) the test content was constrained to include the two content categories in a 60/40 ratio. Based on these constraints, a testlet length of ten items was selected. Also, it was decided that each examinee would be required to respond to at least two testlets but no more than six testlets.

Eleven testlets were then constructed by first cross classifying the item pool according to (a) content category and (b) estimated item difficulty, and then sequentially assigning items to testlets. Each resulting testlet contained six items from the first content category and four items from the second content category. The six testlets which appeared most "parallel" (in terms of median difficulty and discrimination) were then selected from the eleven that were available. The estimated item parameters of these six selected testlets are summarized in Table 3.

TABLE 3

Summary of Item Parameter Estimates for the Six Selected testlets

| Number | Minimum | Median | Maximum |
|---|---|---|---|
| | Item Difficulty (b) | | |
| 1 | −1.789 | −.965 | 1.016 |
| 2 | −2.074 | −.501 | 0.945 |
| 3 | −1.992 | −.490 | 4.701 |
| 4 | −2.678 | −.409 | 0.640 |
| 5 | −1.701 | −.111 | 0.547 |
| 6 | −2.364 | −.108 | 2.132 |
| | Item Discrimination (a) | | |
| 1 | .633 | .862 | 1.469 |
| 2 | .200 | .768 | 1.333 |
| 3 | .168 | .760 | 1.627 |
| 4 | .196 | .621 | 1.014 |
| 5 | .321 | .666 | 1.477 |
| 6 | .446 | .728 | 1.389 |
| | Lower Asymptote (c) | | |
| 1 | .000 | .090 | .341 |
| 2 | .000 | .179 | .500 |
| 3 | .000 | .166 | .326 |
| 4 | .000 | .166 | .335 |
| 5 | .000 | .187 | .348 |
| 6 | .000 | .205 | .285 |

Before using the six selected testlets two checks were performed. First, each testlet was evaluate for unwanted item dependencies. As a result of this check, several offending items were replaced with alternative items that had been matched for content category and difficulty. In a second check, the validity of the testlet interchangeability assumption was evaluated by comparing the theoretical distribution of number-right scores estimated for each testlet at the previously chosen points $\Theta_n$ and $\Theta_m$. These distributions are plotted in FIG. 2. As indicated in the figure, the points $\Theta_n$ and $\Theta_m$ correspond to ability levels of 69 and 81 on the test reporting scale, respectively. The closeness of the curves indicates that, for examinees near the cutscore, the probability of observing a particular number-right score is virtually the same regardless of the particular testlet administered. Based on this comparison, it was decided that the measurement accuracy of the test would not be seriously degraded by treating the six selected testlets as if they were truly interchangeable.

To determine the decision rule which minimizes posterior expected loss for this particular set of six testlets, four additional parameters had to be specified: the prior probability of mastery $P_m$, and the loss function parameters A, B, and C. Although the proportion of true masters in the population was expected to be near 0.7, the value $P_m = 0.5$ was selected in order to incorporate a notion of equal prior odds. The loss function parameters A, B, and C were selected as follows. First, in order to set the scale of measurement, the cost of administering a testlet (C) was taken to be one. Second, in order to incorporate the belief that a false positive decision was twice as serious as a false negative decision, A was taken to be 2B. Finally, a simulation study was performed to evaluate the operating characteristics of the alternative decision rules which resulted when B was allowed to vary between 2 and 100. The operating characteristics investigated in the simulation included average test length, expected passing rate, expected proportion of false positive decisions and expected proportion of false negative decisions. Based on the simulation results, it was determined that the value B=20 provided a decision rule with desirable operating characteristics. Thus, the loss of passing a non-master was taken to be 40 and the loss of failing a master was taken to be 20 on a scale in which one unit corresponds to the cost of administering a single testlet. We will refer to this as a 40/20/1 loss function.

A stage by stage view of the expected losses associated with the 40/20/1 loss function, as applied to the six selected testlets, is given in FIG. 3. In each plot, the posterior probability of mastery $P_{m|i}$ is plotted along the X-axis and the posterior expected loss curves calculated for each possible decision are plotted along the Y-axis. Consider the plot listed for Stage 6. This is the final stage of the test so only two decisions are possible: pass or fail.

The expected loss curve for the pass decision decreases linearly as the posterior probability of mastery increases. The expected loss curve for the fail decision increases linearly as the posterior probability of mastery increases. The point at which the two curves intersect is the threshold value $$\epsilon_{16} = \epsilon_{26} = A/(A+B) = \tfrac{2}{3}$$

Below this point, expected loss is minimized by making a fail decision and above this point expected loss is minimized by making a pass decision. The region in which a fail decision is optimal is indicated by negatively sloped diagonal lines. The region in which a pass decision is optimal is indicated by positively sloped diagonal lines.

The plot given for Stage 5 includes a third curve representing the expected loss of the continue testing option. The area where this curve provides the minimum expected loss is shaded using a cross hatched pattern. The plot shows that, for low values of $P_{m|5}$, expected loss is minimized by making a fail decision, for high values of $P_{m|5}$, expected loss is minimized by making a pass decision, and for intermediate values of $P_{m|5}$, expected loss is minimized by deciding to administer a sixth testlet.

In comparing the plots provided for Stages 1 through 5, one can see that the range of values of $P_{m|i}$ which will result in the decision to continue testing decreases with the number of testlets administered. Thus, an examinee's chances of being classified increase with each testlet administered.

The threshold values obtained for the 40/20/1 loss function are listed in Table 4. For purposes of comparison, the table also lists the threshold values which would have resulted if equal losses (A=B=20) had been specified. Values are reported both in the probability metric and the cumulative number-right score metric. The probability metric threshold values correspond to the intersection points of the curves which were plotted in FIG. 3. The cumulative number-right score values were obtained by computing the posterior probabilities corresponding to all possible combinations of number-right scores, as was described in the previous section. Although either one of these sets of values could be used in an actual on-line testing situation, the cumulative number-right score threshold values are the most likely choice because they are much simpler to understand and easier to use.

TABLE 4

Comparison of Threshold Values Obtained for Two Alternative Loss Functions

| | | Loss = 20/20/1 | | Loss = 40/20/1 | |
|---|---|---|---|---|---|
| Stage | Items | Lower Value | Upper Value | Lower Value | Upper Value |
| | | Probability Metric Threshold Values | | | |
| 1 | 10 | .1525 | .8525 | .1675 | .9275 |
| 2 | 20 | .1525 | .8475 | .1775 | .9275 |
| 3 | 30 | .1625 | .8375 | .1975 | .9225 |
| 4 | 40 | .1875 | .8225 | .2325 | .9125 |
| 5 | 50 | .2325 | .7725 | .3175 | .8825 |
| 6 | 60 | .5000 | .5000 | .6666 | .6666 |
| | | Number-right Score Threshold Values | | | |
| 1 | 10 | — | — | — | — |
| 2 | 20 | 11 | 15 | 11 | 16 |
| 3 | 30 | 17 | 21 | 17 | 22 |
| 4 | 40 | 23 | 27 | 23 | 28 |
| 5 | 50 | 30 | 33 | 30 | 34 |
| 6 | 60 | 37 | 38 | 38 | 39 |

Consider the probability metric threshold values first. These are the cut-off values which are to be applied, at the completion of each additional testlet, to each candidate's updated posterior probability of mastery $P_{m|i}$. Under the 20/20/1 rule, candidates with posterior probabilities below 0.1525 at Stage 1 will be failed immediately, those with posterior probabilities of 0.8525 or greater will be passed immediately, and those with intermediate values will be required to respond to an additional testlet. The corresponding values for the 40/20/1 rule are shifted slightly upward. For example, in order to be passed after responding to just one testlet under the 40/20/1 rule, candidates must have a posterior probability of mastery which meets or exceeds the higher cut-off value of 0.9275. This more stringent requirement reflects the asymmetric nature of the 40/20/1 loss function.

Note that Table 4 does not list number-right score threshold values for the first stage of testing. This is because a minimum test length of two testlets had previously been established and this restriction was incorporated into all of the decision rules considered by changing the first stage probability metric threshold values to zero and one respectively. Since it is impossible for a candidate to respond in such a manner as to achieve a posterior probability of mastery which is less than zero or greater than one, all candidates will be required to respond to at least two testlets, regardless of their score on the first testlet.

From Table 4 it can be seen that candidates with cumulative number correct scores by stage two of eleven or less will be failed and those with cumulative number correct scores of 15 or better, under the 20/20/1 rule, and 16 or better, under the 40/20/1 rule will be passed. This means that in order to determine the cut-off scores for Stage 3, not all of the $11^3 = 1,331$ possible score combinations need be considered. Thus the number of required calculations remains manageable. Also, the fact that these calculations can be performed in advance of an actual on-line testing session makes this method of determining a decision rule even more attractive.

A Loss Function is Selected Using Simulation Techniques

As was noted in the previous section, a number of alternative loss functions were evaluated before selecting the 40/20/1 loss function. Each alternative function was evaluated with respect to a single set of simulated data. The simulated data set included item responses generated according to the three parameter logistic IRT model for each item in the six selected testlets (a total of sixty items) for 100 simulated examinees at each of 41 ability levels ranging from 55 to 98 on the reported score metric (a total of 4,100 simulated examinees). The ability levels used in the simulation were selected to be representative of the range of abilities observed in paper-and-pencil administrations of the items included in the six selected testlets.

Although many different loss functions were evaluated, three representative loss functions are described below: the 20/20/1 loss function, the 40/20/1 loss function, and the 100/20/1 loss function. For purposes of comparison, these loss functions are evaluated with respect to a variable length test and a fixed-length test. The variable length test was defined such that each examinee was required to respond to at least two testlets and no more than six testlets. Thus, test lengths ranged from 20 to 60 items. The fixed-length test was defined to include the same six testlets used to construct the variable length test for a total length of 60 items. The results of this evaluation are given in Table 5.

TABLE 5

Stimulation Results for Six Alternative Mastery Tests

| Decision Rule | Average Test Length | Pass Rate | Error Rates as % of Total Pop. | | Error Rates as % of Sub. Pop. | |
|---|---|---|---|---|---|---|
| | | | False Pos. | False Neg. | False Pos. | False Neg. |
| Variable Length Tests | | | | | | |
| 20/20/1 | 25.2 | 65.5 | 3.3 | 7.5 | 11.0 | 10.8 |
| 40/20/1 | 27.7 | 64.0 | 2.6 | 8.2 | 8.6 | 11.8 |
| 100/20/1 | 30.2 | 60.5 | 1.7 | 10.8 | 5.6 | 15.5 |
| Fixed-length Tests | | | | | | |
| 20/20/1 | 60 | 69.0 | 3.7 | 4.3 | 12.3 | 6.2 |
| 40/20/1 | 60 | 65.8 | 2.7 | 6.6 | 8.8 | 9.4 |
| 100/20/1 | 60 | 62.1 | 1.8 | 9.3 | 6.0 | 13.4 |

The error rates given as a percent of the total population ("Total Pop.") provide the number of incorrect decisions (false positives or false negatives) expressed as a percent of the total decision made. The error rates given as a percent of a subpopulation ("Sub. Pop.") provide the percent of Nonmasters misclassified as Masters (false positives) and the percent of Masters misclassified as Nonmasters (false negatives). The approximate percentages of masters and nonmasters in the candidate population were 70% and 30%, respectively.

For each test, Table 5 provides the average test length, the expected pass rate and the expected error rates. These statistics were obtained by weighting the simulation results to reflect the expected proportion of examinees at each of the 41 ability levels considered (based on the distribution given in FIG. 1).

The results presented for the three variable-length tests show that, as expected, more severe losses lead to longer tests. For example, when the loss of incorrectly passing a nonmaster is considered to be 20 times the cost of administering another testlet, on the average, candidates will be required to respond to about 25 items. When this loss is considered to be 100 times the cost of administering another testlet, an average length of about 30 items can be expected.

The error rates listed in Table 5 were obtained by comparing the true mastery status of each simulee to the mastery classifications which resulted from applying the various decision rules. The table shows the degree to which differences in testing formats are reflected in differences in expected error rates. Note, that, under the 100/20/1 decision rule, the average test length is decreased by half, but there is only a slight change in expected error rates.

The adaptive nature of the 40/20/1 CMT is illustrated in FIG. 4 which provides the bivariate distribution of true ability and test length. The plot shows that examinees with true ability levels located near the cut-score of 75 will be administered test of 50 or 60 items, whereas those with ability levels a either of the two extremes will be administered a test of at most 20 or 30 items.

An alternative view of the operating characteristics of these three loss function specifications is provided in FIG. 5 which presents the percent of simulees classified as masters plotted as a function of true ability level. Results for the three variable length tests are given in the top panel, and results for the three fixed-length tests ar given in the bottom panel. All curves were obtained by smoothing the unweighted simulation results. The plots show that, for both modes of administration, the more extreme loss function specifications tend to result in fewer classification errors.

The trade off between classification accuracy and test length is illustrated in FIG. 6. In the top panel, the results of applying the 20/20/1 decision rule under a fixed-length testing format (where all examinees are required to respond to a complete set of 60 items) are compared to the results of applying the same decision rule in a variable-length testing format (where test lengths can range from 20 to 60 items). The bottom panel provides a similar comparison for the 40/20/1 decision rule. The plots show that, for these decision rules, the shorter average test lengths associated with the variable length testing format are accompanied by observable decreases in classification accuracy.

This application of sequential mastery testing incorporates a number of simplifying assumptions: (i) all candidates are assumed to be at one of two ability levels $\Theta_n$ or $\Theta_m$, and (ii) individual response vector likelihoods are approximated using the combined likelihood calculated for all possible response vectors having the same number-right score. However, these simplifications were not incorporated into the simulated data which was used to determine the operating characteristics of alternative decision rules. Instead, the simulated data assumed the range of abilities given in FIG. 1, and responses were generated according to the three-parameter logistic IRT model (which allows for variation in the likelihood of response vectors having the same number-right score). Thus, the reasonable error rates obtain in the simulation can be interpreted as evidence that the simplifying assumptions have not seriously degraded the measurement accuracy of the test.

The Use of a Non-Parallel testlet Pool

While, we have described in detail embodiments of the present invention where the random sampling is from a pool of parallel testlets, other embodiments of the CMT system utilizes a random sampling from a pool where the testlets are not required to be parallel. In the latter embodiments, estimated threshold values are adjusted to compensate for the lack of parallelism in the testlet pool. In these cases, testlets which are slightly more (or less) difficult to complete will be assigned threshold values which are slightly less (or more) difficult to achieve.

When the CMT system is implemented using a possibly nonparallel testlet pool, a separate set of threshold values is estimated for each possible permutation of testlets which might be presented to a candidate. For example, if the pool consists of ten testlets, but each candidate may be administered at most five testlets, then to completely calibrate this pool generally requires estimation of the threshold values associated with each of 30,240 possible testlet presentation permutations. However, if the number of candidates expected to take part in an operational administration of this test is much smaller than the total number of permutations possible, the set of all possible permutations can be sampled down prior to the actual administration.

Thus, if fewer than 1,000 candidates were expected to take part in the administration, a random subset of 1,000 permutations could be preselected for calibration. At testing time, each candidate would be presented with a random permutation of testlets which was drawn from the preselected set of 1,000.

Although preferred specific embodiments of the present invention have been described above in detail, it is desired to emphasize that this has been for the purpose of illustrating and describing the invention, and should not be considered as necessarily limitative of the invention, it being understood that many modifications can be made by those skilled in the art while still practicing the invention claimed herein.

REFERENCES

Bock, R. D., Gibbons, R., and Muraki, E. (1985). *Full information factor analysis.* MRC Report 85-1. Chicago: National Opinion Research Center.

Chernoff, H., & Moses, L. E. (1959). *Elementary decision theory.* New York: John Wiley.

Cronbach, L. J., & Gleser, G. C. (1965). *Psychological Tests and Personnel Decisions (2nd ed.).* Urbana, Ill.: University of Illinois Press.

Ferguson, R. L. (1969a). *Computer-assisted criterion-referenced measurement* (Working Paper No. 41). Pittsburgh: University of Pittsburgh Learning and Research Development Center. (ERIC Documentation Reproduction No. ED 037 089).

Ferguson, R. L. (1969b). *The development, implementation, and evaluation of a computer-assisted branched test for a program of individually prescribed instruction.* (Doctoral dissertation, University of Pittsburgh) (University Microfilms No. 70-4530).

Frick (1986). *An investigation of the validity of the sequential probability ratio test for mastery decisions in criterion-referenced testing.* Bloomington: Department of Instructional Systems Technology, School of Education, Indiana University. (Paper presented at the Annual Meeting of the American Educational Research Association, San Francisco, Apr. 16, 1986).

Hambleton, R. K., & Novick, M. R. (1973). "Toward an integration of theory and method for criterion-referenced tests." *Journal of Educational Measurement,* 10, 159–170.

Huynh, H. (1976). "Statistical consideration of mastery scores." *Psychometrika,* 41, 65–78.

Kingsbury, G. G., & Weiss, D. J. (1983). "A comparison of IRT-based adaptive mastery testing and a sequential mastery testing procedure." In D. J. Weiss (Ed.), *New horizons in testing: Latent trait test theory and computerized adaptive testing* (pp. 257–283). New York: Academic Press.

Kingston, N. M. and Dorans, N. J. (1985). "The analysis of item ability regressions: An exploratory model fit tool." *Applied Psychological Measurement,* 9, 281–287.

Lindley, D. V. (1971). *Making decisions.* London and New York: Wiley-Interscience.

Lord, F. M. (1980). *Applications of item response theory to practical testing problems.* Hillsdale, N.J.: Erlbaum.

Mislevy, R. J. and Bock, R. D. (1984). *BILOG Users Guide,* Mooresville, Ind.: "Scientific Software, Inc."

Petersen, N. S. (1976). "An expected utility model for 'optimal' selection." *Journal of Educational Statistics,* 1, 333–358.

Reckase, M. D. (1983). "A procedure for decision making using tailored testing." In D. J. Weiss (Ed.), *New horizons in testing: Latent trait test theory and computerized adaptive testing* (pp. 237–255). New York: Academic Press.

Swaminathan, H., Hambleton, R. K., & Algina, J. (1975). "A Bayesian decision-theoretic procedure for use with criterion-referenced tests." *Journal of Educational measurement,* 12, 87–98.

van der Linden, W. J., & Mellenbergh, G. J. (1977). "Optimal cutting scores using a linear loss function." *Applied Psychological Measurement.* 7, 593–599.

Wainer, H. (1983). "On Item Response Theory and computerized adaptive tests." *The Journal of College Admissions,* 28, 9–16.

Wainer, H. C. & Kiely, G. L. (1987). "Item clusters and computerized adaptive testing: A case for testlets." *Journal of Educational Measurement,* 24, 185–201.

Wald, A. (1947). *Sequential analysis.* New York: John Wiley.

Wetherill, G. B. (1975). *Sequential methods in statistics.* London: Chapman and Hall.

Wilson, D., Wood, R. and Gibbons, R. (1984). *TESTFACT users guide.* Mooresville, Ind.: "Scientific Software."

Wingersky, M. S. (1983). "LOGIST: Program for computing maximum likelihood procedures for logistic test models." In Hambleton, R. K. (editor) *Applications of item response theory.* Vancouver, BC: Educational Research Institute of British Columbia.

Yen, W. M. (1981). "Using simulation results to choose a latent trait model." *Applied Psychological Measurement,* 5, 245–262.

Zieky, M. and Livingston, S. (1982). *Passing Scores: A manual for setting performance on educational and occupational tests.* Educational Testing Service, Princeton, N.J.

SOURCE CODE APPENDIX

CMT CUTSCORE ESTIMATION Source Code.

FORTRAN Source Code for a Cutscore Estimation Program.[1]

```
c      THE CMT CUTSCORE ESTIMATION PROGRAM
c      VERSION 2 - PARALLEL OR NONPARALLEL testletS
c
c      K. SHEEHAN
c
       REAL*8 RV(40000)
       INTEGER*4 IV(100)
       LOGICAL MYERR
       IALR8=40000
       IALI4= 100
       MYERR=.FALSE.
       CALL CONTRL(MYERR,RV,IALR8,IV,IALI4)
       STOP
       END
C ================================================================

SUBROUTINE CONTRL(MYERR,RV,IALR8,IV,IALI4)
       IMPLICIT REAL*8 (A-H,O-Z)
       REAL*8 RV(1),PVEC(1001)
       INTEGER NPERM
       INTEGER*4 IV(1),ID(10)
       INTEGER*2 IDEC
       LOGICAL MYERR
       CHARACTER*64 FNAME1,FNAME2,FNAME3,FNAME4,FNAME5
       CHARACTER*6 FIRST
       COMMON /KPTRS/KQPT,KP,KLK,KTMPA,KTMPB,
     $   KCUT1,KCUT2,KRAT,KBD,KTST,KLO,KHI
       COMMON /PARCOM/ NPOOL,NTESTS,NITM,NQPT,INFIL,IOUTD,IOUTC,
     $   ILOSS,IVLO,IVHI,iprnt,cut,SPREAD,PINC,PRIOR,A,B,C
c
c                                              INITIALIZE PARAMS
       IFRSTP=1
       ILSTP=1000
       NPOOL=6
       NTESTS=5
       MINT=1
       NITM=10
       NQPT=2
       IPRNT=1
       CUT=-2.2D-1
       SPREAD=1D0
       TLO=CUT-(SPREAD*0.5)
       THI=CUT+(SPREAD*0.5)
       PINC=.1
       PRIOR=.5
       A=40D0
       B=20D0
       C=1D0
       MAXLO=0
       MAXHI=0
```

---

[1] ©Educational Testing Service, 1988, 1989

```fortran
C
      WRITE(*,'(A)') ' THE CMT CUTSCORE ESTIMATION PROGRAM '
      WRITE(*,'(A)') ' VERSION 2 - NON-PARALLEL testletS'
      WRITE(*,'(A)') '                                        '
    5 CONTINUE
      WRITE(*,'(A)') ' LIST OF INPUT PARAMETERS '
      WRITE(*,'(A)') '

WRITE(*,'(A20,I4)')    ' 1.  SIZE OF POOL =',NPOOL
      WRITE(*,'(A20,I4)')    ' 2.  MAX. # TESTS =',NTESTS
      WRITE(*,'(A20,I4)')    ' 3.  MIN. # TESTS =',MINT
      WRITE(*,'(A20,I4)')    ' 4.  NO. OF ITEMS =',NITM
      WRITE(*,'(A20,F6.4)')  ' 5.  PRIOR P(MAST)=',PRIOR
      WRITE(*,'(A20,F8.4)')  ' 6.  CUT POINT=    ',CUT
      WRITE(*,'(A20,F8.4)')  ' 7.  THETA N=      ',TLO
      WRITE(*,'(A20,F8.4)')  ' 8.  THETA M=      ',THI
      WRITE(*,'(A20,F6.4)')  ' 9.  PROB. INC. =  ',PINC
      WRITE(*,'(A20,F9.4)')  ' 10. FALSE P LOSS= ',A
      WRITE(*,'(A20,F9.4)')  ' 11. FALSE N LOSS= ',B
      WRITE(*,'(A29,I4)')    ' 12. FIRST PER. TO PROCESS=',IFRSTP
      WRITE(*,'(A29,I4)')    ' 13. LAST PER. TO PROCESS= ',ILSTP
      WRITE(*,'(A)') '                                        '
      WRITE(*,'(A)') '                                        '
      WRITE(*,'(A)') ' ENTER NUMBER OF PARAMETER TO CHANGE '
      WRITE(*,'(A)') ' USE I2 FORMAT (0=NO CHANGES REQUIRED) '
      READ(*,'(I2)') NUM
      IF (NUM.EQ.0) GO TO 200
      IF (NUM.GT.13) GO TO 5
      WRITE(*,'(A)') ' ENTER NEW VALUE '
      GOTO (10,20,30,40,50,60,70,80,90,100,110,120,130) NUM
   10 READ(*,'(I4)') NPOOL
      GO TO 5
   20 READ(*,'(I4)') NTESTS
      GO TO 5
   30 READ(*,'(I4)') MINT
      GO TO 5
   40 READ(*,'(I4)') NITM
      GO TO 5
   50 READ(*,'(F6.4)') PRIOR
      GO TO 5
   60 READ(*,'(F8.4)') CUT
      GO TO 5
   70 READ(*,'(F8.4)') TLO
      GO TO 5
   80 READ(*,'(F8.4)') THI
      GO TO 5
   90 READ(*,'(F6.4)') PINC
      IF (PINC.LT.1D-3) PINC=1D-3
      GO TO 5
  100 READ(*,'(F9.4)') A
      GO TO 5
  110 READ(*,'(F9.4)') B
      GO TO 5
  120 READ(*,'(I4)') IFRSTP
      GO TO 5
  130 READ(*,'(I4)') ILSTP
      GO TO 5
  200 CONTINUE
C                                             INITIALIZE PVEC=
C                                             P(MASTER)
      IP=0
  210 IP=IP+1
```

```fortran
      PM=DFLOAT(IP-1)*PINC
      PVEC(IP)=PM
      IF (PM.LT.1D0) GO TO 210
      IF (PM.GT.1D0) PVEC(IP)=1D0
      NPM=IP
C                                                 DEFINE POINTERS
      CALL DYNSUB(MYERR,NEEDR8,NEEDI4)
C
      WRITE(*,6000) NEEDR8,IALR8,NEEDI4,IALI4
 6000 FORMAT('1OUTPUT REPORT FOR DYNAMIC SPACE ALLOCATOR'/
     $       ' ',I6,' REAL*8 WORDS NEEDED OF',I6,' AVAILABLE'/
     $       ' ',I6,' INT*4  WORDS NEEDED OF',I6,' AVAILABLE')
C
C                                                 ENOUGH SPACE ??
      IF (NEEDR8.GT.IALR8) MYERR=.TRUE.
      IF (NEEDI4.GT.IALI4) MYERR=.TRUE.
      IF (MYERR) RETURN
      CONTINUE
C
      INFIL=9
      INFIL2=10
      IOUTD=11
      IOUTC=12
C                                                 OPEN INPUT FILES
      WRITE(*,'(A)')
      WRITE(*,'(A)') ' This pgm requires TWO Input Files: '
      WRITE(*,'(A)')
      WRITE(*,'(A)') ' File 1 = 3PL Item Parameters'
      WRITE(*,'(A)') '          Ordered (a,b,c)        '
      WRITE(*,'(A)') '          For each item,         '
      WRITE(*,'(A)') '          GROUPED by testlet     '
      WRITE(*,'(A)') ' With Format Card in the First Record
      WRITE(*,'(A)')
      WRITE(*,'(A)') ' Enter File Name '
      READ(*,'(A)') FNAME1
      OPEN (INFIL,FILE=FNAME1,ACCESS='SEQUENTIAL',STATUS='OLD')
      WRITE(*,'(A)')
      WRITE(*,'(A)')
      WRITE(*,'(A)') ' File 2 = testlet Presentation'
      WRITE(*,'(A)') '          Permutations         '
      WRITE(*,'(A)') '          Formatted (3I4,6I2)'
      WRITE(*,'(A)') '                               '
      WRITE(*,'(A)') ' Enter File Name '
      READ(*,'(A)') FNAME2
      OPEN (INFIL2,FILE=FNAME2,ACCESS='DIRECT',RECL=24,
     $   FORM='FORMATTED')
C
C                                         CREATE 3 DIRECT ACCESS
C                                         FILES ON DRIVE G (VDISK)
      ILOSS=1
      OPEN(ILOSS,FILE='G:\ELOSS',ACCESS='DIRECT',RECL=60,
     $   FORM='FORMATTED')
C
      IVLO=2
      OPEN(IVLO,FILE='G:\NRLO',ACCESS='DIRECT',RECL=24,
     $   FORM='FORMATTED')
C
      IVHI=3
      OPEN(IVHI,FILE='G:\NRHI',ACCESS='DIRECT',RECL=24,
     $   FORM='FORMATTED')
C
C
      IF (IFRSTP.GT.1) THEN
```

```fortran
C                                              OPEN CUT FILE AS OLD
      WRITE(*,'(A)')
      WRITE(*,'(A)') ' Enter name of Previously Created'
      WRITE(*,'(A)') ' Cut Score File'
      read(*,'(A64)') FNAME4
      OPEN (IOUTC,FILE=FNAME4,ACCESS='SEQUENTIAL',STATUS='OLD')
C
      WRITE(*,'(A)')
      WRITE(*,'(A)')
      WRITE(*,'(A)') ' Enter name FOR RUN DOCUMENTATION FILE'
      read(*,'(A64)') FNAME3
      OPEN (IOUTD,FILE=FNAME3,ACCESS='SEQUENTIAL',STATUS='NEW')
C
C                              TRANSFER DATA FROM IOUTC TO
C                              VDISK UNITS IVLO AND IVHI
      CALL TRANCUT(IVLO,IVHI,IOUTC,IOUTD,NTESTS,MAXLO,MAXHI)
      ELSE
C
C                                              OR OPEN CUT FILE AS NEW
      WRITE(*,'(A)')
      WRITE(*,'(A)')
      WRITE(*,'(A)') ' This pgm creates TWO Output Files:'
      WRITE(*,'(A)') ' 1) filnam.NET = Run Documentation'
      WRITE(*,'(A)') ' 2) filnam.CUT = UNIQUE NR CUTS'
      WRITE(*,'(A)')
      WRITE(*,'(A)') ' Enter filnam (Six characters, no dot) '
      read(*,'(A6)') FIRST
      fname3=first//'.NET'
      OPEN (IOUTD,FILE=FNAME3,ACCESS='SEQUENTIAL',STATUS='NEW')
C
      fname4=first//'.CUT'
      OPEN (IOUTC,FILE=FNAME4,ACCESS='SEQUENTIAL',STATUS='NEW')
C
      END IF
C
C
C
C                                    WRITE PARAMS
C                              FOR RUN DOCUMENTATION
      WRITE(IOUTD,'(A)')       '    CMT    CUTSCORE     ESTIMATION
     PROGRAM-VERSION 2'
      CALL MYTIM(IOUTD)
      WRITE(IOUTD,'(A)') ' ----------------------------'
      WRITE(IOUTD,'(A)') ' LIST OF I/O FILES'
      WRITE(IOUTD,'(A)') ' ----------------------------'
      WRITE(IOUTD,'(1X,A)') FNAME1
      WRITE(IOUTD,'(1X,A)') FNAME2
      WRITE(IOUTD,'(1X,A)') FNAME3
      WRITE(IOUTD,'(1X,A)') FNAME4
      WRITE(IOUTD,'(A)') ' ----------------------------'
      WRITE(IOUTD,'(A)') ' LIST OF PROGRAM PARAMETERS'
      WRITE(IOUTD,'(A)') ' ----------------------------'
      WRITE(IOUTD,6010) NPOOL,NTESTS,MINT,NITM,CUT,TLO,THI,
     $   PINC,PRIOR,A,B,IFRSTP,ILSTP
 6010 FORMAT(' NPOOL=',I4/' NTESTS=',I4/' MINT=',I4/' NITM=',I4/
     $       ' CUT=',F10.4/' TLO=',F10.4/' THI=',F10.4/
     $       ' PINC=',F10.4/' PRIOR=',F10.4/' A=',F10.4/' B=',F10.4/,
     $       ' IFRSTP=',I4/' ILSTP=',I4/)
C
C
      IF (NTESTS.GT.6) THEN
```

```
            WRITE(IOUTD,'(A)') ' ILLEGAL VALUE OF NTESTS
            WRITE(IOUTD,'(A)') ' HAS BEEN CHANGED TO 6'
            NTESTS=6
         END IF
C
C
         IF (NPOOL.GT.10) THEN
            WRITE(IOUTD,'(A)') ' ILLEGAL VALUE OF NPOOL'
            WRITE(IOUTD,'(A)') ' HAS BEEN CHANGED TO 10'
            NPOOL=10
         END IF
C
C
         IF (MINT.GT.2) THEN
            WRITE(IOUTD,'(A)') ' ILLEGAL VALUE OF MINT'
            WRITE(IOUTD,'(A)') ' HAS BEEN CHANGED TO 2'
            MINT=2
         END IF
C                                            DEFINE DUMMY PARAMS
C                                               FOR ARRAY SIZES
         NPLX =NPOOL+1
         NTSTX=NTESTS
         NITMX=NITM
         NSCRX=NITM+1
         NQPTX=NQPT
C                                            READ ITEM PARAMETERS
C                                            CALC PROB TABLES
         CALL READI(NPLX,NITMX,NQPTX,RV(KQPT),RV(KP),TLO,THI)
C
C                                            CALC LK BY testlet,
C                                               QPT AND NR SCORE
C                                               CRITERIA FOR
C                                               EVALUATING testlet
C                                               PARALLELISM
         CALL GETLK(NPLX,NITMX,NQPTX,NSCRX,RV(KP),
     $       RV(KLK),RV(KTMPA),RV(KTMPB),RV(KRAT))
C
C
C                                            Testlet PERMUTATION
C                                               LOOP
         DO 280 I=1,6
         ID(I)=NPLX
  280    CONTINUE
C
         NPERM=IFRSTP-1
C                                            IF NOT A CONTINUATION
C                                               RUN GO TO 330
C                                               FOR EQUIV testlet
C                                               CALCULATIONS
         IF (IFRSTP.EQ.1) GOTO 330
C
  300    NPERM=NPERM+1
         IF (NPERM.GT.ILSTP) GO TO 500
         READ(INFIL2,'(12X,6I2)',REC=NPERM) (ID(I),I=1,6)
  330    CONTINUE
C
         WRITE(*,'(A25,I4)') ' PROCESSING PERMUTATION #',NPERM
         WRITE(*,'(1X,6I2)') (ID(I),I=1,NTESTS)
C
C
C                                            RE-INITIALIZE LOSS
C                                               TABLE
         CALL INITL(ILOSS,NPM)
```

```
C
C                                              CALC CUT OFF PTS
C                                              IN PROB METRIC
      CALL PCUT(NPERM,NTSTX,NQPTX,NSCRX,NPM,NPLX,ITST,ID,PVEC,
     $  RV(KLK),RV(KCUT1),RV(KCUT2))
C
      IF (ITST.NE.3) GO TO 600
C
C                                              CALC CUT OFF PTS
C                                              IN NR SCR METRIC
      CALL NCUT(MINT,INFIL2,NPERM,NPLX,NTSTX,NSCRX,IV(KTST),
     $  ID,RV(KCUT1),RV(KCUT2),RV(KBD),
     $  RV(KRAT),IV(KLO),IV(KHI),INUMLO,INUMHI,MAXLO,MAXHI)
C
C
      WRITE(*,'(2(1X,2I4))') INUMLO,MAXLO,INUMHI,MAXHI
C
      IF (NPERM.LE.5) CALL MYPRNT(IOUTD,NPERM,NTSTX,IV(KLO),IV(KHI),
     $  RV(KBD))
C
C                                              END OF PERMUTATION LOOP
      GO TO 300
  500 CONTINUE
      NPERM=NPERM-1
      WRITE(IOUTD,'(A)') '----------------------------------------'

WRITE(IOUTD,'(A28,I4)') 'NUMBER   OF   PERMUTATIONS=
     ',NPERM
      WRITE(IOUTD,'(A28,I4)')    'NUMBER    OF    UNIQUE    LOWER
     CUTS=',MAXLO
      WRITE(IOUTD,'(A28,I4)')    'NUMBER    OF    UNIQUE    UPPER
     CUTS=',MAXHI
      WRITE(IOUTD,'(A)') '----------------------------------------'
C
C                                              TRANSFER DATA ON VDISK
C                                              IVLO AND IVHI
C                                              TO DOCUMENTATION FILE
C                                              AND TO FILE ON UNIT IOUTC
      WRITE(IOUTC,'(5X,6I4)') MAXLO,MAXHI
      WRITE(IOUTD,'(A)') ' -------------------------'
      WRITE(IOUTD,'(A)') ' LIST OF UNIQUE LOWER CUTS'
      WRITE(IOUTD,'(A)') ' -------------------------'
      DO 520 IREC=1,MAXLO
      K=IREC
      READ(IVLO,'(6I4)',REC=K) (ID(I),I=1,NTESTS)
      WRITE(IOUTD,'(I4,1X,6I4)') IREC,(ID(I),I=1,NTESTS)
      WRITE(IOUTC,'(I4,1X,6I4)') IREC,(ID(I),I=1,NTESTS)
  520 CONTINUE
      WRITE(IOUTD,'(A)') ' -------------------------'
      WRITE(IOUTD,'(A)') ' LIST OF UNIQUE UPPER CUTS'
      WRITE(IOUTD,'(A)') ' -------------------------'
      DO 540 IREC=1,MAXHI
      K=IREC
      READ(IVHI,'(6I4)',REC=K) (ID(I),I=1,NTESTS)
      WRITE(IOUTD,'(I4,1X,6I4)') IREC,(ID(I),I=1,NTESTS)
      WRITE(IOUTC,'(I4,1X,6I4)') IREC,(ID(I),I=1,NTESTS)
  540 CONTINUE
C
      CALL MYTIM(IOUTD)
C
      RETURN
C
```

```
C                                         IF NOT CONT. TEST. AT STAGE 0
  600 WRITE(IOUTD,5000)
      IF (ITST.EQ.1) WRITE(IOUTD,5002)
      IF (ITST.EQ.2). WRITE(IOUTD,5004)
      WRITE(IOUTD,5010)
      RETURN
C
C
 5000 FORMAT('0*****************************************************'/
     $       ' *** THE CMT DECISION TABLE WILL NOT BE CALCULATED ***'/
     $       ' *** BECAUSE THE EXPECTED LOSS OF CLASSIFYING ALL  ***')
 5002 FORMAT(' *** EXAMINEES AS NON-MASTERS                      ***'/)
 5004 FORMAT(' *** EXAMINEES AS MASTERS                          ***'/)
 5010 FORMAT(' *** BEFORE ADMINISTERING A SINGLE testlet         ***'/
     $       ' *** IS LESS THAN THE LOSSES EXPECTED AFTER        ***'/
     $       ' *** ADMINISTERING ANY NUMBER OF testletS AND      ***'/
     $       ' *** MAKING ANY CLASSIFICATION DECISION.           ***'/
     $       ' *** INPUT PARAMETERS MAY NOT BE APPROPRIATE.      ***'/
     $  '*****************************************************')
      END
C ================================================================

SUBROUTINE DYNSUB(MYERR,NEEDR8,NEEDI4)
C
C     SET UP POINTERS FOR REAL*8 DATA STORED IN RV
C                   AND I*4    DATA STORED IN IV
C
      IMPLICIT REAL*8 (A-H,O-Z)
      LOGICAL MYERR
      COMMON /PARCOM/ NPOOL,NTESTS,NITM,NQPT,INFIL,IOUTD,IOUTC,
     $    LOSS,IVLO,IVHI,IPRNT,CUT,SPREAD,PINC,PRIOR,A,B,C
      COMMON /KPTRS/KQPT,KP,KLK,KTMPA,KTMPB,
     $    KCUT1,KCUT2,KRAT,KBD,KTST,KLO,KHI
C
C
C
      NSCOR=1+ NITM
      NPLX=NPOOL+1
C
      KP   =1
      KTMPA=KP+(NPLX*NITM*NQPT)
      KTMPB=KTMPA+(NSCOR)
      KQPT= KTMPB+(NSCOR)
      KLK=  KQPT + (NQPT)
      KRAT =KLK+(NPLX*NSCOR*NQPT)
      NEEDR8=KRAT +(NPLX*NSCOR)
C     STORE CUT1 AND CUT2 IN AREA WHERE P,KTMPA,KTMPB WERE STORED

KCUT1 =1
      KCUT2 =KCUT1+ (NTESTS)
      KBD   =KCUT2+ (NTESTS)
      NEED2 =KBD+(2*NTESTS)
      IF (NEED2.GE.KQPT) MYERR=.TRUE.
```

```
C
C
      KTST=1
      KLO=KTST+NTESTS
      KHI=KLO+NTESTS
      NEEDI4=KHI+NTESTS
C
      RETURN
      END
C ================================================================

SUBROUTINE READI(NPLX,NITMX,NQPTX,QPT,P,TLO,THI)
      IMPLICIT REAL*8 (A-H,O-Z)
      DIMENSION QPT(NQPTX),
     $    P(NPLX,NITMX,NQPTX)
      CHARACTER*64 FNAME,FMT
C
      COMMON /PARCOM/ NPOOL,NTESTS,NITM,NQPT,INFIL,IOUTD,IOUTC,
     $    ILOSS,IVLO,IVHI,IPRNT,CUT,SPREAD,PINC,PRIOR,A,B,C
C
C
C                                                 CALC QUAD PTS
      TINC=(THI-TLO)/DBLE(NQPT-1)
      DO 40 IQPT=1,NQPT
      QPT(IQPT)=TLO +(IQPT-1)*TINC
   40 CONTINUE
      WRITE(IOUTD,'(A)') ' ---------------------'
      WRITE(IOUTD,'(A)') ' LIST OF THETA VALUES'
      WRITE(IOUTD,'(A)') ' ---------------------'
      WRITE(IOUTD,'(4X,10F8.4)') (QPT(IQPT),IQPT=1,2)
C
C
C                                                 READ ITEM PARAMS
      WRITE(IOUTD,'(A)') ' -------------------------------'
      WRITE(IOUTD,'(A)') ' ITEM PARMAMETER LIST (A,B,C)'
      WRITE(IOUTD,'(A)') ' -------------------------------'
      READ(INFIL,'(A64)') FMT
      DO 200 IT=1,NPOOL
      WRITE(IOUTD,'(A9,I2)') ' testlet=',IT
      DO 100 ITM=1,NITM
      READ(INFIL,FMT) AI,BI,CI
      WRITE(IOUTD,'(I4,3F12.4)') ITM,AI,BI,CI
      DO 80 IQPT=1,NQPT
      P(IT,ITM,IQPT)=PROBP(QPT(IQPT),AI,BI,CI)
   80 CONTINUE
  100 CONTINUE
  200 CONTINUE
C
C
C
C
c     IF (IPRNT.EQ.0) RETURN
c     CONTINUE
C                                                 PRINT PROBABILITY
C                                                       TABLE
C
c     WRITE(IOUTD,'(A)')
c                 WRITE(IOUTD,'(A)')     '
-----------------------------------------------'
c     WRITE(IOUTD,'(A)') ' ITEM P(CORRECT/Q) FOR Q=1,NQPT'
c                 WRITE(IOUTD,'(A)')     '
-----------------------------------------------'
c     DO 550 IT=1,NPOOL
c     do 550 ITM=1,NITM
c  WRITE(IOUTD,'(I4,10F8.4)') ITM,(P(IT,ITM,IQPT),IQPT=1,LSTQ)
```

```
c 550 CONTINUE
c
c
      RETURN
      END
c ==========================================================
      SUBROUTINE GETLK(NPLX,NITMX,NQPTX,NSCRX,P,LK,PA,PB,
     $    RATIO)
c
c     **********************************************************
c     OUTPUT DISTRIBUTION OF ALL POSSIBLE Number-right SCORES
c     FOR A NONMASTER AT SKILL LEVEL THETA(N)
c     AND A MASTER AT SKILL LEVEL THETA(M)
c     FOR EACH testlet IN THE POOL
c     TO BE USED FOR EVALUATING testlet PARALLELNESS
c     **********************************************************
c
      IMPLICIT REAL*8 (A-H,O-Z)
      REAL*8 P(NPLX,NITMX,NQPTX),
     $    LK(NPLX,NQPTX,NSCRX),PA(NSCRX),PB(NSCRX),
     $    RATIO(NPLX,NSCRX)
c
      COMMON /PARCOM/ NPOOL,NTESTS,NITM,NQPT,INFIL,IOUTD,IOUTC,
     $    ILOSS,IVLO,IVHI,IPRNT,CUT,SPREAD,PINC,PRIOR,A,B,C
c
c
      IAVG=NPOOL+1
      DO 20 J=1,NSCRX
      LK(IAVG,1,J)=0D0
      LK(IAVG,2,J)=0D0
   20 CONTINUE
c
      DO 800 IT=1,NPOOL
      DO 400 IQ=1,NQPT
c
c     FOR EACH TEST, AT EACH QPT, CALC PROB OF EACH POSSIBLE
c     NR SCORE: PA(J)=PROB(SCORE=J-1/TEST OF LENGTH N)
c               PB(J)=PROB(SCORE=J-1/TEST OF LENGTH N+1)
c     START WITH N=2 AND ITERATE TO N=NITM
c
      Q1=1D0-P(IT,1,IQ)
      Q2=1D0-P(IT,2,IQ)
      PA(1)=Q2*Q1
      PA(2)=P(IT,2,IQ)*Q1+Q2*P(IT,1,IQ)
      PA(3)=P(IT,2,IQ)*P(IT,1,IQ)
      DO 110 L=3,NITM
      QL=1D0-P(IT,L,IQ)
      PB(1)=QL*PA(1)
      DO 100 J=2,L
      PB(J)=P(IT,L,IQ)*PA(J-1)+QL*PA(J)
  100 CONTINUE
      LL=L+1
      PB(LL)=P(IT,L,IQ)*PA(L)
      DO 102 J=1,LL
      PA(J)=PB(J)
  102 CONTINUE
  110 CONTINUE
      DO 120 J=1,LL
      LK(IT,IQ,J)=PA(J)
      LK(IAVG,IQ,J)=LK(IAVG,IQ,J)+DLOG(LK(IT,IQ,J))
  120 CONTINUE
  400 CONTINUE
```

```
C                                          NORMALIZE SO THAT
C                                          SUM OF PROBABILITIES
C                                          AT EACH QPT IS 1
C                                          FOR EACH testlet
      DO 600 IQ=1,NQPT
      SUM=0D0
      DO 540 J=1,NSCRX
      SUM=SUM+LK(IT,IQ,J)
  540 CONTINUE
      DO 580 J=1,NSCRX
      LK(IT,IQ,J)=LK(IT,IQ,J)/SUM
  580 CONTINUE
  600 CONTINUE
C
C
                W R I T E ( I O U T D , ' ( A ) ' )
'---------------------------------------'
      WRITE(IOUTD,'(A)') '                     LIKELIHOOD
LIKELIHOOD'
      WRITE(IOUTD,'(A)') 'TEST NR   QPT1      QPT2       RATIO'
                W R I T E ( I O U T D , ' ( A ) ' )
'---------------------------------------'
      DO 780 J=1,NSCRX
      ISCORE=J-1
      RATIO(IT,J)=0D0
      IF (LK(IT,1,J).GT.0D0) RATIO(IT,J)=LK(IT,2,J)/LK(IT,1,J)
      WRITE(IOUTD,'(2I4,2F8.4,F12.4)') IT,ISCORE,
     $   (LK(IT,IQ,J),IQ=1,NQPT),RATIO(IT,J)
  780 CONTINUE
C
  800 CONTINUE
C
      RECIP=1D0/DFLOAT(NPOOL)
      DO 900 IQ=1,NQPT
      SUM=0D0
      DO 840 J=1,NSCRX
      LK(IAVG,IQ,J)=DEXP(RECIP*LK(IAVG,IQ,J))
      SUM=SUM+LK(IAVG,IQ,J)
  840 CONTINUE
      DO 880 J=1,NSCRX
      LK(IAVG,IQ,J)=LK(IAVG,IQ,J)/SUM
  880 CONTINUE
  900 CONTINUE
      IT=IAVG
                W R I T E ( I O U T D , ' ( A ) ' )
'---------------------------------------'
      WRITE(IOUTD,'(A)') '                     LIKELIHOOD
LIKELIHOOD'
      WRITE(IOUTD,'(A)') 'AVG  NR   QPT1      QPT2       RATIO'
                W R I T E ( I O U T D , ' ( A ) ' )
'---------------------------------------'
      DO 980 J=1,NSCRX
      ISCORE=J-1
      RATIO(IT,J)=0D0
      IF (LK(IT,1,J).GT.0D0) RATIO(IT,J)=LK(IT,2,J)/LK(IT,1,J)
      WRITE(IOUTD,'(2I4,2F8.4,F12.4)') IT,ISCORE,
     $   (LK(IT,IQ,J),IQ=1,NQPT),RATIO(IT,J)
  980 CONTINUE
C
C
      RETURN
 6000 FORMAT(' ',F8.3,I4,F12.5)
      END
```

```
C ================================================================
      SUBROUTINE PUTLOS(ILOSS,IP,ISTAGE,VAL)
      IMPLICIT REAL*8 (A-H,O-Z)
      DIMENSION X(6)
      READ(ILOSS,'(6F10.4)',REC=IP) (X(I),I=1,6)
      X(ISTAGE)=VAL
      WRITE(ILOSS,'(6F10.4)',REC=IP) (X(I),I=1,6)
      RETURN
      END
C ================================================================
      FUNCTION GETLOS(ILOSS,IP,ISTAGE)
      IMPLICIT REAL*8 (A-H,O-Z)
      DIMENSION X(6)
      READ(ILOSS,'(6F10.4)',REC=IP) (X(I),I=1,6)
      GETLOS=X(ISTAGE)
      RETURN
      END
C ================================================================
      SUBROUTINE INITL(ILOSS,NPM)
      REAL*4 XOLD(6),XNEW(6)
C
C   INITIALIZE LOSS FUNCTION STORED ON DIRECT ACCESS
C   FILE ILOSS
C   FOR EACH POSSIBLE PROB OF MASTERY (PM)
C   AND EACH POSSIBLE STAGE OF TESTING (I=1,6)
C   ENTRY IN LOSS TABLE IS MINIMUM OF ELC, ELN, AND ELM
C   THESE VALUES MUST BE RECALCULATED FOR EACH PERMUTATION
C
C
      DO 100 I=1,6
      XNEW(I)=0.
  100 CONTINUE
C
      DO 200 IP=1,NPM
      WRITE(ILOSS,'(6F10.4)',REC=IP) (XNEW(I),I=1,6)
  200 CONTINUE
C
C
      RETURN
      END
C ================================================================
      SUBROUTINE PCUT(NPERM,NTSTX,NQPTX,NSCRX,NPM,NPLX,ITST,ID,
     $   PVEC,LK,CUT1,CUT2)
C
      IMPLICIT REAL*8 (A-H,O-Z)
      INTEGER*4 ID(10)
      INTEGER*2 IDEC,IDECP
                                        R   E   A   L   *   8
     LK(NPLX,NQPTX,NSCRX),CUT1(NTSTX),CUT2(NTSTX),PVEC(NPM)
C
      COMMON /PARCOM/ NPOOL,NTESTS,NITM,NQPT,INFIL,IOUTD,IOUTC,
     $   ILOSS,IVLO,IVHI,IPRNT,CUT,SPREAD,PINC,PRIOR,A,B,C
C
C
C   CALCULATE CUT OFF PTS IN PROB. METRIC
C
      NN=NTESTS+1
      DO 400 KK=1,NN
      ISTAGE=NTESTS-KK+1
C
C NOTE: IT IDENTIFIES testlet TO BE ADMINISTERED AT NEXT STAGE
C       SO ID MUST BE DIMENSIONED AT LEAST (NTESTS+1)
```

```
C
      IT=ID(ISTAGE+1)
      DC=DFLOAT(ISTAGE)*C
      IDECP=1
      PMPREV=0D0
      DO 300 IP=1,NPM
      IF ((ISTAGE.EQ.0).AND.(IP.GT.1)) GO TO 300
      IF (ISTAGE.EQ.0) THEN
        PM=PRIOR
      ELSE
        PM=PVEC(IP)
      END IF
      EL0=B*PM+DC
      EL1=A*(1D0-PM)+DC
      IF (ISTAGE.EQ.NTESTS) THEN
        ELCT=99.9999D0
      ELSE
        ELCT=0D0
        DO 260 J=1,NSCRX
        IF ((LK(IT,1,J).LE.1D-8).AND.(LK(IT,2,J).LE.1D-8)) THEN
          PROBJ=0D0
        ELSE
          PROBJ=(1D0-PM)*LK(IT,1,J)+PM*LK(IT,2,J)
        END IF
        IF (PROBJ.LE.0D0) GOTO 260
        POSTJ=(PM*LK(IT,2,J))/PROBJ
        IF (POSTJ.GT.1D0) POSTJ=1D0
        IF (POSTJ.LT.0D0) POSTJ=0D0
        CALL INTERP(ILOSS,ISTAGE,NPM,PVEC,PINC,POSTJ,PLOSSJ)
        PP=PROBJ*PLOSSJ
        ELCT=ELCT+PP
  260   CONTINUE
      END IF
      XMIN=DMIN1(EL0,EL1,ELCT)
      IDEC=3
      IF (XMIN.EQ.EL0) IDEC=1
      IF (XMIN.EQ.EL1) IDEC=2
      IF (ISTAGE.EQ.0) THEN
        ITST=IDEC
        GO TO 300
      ELSE
        CALL PUTLOS(ILOSS,IP,ISTAGE,XMIN)
      END IF
      IF (IDECP.EQ.1) THEN
         IF (IDEC.EQ.3) CUT1(ISTAGE)=5D-1*(PM+PMPREV)
         IF (IDEC.EQ.2) CUT1(ISTAGE)=5D-1*(PM+PMPREV)
         IF (IDEC.EQ.2) CUT2(ISTAGE)=5D-1*(PM+PMPREV)
      END IF
      IF (IDECP.EQ.3) THEN
         IF (IDEC.EQ.2) CUT2(ISTAGE)=5D-1*(PM+PMPREV)
      END IF
      PMPREV=PM
      IDECP=IDEC
  300 CONTINUE
  400 CONTINUE
C
C
C
C
C
      RETURN
 6020 FORMAT(' ',I4,3F10.5)
      END
C==================================================================
```

```fortran
      SUBROUTINE INTERP(ILOSS,ISTAGE,NPM,PVEC,PINC,POSTJ,PLOSSJ)
      IMPLICIT REAL*8 (A-H,O-Z)
      REAL*8 PVEC(NPM)
C
      IPLO=INT(POSTJ/PINC) + 1
      PLO=PVEC(IPLO)
      IF (POSTJ.LT.PLO) THEN
         IPLO=IPLO+1
         PLO=PVEC(IPLO)
      END IF
      IF (POSTJ.EQ.PLO) THEN
         PLOSSJ=GETLOS(ILOSS,IPLO,ISTAGE+1)
      ELSE
        IPHI=IPLO+1
        PHI=PVEC(IPHI)
        FXLO=GETLOS(ILOSS,IPLO,ISTAGE+1)
        FXHI=GETLOS(ILOSS,IPHI,ISTAGE+1)
        D=0D0
        DIFF=PHI-PLO
        IF (DIFF.GT.0D0) D=(FXHI-FXLO)*(POSTJ-PLO)/DIFF
        PLOSSJ=FXLO+D
      END IF
      RETURN
      END
C ================================================================
C                       S U B R O U T I N E
      NCUT(MINT,INFIL2,NPERM,NPLX,NTSTX,NSCRX,ITEST,ID,
     $ CUT1,CUT2,BD,RATIO,NRLO,NRHI,INUMLO,INUMHI,MAXLO,MAXHI)
C
      IMPLICIT REAL*8 (A-H,O-Z)
      REAL*8 CUT1(NTSTX),CUT2(NTSTX),
     $ BD(NTSTX,2),RATIO(NPLX,NSCRX)
      INTEGER*4 ITEST(NTSTX),ID(10)
      INTEGER*4 NRLO(NTSTX),NRHI(NTSTX),LO,HI,INUMLO,INUMHI
      INTEGER*2 IDEC,IDECP
      INTEGER NPERM
C
      COMMON /PARCOM/ NPOOL,NTESTS,NITM,NQPT,INFIL,IOUTD,IOUTC,
     $    ILOSS,IVLO,IVHI,IPRNT,CUT,SPREAD,PINC,PRIOR,A,B,C
C
C
C     CALCULATE:
C
C     Idec=1 IF DECISION=NONMASTER
C     Idec=2 IF DECISION=MASTER
C     Idec=3 IF DECISION=CONTINUE
C
C     BD(ISTAGE,1)=LOWER NR SCORE CUT BEFORE ROUNDING
C     BD(ISTAGE,2)=UPPER NR SCORE CUT BEFORE ROUNDING
C
C     NRLO(ISTAGE)=LOWER NR SCORE CUT AFTER ROUNDING
C     NRHI(ISTAGE)=UPPER NR SCORE CUT AFTER ROUNDING
C
C     WRITE TO PERMUTATION FILE ON UNIT INFIL2
C
C
      DO 10 ISTAGE=1,NTESTS
      CUT1(ISTAGE)=CUT1(ISTAGE)/(1D0-CUT1(ISTAGE))
      CUT2(ISTAGE)=CUT2(ISTAGE)/(1D0-CUT2(ISTAGE))
   10 CONTINUE
C
C
```

```
      CALL ZERO(BD,NTESTS,2)
C
C
      ISTAGP=1
      IDECP=1
      PREV=0D0
      PRIOR1=PRIOR/(1D0-PRIOR)
      DO 900 J=1,NSCRX
      ISTAGE=1
      ITEST(ISTAGE)=J-1
      IT=ID(ISTAGE)
      POST=RATIO(IT,J)*PRIOR1
C********** FORCE CONTINUE TESTING AT STAGE 1 **************
      IF (MINT.GT.1) THEN
         IDEC=3
      ELSE
C************OR ALLOW CLASSIFICATION AT STAGE 1 **************
         CALL DECIDE(POST,CUT1(ISTAGE),CUT2(ISTAGE),IDEC)
         CALL
     GETBD(NTSTX,ISTAGE,IDEC,ITEST,ISTAGP,IDECP,ITOT,BD,PREV)
      END IF
      IF (IDEC.EQ.3) THEN
        PRIOR2=POST
        DO 800 J2=1,NSCRX
        ISTAGE=2
        ITEST(ISTAGE)=J2-1
        IT=ID(ISTAGE)
        POST=RATIO(IT,J2)*PRIOR2
        CALL DECIDE(POST,CUT1(ISTAGE),CUT2(ISTAGE),IDEC)
                                                CALL
     GETBD(NTSTX,ISTAGE,IDEC,ITEST,ISTAGP,IDECP,ITOT,BD,PREV)
        IF (IDEC.NE.3) GOTO 800
         PRIOR3=POST
         DO 700 J3=1,NSCRX
         ISTAGE=3
         ITEST(ISTAGE)=J3-1
         IT=ID(ISTAGE)
         POST=RATIO(IT,J3)*PRIOR3
         CALL DECIDE(POST,CUT1(ISTAGE),CUT2(ISTAGE),IDEC)
                                                CALL
     GETBD(NTSTX,ISTAGE,IDEC,ITEST,ISTAGP,IDECP,ITOT,BD,PREV)
         IF (IDEC.NE.3) GOTO 700
          PRIOR4=POST
          DO 600 J4=1,NSCRX
          ISTAGE=4
          ITEST(ISTAGE)=J4-1
          IT=ID(ISTAGE)
          POST=RATIO(IT,J4)*PRIOR4
          CALL DECIDE(POST,CUT1(ISTAGE),CUT2(ISTAGE),IDEC)
                                                CALL
     GETBD(NTSTX,ISTAGE,IDEC,ITEST,ISTAGP,IDECP,ITOT,BD,PREV)
          IF (IDEC.NE.3) GOTO 600
           PRIOR5=POST
           DO 500 J5=1,NSCRX
           ISTAGE=5
           ITEST(ISTAGE)=J5-1
           IT=ID(ISTAGE)
           POST=RATIO(IT,J5)*PRIOR5
           CALL DECIDE(POST,CUT1(ISTAGE),CUT2(ISTAGE),IDEC)
           CALL GETBD(NTSTX,ISTAGE,IDEC,ITEST,ISTAGP,IDECP,ITOT,
     $     BD,PREV)
           IF (IDEC.NE.3) GOTO 500
            PRIOR6=POST
```

```
              DO 400 J6=1,NSCRX
              ISTAGE=6
              ITEST(ISTAGE)=J6-1
              IT=ID(ISTAGE)
              POST=RATIO(IT,J6)*PRIOR6
              CALL DECIDE(POST,CUT1(ISTAGE),CUT2(ISTAGE),IDEC)
              CALL GETBD(NTSTX,ISTAGE,IDEC,ITEST,ISTAGP,IDECP,ITOT,
     $              BD,PREV)
  400       CONTINUE
  500     CONTINUE
  600    CONTINUE
  700   CONTINUE
  800  CONTINUE
      END IF
  900 CONTINUE
C
C                                                     ROUND CUTS
C                                                     FIND UNIQUE NUM.
      ISTRT=1
      IF (MINT.GT.1) THEN
       NRLO(1)=-1
       NRHI(1)=(NTESTS*NITM)+1
       ISTRT=2
      END IF
      N=NTESTS-1
      DO 1030 I=ISTRT,N
      XLO=BD(I,1)
      XHI=BD(I,2)
      CALL RNDA(XLO,XHI,LO,HI)
      NRLO(I)=LO
      NRHI(I)=HI
 1030 CONTINUE
      I=NTESTS
      XLO=BD(I,1)
      XHI=BD(I,2)
      CALL RNDB(XLO,XHI,LO,HI)
      NRLO(I)=LO
      NRHI(I)=HI
C                                                     UPDATE CUT TABLES
      CALL UPCUT(IVLO,NPERM,NTESTS,NRLO,INUMLO,MAXLO)
      CALL UPCUT(IVHI,NPERM,NTESTS,NRHI,INUMHI,MAXHI)
C
C
      IF (NPERM.EQ.0) RETURN
C                                                     UPDATE PERM FILE
      WRITE(INFIL2,'(3I4,6I2)',REC=NPERM) NPERM,INUMLO,INUMHI,
     $   (ID(ISTAGE),ISTAGE=1,6)
C
C
      RETURN
      END
C=========================================================
      SUBROUTINE DECIDE(POST,CUT1,CUT2,IDEC)
      IMPLICIT REAL*8 (A-H,O-Z)
C
      INTEGER*2 IDEC
      IDEC=3
      IF (POST.LT.CUT1) IDEC=1
      IF (POST.GT.CUT2) IDEC=2
      RETURN
      END
C=========================================================
```

```
      SUBROUTINE GETBD(NTSTX,NSTAGE,IDEC,ITEST,ISTAGP,IDECP,ITOT,
     $   BD,PREV)
C
C     IF DECISION = CONTINUE TESTING,RETURN IMMEDIATELY
C
C     IF DECISION = CLASSIFY (EITHER MASTER OR NONMASTER)
C     DO THE FOLLOWING:
C         1) CALCULATE ITOT=TOTAL SCORE
C         2) UPDATE CUTOFF PTS
C            BD(ISTAGE,1)=MAXIMUM TOTAL SCORE AT STAGE ISTAGE
C                        FOR WHICH DECISION WAS NONMASTER
C            BD(ISTAGE,2)=MINIMUM TOTAL SCORE AT STAGE ISTAGE
C                        FOR WHICH DECISION WAS MASTER
C
      IMPLICIT REAL*8 (A-H,O-Z)
C
      REAL*8 BD(NTSTX,2)
      INTEGER*2 IDEC,IDECP
      INTEGER*4 ITEST(NTSTX)
C
      COMMON /PARCOM/ NPOOL,NTESTS,NITM,NQPT,INFIL,IOUTD,IOUTC,
     $   ILOSS,IVLO,IVHI,IPRNT,CUT,SPREAD,PINC,PRIOR,A,B,C
C
C
      IF (IDEC.EQ.3) RETURN
      ITOT=0
      DO 100 ISTAGE=1,NSTAGE
      ITOT=ITOT+ITEST(ISTAGE)
  100 CONTINUE
C
C
C     IF SCORE PATTERN IS NOT A BOUNDARY CONDITION RETURN
C     IF SCORE PATTERN IS A BOUNDARY CONDITION UPDATE
C
      CURR=DBLE(ITOT)
      IF ((IDEC.NE.IDECP).OR.(NSTAGE.NE.ISTAGP)) THEN
         IF (IDECP.EQ.1) THEN
            IF (BD(ISTAGP,IDECP).EQ.0D0) BD(ISTAGP,IDECP)=PREV
            BD(ISTAGP,IDECP)=5D-1*(BD(ISTAGP,IDECP)+PREV)
         END IF
         IF (IDEC.EQ.2) THEN
            IF (BD(NSTAGE,IDEC).EQ.0D0) BD(NSTAGE,IDEC)=CURR
            BD(NSTAGE,IDEC)=5D-1*(BD(NSTAGE,IDEC)+CURR)
         END IF
         ISTAGP=NSTAGE
         IDECP=IDEC
      END IF
      PREV=CURR
C
      RETURN
      END
C================================================================

SUBROUTINE RNDA(XLO,XHI,LO,HI)
      REAL*8 XLO,XHI,XTRUNC,DECPRT
      INTEGER*4 LO,HI
C
      XTRUNC=AINT(XLO)
      DECPRT=XLO-XTRUNC
      IADD=0
      IF (DECPRT.GE.7.5D-1) IADD=1
      LO=INT(XTRUNC)+IADD
```

```
C
      XTRUNC=AINT(XHI)
      DECPRT=XHI-XTRUNC
      IADD=1
      IF (DECPRT.LE.2.5D-1) IADD=0
      HI=INT(XTRUNC)+IADD
C
      RETURN
      END
C==============================================================
      SUBROUTINE RNDB(XLO,XHI,LO,HI)
      REAL*8 XLO,XHI,XTRUNC,DECPRT
      INTEGER*4 LO,HI
C
      XTRUNC=AINT(XLO)
      DECPRT=XLO-XTRUNC
      IADD=0
      IF (DECPRT.GT.5D-1) IADD=1
      LO=INT(XTRUNC)+IADD
      HI=LO+1
C
      RETURN
      END
C==============================================================
      SUBROUTINE UPCUT(IV,NPERM,NTESTS,NR,INUM,LSTREC)
      INTEGER*4 NR(NTESTS),ITST(6)
C
C     UPDATE FILE OF CUTSCORES IN NR METRIC
C
      IREC=1
      IF (NPERM.EQ.0) GO TO 190
      IREC=0
  100 IREC=IREC+1
C                             IF ATTEMPTED TO READ PAST LAST REC
C                                THERE IS NO MATCH SO WRITE
C                                THIS SET OF CUTS IN THAT RECORD
      IF (IREC.GT.LSTREC) GO TO 190
C
      READ(IV,'(6I4)',REC=IREC) (ITST(I),I=1,NTESTS)
C
C                             ELSE CHECK IF RECORD IS A MATCH
      I=0
  120 I=I+1
C                             IF I>NTESTS THIS IS A MATCH
      IF (I.GT.NTESTS) GOTO 200
C                             IF I<=NTESTS CONTINUE TO CHK
C                             AND IF REQUIRED, GET NEXT RECORD
      IF (NR(I).EQ.ITST(I)) GO TO 120
      GO TO 100
C
C                             EOF AND NO MATCH
C                             SO WRITE NEW RECORD TO FILE
  190 CONTINUE
      WRITE(IV,'(6I4)',REC=IREC) (NR(I),I=1,NTESTS)
      LSTREC=IREC
C
C                                      STORE NUMBER OF MATCHING
C                                      RECORD IN NUMCUT
  200 INUM=IREC
      RETURN
      END
C==============================================================
```

```
      SUBROUTINE
TRANCUT(IVLO,IVHI,IOUTC,IOUTD,NTESTS,MAXLO,MAXHI)
      INTEGER*4 NR(6)
C
C     TRANSFER CUTS FROM EXTERNAL FILE TO VDISKS IVLO AND IVHI
C
      READ(IOUTC,'(5X,6I4)') MAXLO,MAXHI
      WRITE(IOUTD,'(A)') 'FOR PREVIOUSLY PROCESSED PERMUTATIONS:'

WRITE(IOUTD,'(A29,I4)') '   NUMBER OF UNIQUE LOWER
CUTS=',MAXLO
      WRITE(IOUTD,'(A29,I4)') '   NUMBER OF UNIQUE UPPER
CUTS=',MAXHI
C
      DO 100 IREC=1,MAXLO
      READ(IOUTC,'(5X,6I4)') (NR(I),I=1,NTESTS)
      WRITE(IVLO,'(6I4)',REC=IREC) (NR(I),I=1,NTESTS)
  100 CONTINUE
C
      DO 200 IREC=1,MAXHI
      READ(IOUTC,'(5X,6I4)') (NR(I),I=1,NTESTS)
      WRITE(IVHI,'(6I4)',REC=IREC) (NR(I),I=1,NTESTS)
  200 CONTINUE
C
      REWIND(IOUTC)
      RETURN
      END
C ================================================================
      SUBROUTINE MYPRNT(IOUTD,NPERM,NTSTX,NRLO,NRHI,BD)
      REAL*8 BD(NTSTX,2)
      INTEGER*4 NRLO(NTSTX),NRHI(NTSTX)
C
      WRITE(IOUTD,'(A)') '--------------------------------------'
      WRITE(IOUTD,'(A33,I4)') '   CUT SCORES FOR PERMUTATION
NUMBER',NPERM
      WRITE(IOUTD,'(A)') '--------------------------------------'
      DO 100 I=1,NTSTX
      WRITE(IOUTD,90) I,NRLO(I),NRHI(I),BD(I,1),BD(I,2)
   90 FORMAT(3I4,2X,2F8.4)
  100 CONTINUE
C
      RETURN
      END
C================================================================
      SUBROUTINE ZERO(ARRAY,NROW,NCOL)
      REAL*8 ARRAY(NROW,NCOL)
C
      DO 100 I=1,NROW
      DO  80 J=1,NCOL
      ARRAY(I,J)=0D0
   80 CONTINUE
  100 CONTINUE
      RETURN
      END
C ================================================================
      SUBROUTINE IZERO(IARRAY,NROW,NCOL)
      INTEGER*4 IARRAY(NROW,NCOL)
C
      DO 100 I=1,NROW
      DO  80 J=1,NCOL
      IARRAY(I,J)=0
   80 CONTINUE
```

```
  100 CONTINUE
      RETURN
      END
C =============================================================
      FUNCTION PROBP(THETA,A,B,C)
      IMPLICIT REAL*8 (A-H,O-Z)
      P=1D0/(1D0+DEXP(1.7D0*A*(B-THETA)))
      P=C+(1D0-C)*P
      IF (P.LT.0.0000001) P=.0000001
      IF (P.GT.0.999999) P=0.999999
      PROBP=P
      RETURN
      END
C =============================================================
      SUBROUTINE MYTIM(IOUTD)
      INTEGER*2 IHR,IMIN,ISEC,I100TH,IYR,IMON,IDAY
C
      CALL GETTIM(IHR,IMIN,ISEC,I100TH)
      WRITE(IOUTD,100) IHR,IMIN,ISEC
  100 FORMAT(' CURRENT TIME IS (HR:MIN:SEC) ',I2,':',I2,':',I2)
C
      CALL GETDAT(IYR,IMON,IDAY)
      WRITE(IOUTD,200) IYR,IMON,IDAY
  200 FORMAT(' CURRENT DATE IS (YR:MON:DAY) ',I4,':',I2,':',I2)
C
      RETURN
      END
^Z
```

CMT CUTSCORE VALIDATION PROGRAM

FORTRAN source code for Step 1A of the Cutscore Validation Program (Determine Theta Values to Use for Simulation).[2]

```fortran
c      STEP 1A - DETERMINE THETA POINTS TO USE FOR SIMULATION
c
c      K. SHEEHAN
c
       REAL*8 DV(5000)
       INTEGER*4 IV(1000)
       LOGICAL MYERR
       IALR8=5000
       IALI4= 1000
       MYERR=.FALSE.
       CALL CONTRL(MYERR,DV,IALR8,IV,IALI4)
       STOP
       END
C  ===============================================================

SUBROUTINE CONTRL(MYERR,DV,IALR8,IV,IALI4)
       IMPLICIT REAL*8 (A-H,O-Z)
       REAL*8 DV(1)
       INTEGER*4 IV(1)
       LOGICAL MYERR
       CHARACTER*64 FNAME1,FNAME2,FOUT
       COMMON /PARCOM/ NI,NPTS,TLO,THI
       COMMON /FILCOM/ IFIL1,IFIL2,IOUT
       COMMON /KPTRS/KA,KB,KC,KTHET,KTCC,KPCC,KTVEC,KWT
c
c                                             INITIALIZE PARAMS
       IFIL1=10
       IFIL2=11
       IOUT=12
       NI=60
       NPTS=500
       TLO=-7.0
       THI=5.0
c
       WRITE(*,'(A)') ' CMT CUTSCORE VALIDATION PROGRAM - STEP 1'
       WRITE(*,'(A)') '  CALCULATE  THETA  POINTS  TO  USE  FOR
      SIMULATION'
       WRITE(*,'(A)') ' '

5  CONTINUE
       WRITE(*,'(A)') ' LIST OF INPUT PARAMETERS '
       WRITE(*,'(A)') ' '

WRITE(*,'(A24,I3)')    ' 1.   NUMBER OF ITEMS= ',NI
       WRITE(*,'(A24,I3)')    ' 2.   NUMBER OF POINTS=',NPTS
       WRITE(*,'(A24,F5.2)')  ' 3.   LOWER THETA=     ',TLO
       WRITE(*,'(A24,F5.2)')  ' 4.   UPPER THETA=     ',THI
       WRITE(*,'(A)') ' '
       WRITE(*,'(A)') ' ENTER NUMBER OF PARAMETER TO CHANGE '
       WRITE(*,'(A)') ' USE I1 FORMAT (0=NO CHANGES REQUIRED) '
       READ(*,'(I1)') NUM
       IF (NUM.EQ.0) GO TO 100
       IF (NUM.GT.4) GO TO 5
```

---

[2] © Educational Testing Service, 1989

```
      WRITE(*,'(A)')  ' ENTER NEW VALUE (I4) OR (F5.2)'
      GOTO (10,20,30,40) NUM
   10 READ(*,'(I4)') NI
      GO TO 5
   20 READ(*,'(I4)') NPTS
      GO TO 5
   30 READ(*,'(F5.2)') TLO
      GO TO 5
   40 READ(*,'(F5.2)') THI
      GO TO 5
  100 CONTINUE
C
C                                              DEFINE POINTERS
      CALL DYNSUB(NEEDR8,NEEDI4)
C
      WRITE(*,6000) NEEDR8,IALR8,NEEDI4,IALI4
 6000 FORMAT('1OUTPUT REPORT FOR DYNAMIC SPACE ALLOCATOR'/
     $       ' ',I6,' REAL*8 WORDS NEEDED OF',I6,' AVAILABLE'/
     $       ' ',I6,' INT*4  WORDS NEEDED OF',I6,' AVAILABLE')
C
C                                              ENOUGH SPACE ??
      IF (NEEDR8.GT.IALR8) MYERR=.TRUE.
      IF (NEEDI4.GT.IALI4) MYERR=.TRUE.
      IF (MYERR) RETURN
      CONTINUE
C                                              OPEN INPUT FILES
C
      WRITE(*,'(A)')
      WRITE(*,6005)
 6005 FORMAT(' ****  THIS PGM REQUIRES TWO INPUT FILES    ****'/
     $       ' *  (1) A FILE OF 3PL ITEM PARAMETERS          *'/
     $       ' *         (A(J),B(J),C(J),J=1,NI)             *'/
     $       ' *       WITH FORMAT CARD AS THE 1ST RECORD    *'/
     $       ' *  (2) A FILE OF RAW SCORE WEIGHTS            *'/
     $       ' *         (ISCORE(J),WT(J),J=1,NI)            *'/
     $       ' *       WITH FORMAT CARD AS THE 1ST RECORD    *'//)

WRITE(*,'(A)') ' Enter Name of FIRST Input File '
      read(*,'(a)') FNAME1
      OPEN (IFIL1,FILE=FNAME1,ACCESS='SEQUENTIAL',STATUS='OLD')
C
      WRITE(*,'(A)') ' Enter Name of SECOND Input File '
      read(*,'(a)') FNAME2
      OPEN (IFIL2,FILE=FNAME2,ACCESS='SEQUENTIAL',STATUS='OLD')
C
C                                              OPEN OUTPUT FILE
C                                              WRITE PARAMS
C                                              FOR RUN DOCUMENTATION
C
      WRITE(*,'(A)') ' Enter Output File Name '
      read(*,'(a)') FOUT
      OPEN (IOUT,FILE=FOUT,ACCESS='SEQUENTIAL',STATUS='NEW')
      WRITE(IOUT,'(A)') ' --------------------'
      WRITE(IOUT,'(A)') ' LIST OF INPUT FILES'
      WRITE(IOUT,'(A)') ' --------------------'
      WRITE(IOUT,'(1X,A)') FNAME1
      WRITE(IOUT,'(1X,A)') FNAME2
      WRITE(IOUT,'(A)') ' ---------------------------'
      WRITE(IOUT,'(A)') ' LIST OF PROGRAM PARAMETERS'
      WRITE(IOUT,'(A)') ' ---------------------------'
      WRITE(IOUT,6010) NI,NPTS,TLO,THI
 6010 FORMAT(' NI=',I4/' NPTS=',I4/
     $       ' TLO=',F5.2/' THI=',F5.2/)
```

```
C
C
C
C                                              DEFINE DUMMY PARAMS
C                                                FOR ARRAY SIZES
      NPTSX=NPTS
      NITMX=NI
C                                              READ ITM PARAMS
C                                              FROM INPUT FILE #1
C                                              AND WEIGHTS
C                                              FROM INPUT FILE #2
      CALL INIT1(NPTSX,NITMX,DV(KA),DV(KB),DV(KC),
     $    DV(KTHET),DV(KWT))
C
C                                                CALCULATE
C                                                TCC
      CALL GETTCC(NPTSX,NITMX,DV(KA),DV(KB),DV(KC),
     $    DV(KTHET),DV(KTCC),DV(KPCC))
C
C
C                                              C   A   L   L
      GETTAB(NPTSX,NITMX,DV(KTHET),DV(KTCC),DV(KTVEC),DV(KWT))
C
C
      RETURN
      END
C ================================================================

SUBROUTINE DYNSUB(NEEDR8,NEEDI4)
C
C     SET UP POINTERS FOR REAL*8 DATA STORED IN DV
C                     AND I*4    DATA STORED IN IV
C
      IMPLICIT REAL*8 (A-H,O-Z)
      COMMON /PARCOM/ NI,NPTS,TLO,THI
      COMMON /FILCOM/ IFIL1,IFIL2,IOUT
      COMMON /KPTRS/KA,KB,KC,KTHET,KTCC,KPCC,KTVEC,KWT
C
C
C
      KA    = 1
      KB    = KA    + NI
      KC    = KB    + NI
      KP    = KC    + NI
      KTHET = KP    + NI
      KTCC  = KTHET+ NPTS
      KPCC  = KTCC+  NPTS
      KTVEC = KPCC+  NPTS
      KWT   = KTVEC+ NI
      NEEDR8= KWT + NI
C
C
C
C
      NEEDI4= 1
C
C
      RETURN
      END
C ================================================================
```

```
      SUBROUTINE INIT1(NPTSX,NITMX,A,B,C,THETA,WT)
      IMPLICIT REAL*8 (A-H,O-Z)
      REAL*8 A(NITMX),B(NITMX),C(NITMX),THETA(NPTSX),WT(NITMX)
      CHARACTER*70 FMT
C
      COMMON /PARCOM/ NI,NPTS,TLO,THI
      COMMON /FILCOM/ IFIL1,IFIL2,IOUT
C
C
C
C                                              READ ITEM PARAMS
      T=0D0
      WRITE(IOUT,'(A)') ' ---------------------------------------'
      WRITE(IOUT,'(A)') ' LIST OF ITEM PARMAMETERS  P(CORRECT/0)'
      WRITE(IOUT,'(A)') ' ---------------------------------------'
      READ(IFIL1,'(A70)') FMT
      DO 100 J=1,NI
      READ(IFIL1,FMT) A(J),B(J),C(J)
      P=PROBP(T,A(J),B(J),C(J))
      WRITE(IOUT,'(I4,4F9.5)') J,A(J),B(J),C(J),P
  100 CONTINUE
C
C
C                                              CALC THETAS
C
      TINC=(THI-TLO)/DFLOAT(NPTS-1)
      THETA(1)=TLO
      DO 200 I=2,NPTS
      THETA(I)=THETA(I-1)+TINC
  200 CONTINUE
C
C
C
C                                              READ WEIGHTS
      CALL ZERO(NI,WT)
      TOTWT=0D0
      READ(IFIL2,'(A70)') FMT
  300 CONTINUE
      READ(IFIL2,FMT,END=400) ISCR,WEIGHT
      IF (ISCR.LT.1) GO TO 300
      IF (ISCR.GT.NI) GO TO 300
      WT(ISCR)=WEIGHT
      TOTWT=TOTWT+WT(ISCR)
      GOTO 300
  400 CONTINUE
C
C     DO 500 I=1,NI
C     WT(I)=WT(I)/TOTWT
C 500 CONTINUE
C
      WRITE(IOUT,'(A)') ' ---------------------------------------'
      WRITE(IOUT,'(A25,F10.2)') ' SUM OF WEIGHTS=',TOTWT
      WRITE(IOUT,'(A)') ' ---------------------------------------'
C
      RETURN
      END
C=================================================================
      FUNCTION PROBP(THETA,A,B,C)
      REAL*8 PROBP,THETA,A,B,C,P
```

```
      P=1D0/(1D0+DEXP(1.7D0*A*(B-THETA)))
      IF (P.LT.0.0000001) P=.0000001
      IF (P.GT.0.999999) P=0.999999
      P=C+(1D0-C)*P
      PROBP=P
      RETURN
      END
C ================================================================
      SUBROUTINE GETTCC(NPTSX,NITMX,A,B,C,THETA,TCC,PCC)
C
      IMPLICIT REAL*8 (A-H,O-Z)
      REAL*8 A(NITMX),B(NITMX),C(NITMX)
      REAL*8 THETA(NPTSX),TCC(NPTSX),PCC(NPTSX)
C
      COMMON /PARCOM/ NI,NPTS,TLO,THI
      COMMON /FILCOM/ IFIL1,IFIL2,IOUT
C
C
C
C
C
C                                                    CALCULATE
C                                                    TCC
      DNI=DFLOAT(NI)
      DO 350 I=1,NPTS
      TCC(I)=0D0
      T=THETA(I)
      DO 300 J=1,NI
      PC=PROBP(T,A(J),B(J),C(J))
      TCC(I)=TCC(I)+PC
  300 CONTINUE
      PCC(I)=TCC(I)/DNI
  350 CONTINUE
C
C
C
C
      WRITE(IOUT,'(A)') ' ----------------------------------'
      WRITE(IOUT,'(A)') ' THETA     E(NR)      E(PROP(CORRECT))'
      WRITE(IOUT,'(A)') ' ----------------------------------'
      DO 400 I=1,NPTS
      WRITE(IOUT,'(1X,3F10.4)') THETA(I),TCC(I),PCC(I)
  400 CONTINUE
C
C
C
      RETURN
      END
C ================================================================
      SUBROUTINE GETTAB(NPTSX,NITMX,THETA,TCC,TVEC,WT).
C
      IMPLICIT REAL*8 (A-H,O-Z)
      REAL*8 THETA(NPTSX),TCC(NPTSX),TVEC(NITMX),WT(NITMX)
C
      COMMON /PARCOM/ NI,NPTS,TLO,THI
      COMMON /FILCOM/ IFIL1,IFIL2,IOUT
C
C
      CALL ZERO(NITMX,TVEC)
C
      DO 1000 I=2,NPTS
      RPREV=AINT(TCC(I-1))
      RCURR=AINT(TCC(I))
```

```
      DIFF=RCURR-RPREV
      IF (DIFF.EQ.1D0) THEN
        IRAW=INT(RCURR)
        ADD=(THETA(I)-THETA(I-1))*(RCURR-TCC(I-1))
        ADD=ADD/(TCC(I)-TCC(I-1))
        TVEC(IRAW)=THETA(I-1)+ADD
      END IF
 1000 CONTINUE
C
C
      WRITE(IOUT,'(A)') ' ------------------------------------'
      WRITE(IOUT,'(A)') ' RAW SCORE         THETA      WEIGHT'
      WRITE(IOUT,'(A)') ' ------------------------------------'
      DO 2000 I=1,NI
      WRITE(IOUT,'(1X,I8,F10.4,F12.4)') I,TVEC(I),WT(I)
 2000 CONTINUE
C
C
      RETURN
      END
C===========================================================
      SUBROUTINE ZERO(NROW,VEC)
      REAL*8 VEC(NROW)
      DO 100 I=1,NROW
      VEC(I)=0D0
  100 CONTINUE
      RETURN
      END
^Z
```

FORTRAN source code for Step 1B of the
Cutscore Validation Program
(Generate simulate responses).[3]

```fortran
c       CMT CUTSCORE VALIDATION PROGRAM - STEP 1B
c       CREATE FILE OF SIMULATED RESPONSES (AS IF FROM CMT)
c
c       K. SHEEHAN
c
c
c
        REAL*8 DV(20000)
        INTEGER*4 IV(100)
        LOGICAL MYERR
        IALR8=20000
        IALI4= 100
        MYERR=.FALSE.
        CALL CONTRL(MYERR,DV,IALR8,IV,IALI4)
        STOP
        END
c  ==============================================================

SUBROUTINE CONTRL(MYERR,DV,IALR8,IV,IALI4)
        IMPLICIT REAL*8 (A-H,O-Z)
        REAL*8 DV(1)
        REAL*4 R(1000)
        INTEGER*4 IV(1)
        LOGICAL MYERR
        CHARACTER*24 FNAME1,FNAME2,FNAME3,FNAME4
        CHARACTER*6 FIRST
        COMMON /PARCOM/ NPOOL,NTESTS,NITM,NTHET,NREP
        COMMON /FILCOM/ IFIL1,IFIL2,IOUT,IOUT2
        COMMON /KPTRS/KA,KB,KC,KP,KTHET,KWT,KSCR,KRAW,kavg
c
c                                                 INITIALIZE PARAMS
        IFIL1=10
        IFIL2=11
        IOUT=12
        IOUT2=13
        NPOOL=6
        NTESTS=6
        NITM=10
        NTHET=47
        NREP=5
        DSEED=1.D0
c
        WRITE(*,'(A)') ' PROGRAM = SIMDAT2.FOR'
        WRITE(*,'(A)') ' GENERATE SIMULATED RESPONSE VECTORS'
        WRITE(*,'(A)') ' FOR CMT-TYPE DATA   '

WRITE(*,'(A)')
  5     CONTINUE
        WRITE(*,'(A)') ' LIST OF INPUT PARAMETERS '
        WRITE(*,'(A)')  '

WRITE(*,'(A21,I4)')    ' 1.  SIZE OF POOL=     ',NPOOL
        WRITE(*,'(A21,I4)')    ' 2.  MAX # TESTS=      ',NTESTS
        WRITE(*,'(A21,I4)')    ' 3.  NUMBER OF ITEMS=',NITM
        WRITE(*,'(A21,I4)')    ' 4.  NUMBER OF THETAS=',NTHET
        WRITE(*,'(A21,I4)')    ' 5.  NUMBER OF REPS=   ',NREP
```

---

[3] ©Educational Testing Serviec, 1989

```fortran
      WRITE(*,'(A21,F8.2)')   ' 6.  SEED FOR R.N.G.=',DSEED
      WRITE(*,'(A)')  '                                        '
      WRITE(*,'(A)')  ' ENTER NUMBER OF PARAMETER TO CHANGE '
      WRITE(*,'(A)')  ' USE I1 FORMAT (0=NO CHANGES REQUIRED) '
      READ(*,'(I1)') NUM
      IF (NUM.EQ.0) GO TO 100
      IF (NUM.GT.6) GO TO 5
      WRITE(*,'(A)')  ' ENTER NEW VALUE (I4) OR (F8.2)'
      GOTO (10,20,30,40,50,60) NUM
   10 READ(*,'(I4)') NPOOL
      GO TO 5
   20 READ(*,'(I4)') NTESTS
      GO TO 5
   30 READ(*,'(I4)') NITM
      GO TO 5
   40 READ(*,'(I4)') NTHET
      GO TO 5
   50 READ(*,'(I4)') NREP
      GO TO 5
   60 READ(*,'(F8.2)') DSEED
      GO TO 5
  100 CONTINUE
C
C                                             DEFINE POINTERS
      CALL DYNSUB(NEEDR8,NEEDI4)
C
      WRITE(*,6000) NEEDR8,IALR8,NEEDI4,IALI4
 6000 FORMAT('1OUTPUT REPORT FOR DYNAMIC SPACE ALLOCATOR'/
     $        ' ',I6,' REAL*8 WORDS NEEDED OF',I6,' AVAILABLE'/
     $        ' ',I6,' INT*4  WORDS NEEDED OF',I6,' AVAILABLE')
C
C                                             ENOUGH SPACE ??
      IF (NEEDR8.GT.IALR8) MYERR=.TRUE.
      IF (NEEDI4.GT.IALI4) MYERR=.TRUE.
      IF (MYERR) RETURN
      CONTINUE
C                                             OPEN INPUT FILES
C
      WRITE(*,'(A)')
      WRITE(*,6005)
 6005 FORMAT(' ****   THIS PGM REQUIRES TWO INPUT FILES   ****'/
     $        ' *      (1) ITEM PARAMETERS                     *'/
     $        ' *          (ID(J),A(J),B(J),C(J),J=1,NI)       *'/
     $        ' *      (2) THETAS AND WEIGHTS                  *'/
     $        ' *          (RAW(I),THETA(I),WT(I) I=1,NTHET)   *'/
     $        ' *** WITH FORMAT CARD AS THE FIRST RECORD ***'//)
      WRITE(*,'(A)')  ' Enter Name of Input File #1 '
      read(*,'(a)') FNAME1
      OPEN (IFIL1,FILE=FNAME1,ACCESS='SEQUENTIAL',STATUS='OLD')
C
      WRITE(*,'(A)')  ' Enter Name of Input File #2 '
      read(*,'(a)') FNAME2
      OPEN (IFIL2,FILE=FNAME2,ACCESS='SEQUENTIAL',STATUS='OLD')
C                                             OPEN OUTPUT FILE
C                                             WRITE PARAMS
C                                             FOR RUN DOCUMENTATION
C
      WRITE(*,'(A)')
      WRITE(*,'(A)')  ' This pgm creates TWO Output Files:'
      WRITE(*,'(A)')  ' 1) filnam.DOC = Run Documentation'
      WRITE(*,'(A)')  ' 2) filnam.SIM = Simulated Data'
      WRITE(*,'(A)')
```

```
      WRITE(*,'(A)') ' Enter filnam (Six characters, no dot)'
      read(*,'(A6)') FIRST
      FNAME3=FIRST//'.DOC'
      OPEN (IOUT,FILE=FNAME3,ACCESS='SEQUENTIAL',STATUS='NEW')
      FNAME4=FIRST//'.SIM'
      OPEN (IOUT2,FILE=FNAME4,ACCESS='SEQUENTIAL',STATUS='NEW')
      WRITE(IOUT,'(A)') ' ---------------------------'
      WRITE(IOUT,'(A)') ' LIST OF INPUT FILE NAMES'
      WRITE(IOUT,'(A)') ' ---------------------------'
      WRITE(IOUT,'(1X,A)') FNAME1
      WRITE(IOUT,'(1X,A)') FNAME2
      WRITE(IOUT,'(A)') ' ---------------------------'
      WRITE(IOUT,'(A)') ' LIST OF OUTPUT FILE NAMES'
      WRITE(IOUT,'(A)') ' ---------------------------'
      WRITE(IOUT,'(1X,A)') FNAME3
      WRITE(IOUT,'(1X,A)') FNAME4
      WRITE(IOUT,'(A)') ' ---------------------------'
      WRITE(IOUT,'(A)') ' LIST OF PROGRAM PARAMETERS'
      WRITE(IOUT,'(A)') ' ---------------------------'
      WRITE(IOUT,6010) NPOOL,NTESTS,NITM,NTHET,NREP,DSEED
 6010 FORMAT(' NPOOL=',I4/' NTESTS=',I4/' NITM=',I4/
     $       ' NTHET=',I4/' NREP=',I4/' DSEED=',F8.2/)
C
C
C
C                                               DEFINE DUMMY PARAMS
C                                                FOR ARRAY SIZES
      NPLX=NPOOL
      NITMX=NITM
      NTHETX=NTHET
C                                               READ ITM PARAMS
C                                                FROM INPUT FILE #1
C                                                AND THETAS
C                                                FROM INPUT FILE #2
      CALL INIT1(NPLX,NITMX,NTHETX,DV(KA),DV(KB),DV(KC),
     $    DV(KTHET),DV(KWT),DV(KRAW))
C
C                                               GENERATE
C                                                RESPONSE
C                                                VECTORS
      CALL GEN(NPLX,NITMX,NTHETX,NRX,IV(KSCR),R,DSEED,
     $    DV(KTHET),DV(KWT),DV(KP),DV(KA),DV(KB),DV(KC),
     $    DV(KRAW),DV(KAVG))
C
C
      RETURN
      END
C ==============================================================

SUBROUTINE DYNSUB(NEEDR8,NEEDI4)
C
C     SET UP POINTERS FOR REAL*8 DATA STORED IN DV
C                     AND I*4    DATA STORED IN IV
C
      IMPLICIT REAL*8 (A-H,O-Z)
      COMMON /PARCOM/ NPOOL,NTESTS,NITM,NTHET,NREP
      COMMON /FILCOM/ IFIL1,IFIL2,IOUT,IOUT2
      COMMON /KPTRS/ KA,KB,KC,KP,KTHET,KWT,KSCR,KRAW,KAVG
C
C
      NTOT=NPOOL*NITM
```

```
C
       KA    = 1
       KB    = KA    +  NTOT
       KC    = KB    +  NTOT
       KTHET = KC    +  NTOT
       KWT   = KTHET+  NTHET
       KP    = KWT   +  NTHET
       KRAW  = KP    +  NTOT
       KAVG  = KRAW  +  NTHET
       NEEDR8= KAVG  +  NTHET
C
C
C
C

KSCR  = 1
       NEEDI4= KSCR +  NPOOL
C
C

RETURN
       END
C ================================================================
       SUBROUTINE INIT1(NPLX,NITMX,NTHETX,A,B,C,THETA,WT,RAW)
       IMPLICIT REAL*8 (A-H,O-Z)
       REAL*8 A(NPLX,NITMX),B(NPLX,NITMX),C(NPLX,NITMX),
     $   THETA(NTHETX),WT(NTHETX),RAW(NTHETX)
       CHARACTER*70 FMT
C
       COMMON /PARCOM/ NPOOL,NTESTS,NITM,NTHET,NREP
       COMMON /FILCOM/ IFIL1,IFIL2,IOUT,IOUT2
C
C
C
C
C                                              READ ITEM PARAMS
       WRITE(IOUT,'(A)') ' ---------------------------'
       WRITE(IOUT,'(A)') ' LIST OF ITEM PARMAMETERS'
       WRITE(IOUT,'(A)') ' ---------------------------'
       READ(IFIL1,'(A70)') FMT
       DO 102 I=1,NPOOL
       DO 100 J=1,NITM
       READ(IFIL1,FMT) A(I,J),B(I,J),C(I,J)
       WRITE(IOUT,'(2I4,3F9.5)') I,J,A(I,J),B(I,J),C(I,J)
  100 CONTINUE
  102 CONTINUE
C
C
C                                              READ THETAS
C                                              AND WEIGHTS
C                                              CALC P(CORRECT)
       WRITE(IOUT,'(A)') ' ---------------------------'
       WRITE(IOUT,'(A)') '   RAW      THETA     WEIGHT'
       WRITE(IOUT,'(A)') ' ---------------------------'
       READ(IFIL2,'(A70)') FMT
       DO 500 K=1,NTHET
       READ(IFIL2,FMT) RAW(K),THETA(K),WT(K)
       WRITE(IOUT,'(1X,3F10.4)') RAW(K),THETA(K),WT(K)
  500 CONTINUE
C
C
C
C
C
C
```

```
      RETURN
      END
C================================================================
      FUNCTION PROBP(THETA,A,B,C)
      REAL*8 PROBP,THETA,A,B,C,P
      P=1D0/(1D0+DEXP(1.7D0*A*(B-THETA)))
      IF (P.LT.0.0000001) P=.0000001
      IF (P.GT.0.999999) P=0.999999
      P=C+(1D0-C)*P
      PROBP=P
      RETURN
      END
C ===============================================================
      SUBROUTINE GEN(NPLX,NITMX,NTHETX,NRX,ISCR,R,DSEED,
     $    THETA,WT,P,A,B,C,RAW,AVG)
C
      IMPLICIT REAL*8 (A-H,O-Z)
      INTEGER ISCR(NPLX),ITEMP(5)
      REAL*4 R(1000)
      REAL*8
     P(NPLX,NITMX),A(NPLX,NITMX),B(NPLX,NITMX),C(NPLX,NITMX),
     $    THETA(NTHETX),WT(NTHETX),PTEMP(5),RTEMP(5),
     $    RAW(NTHETX),AVG(NTHETX)
C
      COMMON /PARCOM/ NPOOL,NTESTS,NITM,NTHET,NREP
      COMMON /FILCOM/ IFIL1,IFIL2,IOUT,IOUT2
C
C
C
C                                                    GENERATE
C                                                    RESPONSES
      NEXT=1000
      DN=DFLOAT(NREP)
      AN=DN*DFLOAT(NPOOL)
      DO 500 K=1,NTHET
      T=THETA(K)
      W=WT(K)/DN
      AVG(K)=0D0
      DO 200 I=1,NPOOL
      DO 100 J=1,NITM
      P(I,J)=PROBP(T,A(I,J),B(I,J),C(I,J))
  100 CONTINUE
  200 CONTINUE
      DO 400 IREP=1,NREP
      ISUB=NREP*(K-1)+IREP
      DO 300 I=1,NPOOL
      ISCR(I)=0
      DO 280 J=1,NITM
      NEXT=NEXT+1
      IF (NEXT.GT.1000) THEN
          CALL GGUBS(DSEED,1000,R)
          NEXT=1
      END IF
      DIGIT=DBLE(R(NEXT))
      IX=0
      IF (DIGIT.LT.P(I,J)) IX=1
      ISCR(I)=ISCR(I)+IX
      IF ((K.EQ.1).AND.(NEXT.LE.5)) THEN
          ITEMP(NEXT)=IX
          PTEMP(NEXT)=P(I,J)
          RTEMP(NEXT)=DIGIT
      END IF
  280 CONTINUE
      AVG(K)=AVG(K)+DFLOAT(ISCR(I))
```

```
  300 CONTINUE
      WRITE(IOUT2,1000) ISUB,K,IREP,W,(ISCR(I),I=1,NPOOL)
  400 CONTINUE
      AVG(K)=AVG(K)/AN
  500 CONTINUE
C
C
      WRITE(IOUT,'(A)') ' ----------------------------------------'
      WRITE(IOUT,'(A)') '      P+       DIGIT       RESPONSE'
      WRITE(IOUT,'(A)') ' ----------------------------------------'
      DO 600 IR=1,5
      WRITE(IOUT,'(2F8.4,I6)') PTEMP(IR),RTEMP(IR),ITEMP(IR)
  600 CONTINUE
C
C
      WRITE(IOUT,'(A)') ' ----------------------------------------'
      WRITE(IOUT,'(A)') '   RAW SCORE    AVG SIMULATED SCORE'
      WRITE(IOUT,'(A)') ' ----------------------------------------'
      DO 700 K=1,NTHET
      WRITE(IOUT,'(1X,2F8.1)') RAW(K),AVG(K)
  700 CONTINUE
C
      RETURN
C
 1000 FORMAT(I6,2I4,F8.3,10I4)
C
C
C
      END
C===============================================================
      SUBROUTINE GGUBS(DSEED,NR,R)
C
C     RANDOM NUMBER GENERATOR (COPY OF PC-IMSL SOURCE)
C
      INTEGER NR
      REAL*4  R(NR)
      REAL*8  DSEED,D2P31M,D2P31
      DATA D2P31M/2147483647.D0/
      DATA D2P31/2147483648.D0/
C
C
      DO 5 I=1,NR
      DSEED=DMOD(16807.D0*DSEED,D2P31M)
      R(I)=DSEED/D2P31
    5 CONTINUE
C
C
      RETURN
      END
^Z
```

FORTRAN source code for Steps 2 and 3 of the
Cutscore Validation Program
(Estimate Operating Characsteristics).[4]

```fortran
c      CMT CUTSCORE VALIDATION PROGRAM - STEPS 2 and 3
c      APPLY ESTIMATED DECISION RULE
c      ESTIMATE OPERATING CHARACTERISTICS
c
c      K. SHEEHAN
c
c
       REAL*4 RV(1000)
       INTEGER*4 IV(10000)
       LOGICAL MYERR
       IALR4=1000
       IALI4= 10000
       MYERR=.FALSE.
       CALL CONTRL(MYERR,RV,IALR4,IV,IALI4)
       STOP
       END
C ==========================================================

SUBROUTINE CONTRL(MYERR,RV,IALR4,IV,IALI4)
       REAL*4 RV(1)
       INTEGER*4 IV(1)
       LOGICAL MYERR
                      C H A R A C T E R * 2 4
FNAME1,FNAME2,FNAME3,FNAME4,FNAME5,FNAME6,FNAME7
       CHARACTER*6 FIRST
       COMMON /PARCOM/ NPOOL,NTESTS,NITM,NTHET,NREP,NPERM,
     $      INUMLO,INUMHI,CUT,NLOWT,NHIWT
       COMMON /FILCOM/ IFIL1,IFIL2,IFIL3,IFIL4,IOUT1,IOUT2,IOUT3
       COMMON /KPTRS/KCLO,KCHI,KSCR,KFREQ,KID,KMEQ,KMNE,KSAM,KR,
     $      KRAW,KTHET,KWT,KLENA,KLENB,KFLA,KFLB,KTABA,KTABB
C
C                                                INITIALIZE PARAMS
       IFIL1=10
       IFIL2=11
       IFIL3=12
       IFIL4=13
       IOUT1=14
       IOUT2=15
       IOUT3=16
       NPOOL=6
       NTESTS=6
       NITM=10
       NTHET=45
       NREP=100
       NPERM=720
       INUMLO=16
       INUMHI=15
       NLOWT=0
       NHIWT=0
       CUT=-.22
C
       WRITE(*,'(A)') ' CMT CUTSCORE VALIDATION PROGRAM - STEP 3'
       WRITE(*,'(A)') ' ESTIMATE OPERATING CHARACTERISTICS'
       WRITE(*,'(A)')
    5  CONTINUE
```

---

[4] ©Educational Testing Service, 1989

```
      WRITE(*,'(A)') ' LIST OF INPUT PARAMETERS '
      WRITE(*,'(A)') '                          '
      WRITE(*,'(A23,I4)')  ' 1.  SIZE OF POOL=     ',NPOOL
      WRITE(*,'(A23,I4)')  ' 2.  MAX # TESTS=      ',NTESTS
      WRITE(*,'(A23,I4)')  ' 3.  NUMBER OF ITEMS=  ',NITM
      WRITE(*,'(A23,I4)')  ' 4.  NUMBER OF THETAS=',NTHET
      WRITE(*,'(A23,I4)')  ' 5.  NUMBER OF REPS=   ',NREP
      WRITE(*,'(A23,I4)')  ' 6.  NO. OF PERMS =    ',NPERM
      WRITE(*,'(A23,I4)')  ' 7.  UNIQUE LOW CUTS=  ',INUMLO
      WRITE(*,'(A23,I4)')  ' 8.  UNIQUE UPP CUTS=  ',INUMHI
      WRITE(*,'(A23,I4)')  ' 9.  N LO WEIGHT=      ',NLOWT
      WRITE(*,'(A23,I4)')  ' 10. N HI WEIGHT=      ',NHIWT
      WRITE(*,'(A23,F6.2)') ' 11. THETA CUT=       ',CUT
      WRITE(*,'(A)') '                          '
      WRITE(*,'(A)')  ' ENTER NUMBER OF PARAMETER TO CHANGE '
      WRITE(*,'(A)')  ' USE I2 FORMAT (0=NO CHANGES REQUIRED) '
      READ(*,'(I2)') NUM
      IF (NUM.EQ.0) GO TO 200
      IF (NUM.GT.11) GO TO 5
      WRITE(*,'(A)')  ' ENTER NEW VALUE'
      GOTO (10,20,30,40,50,60,70,80,90,100,110) NUM
   10 READ(*,'(I4)') NPOOL
      GO TO 5
   20 READ(*,'(I4)') NTESTS
      GO TO 5
   30 READ(*,'(I4)') NITM
      GO TO 5
   40 READ(*,'(I4)') NTHET
      GO TO 5
   50 READ(*,'(I4)') NREP
      GO TO 5
   60 READ(*,'(I4)') NPERM
      GO TO 5
   70 READ(*,'(I4)') INUMLO
      GO TO 5
   80 READ(*,'(I4)') INUMHI
      GO TO 5
   90 READ(*,'(I4)') NLOWT
      GO TO 5
  100 READ(*,'(I4)') NHIWT
      GO TO 5
  110 READ(*,'(F6.2)') CUT
      GO TO 5
  200 CONTINUE
C
C                                              DEFINE POINTERS
      CALL DYNSUB(NEEDR4,NEEDI4)
C
      WRITE(*,6000) NEEDR4,IALR4,NEEDI4,IALI4
 6000 FORMAT('1OUTPUT REPORT FOR DYNAMIC SPACE ALLOCATOR'/
     $       ' ',I6,' REAL*4 WORDS NEEDED OF',I6,' AVAILABLE'/
     $       ' ',I6,' INT*4  WORDS NEEDED OF',I6,' AVAILABLE')
C
C                                              ENOUGH SPACE ??
      IF (NEEDR4.GT.IALR4) MYERR=.TRUE.
      IF (NEEDI4.GT.IALI4) MYERR=.TRUE.
      IF (MYERR) RETURN
      CONTINUE
C                                              OPEN INPUT FILES
C
      WRITE(*,'(A)')
      WRITE(*,6005)
```

```
6005 FORMAT(' ****   THIS PGM REQUIRES FOUR INPUT FILES    ****'/
     $       ' *     (1) RAW SCORE, THETAS AND WEIGHTS        *'/
     $       ' *         (OUTPUT OF CVP STEP 1)               *'/
     $       ' *     (2) SIMULATED RESPONSES                  *'/
     $       ' *         (OUTPUT OF CVP STEP 2)               *'/
     $       ' *     (3) SET OF RANDOM PERMUTATIONS           *'/
     $       ' *         WITH ASSOCIATED CUT SCORE Nos        *'/
     $       ' *         (OUTPUT OF CEP)                      *'/
     $       ' *     (4) SET OF ALL POSSIBLE CUTS             *'/
     $       ' *         (OUTPUT OF CEP)                      *'/
     $       ' ***********************************************'//)

WRITE(*,'(A)') ' Enter Name of Input File #1 '
      read(*,'(a)') FNAME1
      OPEN (IFIL1,FILE=FNAME1,ACCESS='SEQUENTIAL',STATUS='OLD')
C
      WRITE(*,6005)
      WRITE(*,'(A)') ' Enter Name of Input File #2 '
      read(*,'(a)') FNAME2
      OPEN (IFIL2,FILE=FNAME2,ACCESS='SEQUENTIAL',STATUS='OLD')
C
      WRITE(*,6005)
      WRITE(*,'(A)') ' Enter Name of Input File #3 '
      read(*,'(a)') FNAME3
      OPEN (IFIL3,FILE=FNAME3,ACCESS='DIRECT',RECL=24,
     $  FORM='FORMATTED')
C
      WRITE(*,6005)
      WRITE(*,'(A)') ' Enter Name of Input File #4 '
      read(*,'(a)') FNAME4
      OPEN (IFIL4,FILE=FNAME4,ACCESS='SEQUENTIAL',STATUS='OLD')
c
c
c                                    OPEN OUTPUT FILE
c                                    WRITE PARAMS
c                                    FOR RUN DOCUMENTATION
c
      WRITE(*,'(A)')
      WRITE(*,'(A)') ' This pgm creates Three Output Files:'
      WRITE(*,'(A)') ' 1) filnam.DC3 = Run Documentation'
      WRITE(*,'(A)') ' 2) filnam.DEC = Decisions'
      WRITE(*,'(A)') ' 3) filnam.ERR = PROBLEM SUBJECTS'
      WRITE(*,'(A)')
      WRITE(*,'(A)') ' Enter filnam (Six characters, no dot)'
      read(*,'(A6)') FIRST
      FNAME5=FIRST//'.DC3'
      OPEN (IOUT1,FILE=FNAME5,ACCESS='SEQUENTIAL',STATUS='NEW')
      FNAME6=FIRST//'.DEC'
      OPEN (IOUT2,FILE=FNAME6,ACCESS='SEQUENTIAL',STATUS='NEW')
      FNAME7=FIRST//'.ERR'
      OPEN (IOUT3,FILE=FNAME7,ACCESS='SEQUENTIAL',STATUS='NEW')
c
c
c
      WRITE(IOUT1,'(A)') ' ---------------------------'
      WRITE(IOUT1,'(A)') ' LIST OF INPUT FILE NAMES'
      WRITE(IOUT1,'(A)') ' ---------------------------'
      WRITE(IOUT1,'(1X,A)') FNAME1
      WRITE(IOUT1,'(1X,A)') FNAME2
      WRITE(IOUT1,'(1X,A)') FNAME3
      WRITE(IOUT1,'(1X,A)') FNAME4
      WRITE(IOUT1,'(A)') ' ---------------------------'
      WRITE(IOUT1,'(A)') ' LIST OF OUTPUT FILE NAMES'
      WRITE(IOUT1,'(A)') ' ---------------------------'
```

```
      WRITE(IOUT1,'(1X,A)') FNAME5
      WRITE(IOUT1,'(1X,A)') FNAME6
      WRITE(IOUT1,'(1X,A)') FNAME7
      WRITE(IOUT1,'(A)') ' ---------------------------'
      WRITE(IOUT1,'(A)') ' LIST OF PROGRAM PARAMETERS'
      WRITE(IOUT1,'(A)') ' ---------------------------'
      WRITE(IOUT1,6010) NPOOL,NTESTS,NITM,NTHET,NREP,NPERM,
     $   INUMLO,INUMHI,NLOWT,NHIWT,CUT
 6010 FORMAT(' NPOOL=',I4/' NTESTS=',I4/' NITM=',I4/
     $   ' NTHET=',I4/' NREP=',I4/' NPERM=',I4/
     $   ' INUMLO=',I4/' INUMHI=',I4/
     $   ' NLOWT=',I4/' NHIWT=',I4/' CUT=',F6.2/)
C
C
C
C
C                                          DEFINE DUMMY PARAMS
C                                             FOR ARRAY SIZES
      NPLX=NPOOL
      NTSTX=NTESTS
      NTHETX=NTHET
      NREPX=NREP
      NPERX=NPERM
      NLOX=INUMLO
      NHIX=INUMHI
C                                          READ LOWER AND UPPER
C                                             CUTS FROM FILE #4
C                                             AND THETAS & WTS
C                                             FROM FILE #1
      CALL INIT1(MYERR,NTSTX,NLOX,NHIX,NTHETX,IV(KCLO),IV(KCHI),
     $   RV(KRAW),RV(KTHET),RV(KWT))
C
      IF (MYERR) RETURN
C                                              CLASSIFY
C                                              SIMULATED
C                                              EXAMINEES
      CALL CLASS(NPLX,NTSTX,NREPX,NLOX,NHIX,NPERX,NTHETX,
     $   IV(KCLO),IV(KCHI),IV(KSCR),IV(KID),IV(KFREQ),
     $   IV(KMEQ),IV(KMNE),IV(KSAM),IV(KFLA),IV(KFLB),
     $   IV(KTABA),IV(KTABB),RV(KR),RV(KRAW),RV(KTHET),RV(KWT),
     $   RV(KLENA),RV(KLENB))
C
C
      RETURN
      END
C ==========================================================
      SUBROUTINE DYNSUB(NEEDR4,NEEDI4)
C
C     SET UP POINTERS FOR REAL*4 DATA STORED IN RV
C                     AND I*4    DATA STORED IN IV
C
      COMMON /PARCOM/ NPOOL,NTESTS,NITM,NTHET,NREP,NPERM,
     $   INUMLO,INUMHI,CUT,NLOWT,NHIWT
      COMMON /KPTRS/KCLO,KCHI,KSCR,KFREQ,KID,KMEQ,KMNE,KSAM,KR,
     $   KRAW,KTHET,KWT,KLENA,KLENB,KFLA,KFLB,KTABA,KTABB
C
C
C
C
      KR   = 1
      KRAW = KR  + NREP
      KTHET = KRAW + NTHET
```

```fortran
      KWT   = KTHET+  NTHET
      KLENA = KWT  +  NTHET
      KLENB = KLENA+  NTHET
      NEEDR4= KLENB+  NTHET
C
C
      KCLO  = 1
      KCHI  = KCLO +  (INUMLO*NTESTS)
      KSCR  = KCHI +  (INUMHI*NTESTS)
      KFREQ = KSCR +  NPOOL
      KID   = KFREQ+  NPERM
      KMEQ  = KID  +  NTESTS
      KMNE  = KMEQ +  NTHET
      KSAM  = KMNE +  NTHET
      KFLA  = KSAM +  NTHET
      KFLB  = KFLA +  NTHET
      KTABA = KFLB +  NTHET
      KTABB = KTABA+  (NTHET*NTESTS)
      NEEDI4= KTABB +  (NTHET*NTESTS)
C
C
      RETURN
      END
C =============================================================
                     S U B R O U T I N E
      INIT1(MYERR,NTSTX,NLOX,NHIX,NTHETX,ICUTLO,ICUTHI,
     $     RAW,THETA,WT)
      INTEGER*4 ICUTLO(NLOX,NTSTX),ICUTHI(NHIX,NTSTX)
      REAL*4 RAW(NTHETX),THETA(NTHETX),WT(NTHETX)
      CHARACTER*2 BLANK
      CHARACTER*60 FMT
      LOGICAL MYERR
C
      COMMON /PARCOM/ NPOOL,NTESTS,NITM,NTHET,NREP,NPERM,
     $     INUMLO,INUMHI,CUT,NLOWT,NHIWT
      COMMON /FILCOM/ IFIL1,IFIL2,IFIL3,IFIL4,IOUT1,IOUT2,IOUT3
C
C
      READ(IFIL4,'(5X,2I4)') MAXLO,MAXHI
      WRITE(IOUT1,'(A24,2I4)')  '    NUMBER   OF   CUTS   IN
     FILE=',MAXLO,MAXHI
      IF (MAXLO.NE.INUMLO) MYERR=.TRUE.
      IF (MAXHI.NE.INUMHI) MYERR=.TRUE.
      IF (MYERR) RETURN
C                                                          READ
C                                                          LOWER CUTS
      WRITE(IOUT1,'(A)') ' --------------------------'
      WRITE(IOUT1,'(A)') ' LIST OF UNIQUE LOWER CUTS'
      WRITE(IOUT1,'(A)') ' --------------------------'
      DO 100 I=1,INUMLO
      READ(IFIL4,'(5X,6I4)') (ICUTLO(I,J),J=1,NTESTS)
      WRITE(IOUT1,'(I4,1X,6I4)') I,(ICUTLO(I,J),J=1,NTESTS)
  100 CONTINUE
C                                                          READ
C                                                          UPPER CUTS
      WRITE(IOUT1,'(A)') ' --------------------------'
      WRITE(IOUT1,'(A)') ' LIST OF UNIQUE UPPER CUTS'
      WRITE(IOUT1,'(A)') ' --------------------------'
      DO 200 I=1,INUMHI
      READ(IFIL4,'(5X,6I4)') (ICUTHI(I,J),J=1,NTESTS)
      WRITE(IOUT1,'(I4,1X,6I4)') I,(ICUTHI(I,J),J=1,NTESTS)
  200 CONTINUE
      CLOSE(IFIL4)
```

```
C                                                         READ THETAS
C                                                         AND WEIGHTS
      WRITE(IOUT1,'(A)') ' ---------------------------'
      WRITE(IOUT1,'(A)') ' RAW      THETA      WEIGHT  '
      WRITE(IOUT1,'(A)') ' ---------------------------'
      READ(IFIL1,'(A60)') FMT
      DO 300 K=1,NTHET
      READ(IFIL1,FMT) RAW(K),THETA(K),WT(K)
      WRITE(IOUT1,'(F4.0,2F10.4)') RAW(K),THETA(K),WT(K)
  300 CONTINUE
C
      CLOSE(IFIL1)
      RETURN
      END
C ==========================================================
      SUBROUTINE CLASS(NPLX,NTSTX,NREPX,NLOX,NHIX,NPERX,NTHETX,
     $ ICUTLO,ICUTHI,ISCR,ID,IFREQ,NMEQV,NMNEQ,NSAME,NFLA,NFLB,
     $ ITABA,ITABB,R,RAW,THETA,WT,XLENA,XLENB)
C
      INTEGER*4 ICUTLO(NLOX,NTSTX),ICUTHI(NHIX,NTSTX),ISCR(NPLX),
     $    ID(NTSTX),IFREQ(NPERX),NMEQV(NTHETX),NMNEQ(NTHETX),
     $    NSAME(NTHETX),NFLA(NTHETX),NFLB(NTHETX),
     $    ITABA(NTHETX,NTSTX),ITABB(NTHETX,NTSTX)
      REAL*4 R(NREPX),RAW(NTHETX),THETA(NTHETX),WT(NTHETX),
     $    XLENA(NTHETX),XLENB(NTHETX)
      CHARACTER*2 BLANK
C
      COMMON /PARCOM/ NPOOL,NTESTS,NITM,NTHET,NREP,NPERM,
     $     INUMLO,INUMHI,CUT,NLOWT,NHIWT
      COMMON /FILCOM/IFIL1,IFIL2,IFIL3,IFIL4,IOUT1,IOUT2,IOUT3
C
C
      CALL IZERO(IFREQ,NPERM)
      CALL IZERO(NMEQV,NTHET)
      CALL IZERO(NMNEQ,NTHET)
      CALL IZERO(NSAME,NTHET)
      CALL IZERO(NFLA,NTHET)
      CALL IZERO(NFLB,NTHET)
      CALL IYZ(ITABA,NTHET,NTESTS)
      CALL IYZ(ITABB,NTHET,NTESTS)
      CALL ZERO(XLENA,NTHET)
      CALL ZERO(XLENB,NTHET)
      XREP=REAL(NREP)
C
C
      IPERM=0
      DO 500 K=1,NTHET
C                                                         LOOP OVER REPS
      DO 400 IREP=1,NREP
C                                                         READ SIMULATED
C                                                         EXAMINEE DATA
      READ(IFIL2,'(I6,2I4,F8.3,10I4)') ISUB,ITHET,IR,WEIGHT,
     $    (ISCR(I),I=1,NPOOL)
C                                                   GET PERMUTATION NUMBER

IPERM=IPERM+1
      IF (IPERM.GT.NPERM) IPERM=1
C                                                         READ CUTS FOR
C                                                         PERMUTATION IPERM
      READ(IFIL3,'(3I4,6I2)',REC=IPERM)
     IP,ILO,IHI,(ID(J),J=1,NTESTS)
C
```

```
C                                          CLASSIFY USING
C                                          NON-EQUIV. testlet CUTS
      IDECB=2
      NTOT=0
      J=0
  100 IF (IDECB.NE.2) GO TO 102
      J=J+1
      NTOT=NTOT+ISCR(ID(J))
      IF (NTOT.LE.ICUTLO(ILO,J)) IDECB=0
      IF (NTOT.GE.ICUTHI(IHI,J)) IDECB=1
      IF (J.LT.NTESTS) GO TO 100
  102 CONTINUE
      XLENB(K)=XLENB(K)+REAL(J*NITM)
      JB=J
      NTOTB=NTOT
      IF ((JB.EQ.2).AND.(IDECB.EQ.0)) NFLB(K)=NFLB(K)+1
      ITABB(K,JB)=ITABB(K,JB)+1
C
C                                          DIAGNOSTIC INFO
      IF ((K.EQ.1).AND.(IREP.EQ.1)) THEN
      WRITE(IOUT1,'(A)') ' SIMULATED SUBJECT #1'
         WRITE(IOUT1,'(A16,10I4)')   '     testlet
 SCORES:',(ISCR(I),I=1,NPOOL)
      WRITE(IOUT1,'(A16,I4)')  ' PERMUTATION NO:',IPERM
        WRITE(IOUT1,'(A16,6I4)')   '     testlet    IDS:
 ',(ID(I),I=1,NTESTS)
      WRITE(IOUT1,'(A)') ' NON-EQUIVALENT testlet DIAGNOSTICS:'
      WRITE(IOUT1,'(A16,6I4)') ' LOWER CUTS:     ',
     $    (ICUTLO(ILO,I),I=1,NTESTS)
      WRITE(IOUT1,'(A16,6I4)') ' UPPER CUTS:     ',
     $    (ICUTHI(IHI,I),I=1,NTESTS)
      WRITE(IOUT1,'(A16,2I4)') ' STAGE,DECISION=',J,IDECB
      END IF
C
C
      IF (IDECB.EQ.2) THEN
      WRITE(IOUT3,'(A20,I6)') ' SIMULATED SUBJECT #',ISUB
         W R I T E ( I O U T 3 , ' ( A 1 6 , 1 0 I 4 ) ' )    '     testlet
 SCORES:',(ISCR(I),I=1,NPOOL)
      WRITE(IOUT3,'(A16,I4)')   ' PERMUTATION NO:',IPERM
        WRITE(IOUT3,'(A16,6I4)')   '     testlet    IDS:
 ',(ID(I),I=1,NTESTS)
      WRITE(IOUT3,'(A16,6I4)') ' LOWER CUTS:     ',
     $    (ICUTLO(ILO,I),I=1,NTESTS)
      WRITE(IOUT3,'(A16,6I4)') ' UPPER CUTS:     ',
     $    (ICUTHI(IHI,I),I=1,NTESTS)
      WRITE(IOUT3,'(A16,2I4)') ' STAGE,DECISION=',J,IDECB
      END IF
C
C                                          CLASSIFY USING
C                                          EQUIV. testlet CUTS
      IDECA=2
      NTOT=0
      J=0
  200 IF (IDECA.NE.2) GO TO 202
      J=J+1
      NTOT=NTOT+ISCR(ID(J))
      IF (NTOT.LE.ICUTLO(1,J)) IDECA=0
      IF (NTOT.GE.ICUTHI(1,J)) IDECA=1
      IF (J.LT.NTESTS) GO TO 200
  202 CONTINUE
      XLENA(K)=XLENA(K)+REAL(J*NITM)
      JA=J
```

```
      NTOTA=NTOT
      IF ((JA.EQ.2).AND.(IDECA.EQ.0)) NFLA(K)=NFLA(K)+1
      ITABA(K,JA)=ITABA(K,JA)+1
C
C                                               DIAGNOSTIC INFO
      IF ((K.EQ.1).AND.(IREP.EQ.1)) THEN
      WRITE(IOUT1,'(A)') ' EQUIVALENT testlet DIAGNOSTICS:'
      WRITE(IOUT1,'(A16,6I4)') ' LOWER CUTS:     ',
    $    (ICUTLO(1,I),I=1,NTESTS)
      WRITE(IOUT1,'(A16,6I4)') ' UPPER CUTS:     ',
    $    (ICUTHI(1,I),I=1,NTESTS)
      WRITE(IOUT1,'(A16,2I4)') ' STAGE,DECISION=',J,IDECA
      END IF
C
C
      IF (IDECA.EQ.2) WRITE(IOUT3,210) ISUB
  210 FORMAT(' EQUIVALENT testlet CLASSIFICATION ERROR FOR
 SUBJ#',I6)
C
C
      IF ((IDECB.EQ.2).OR.(IDECA.EQ.2)) GO TO 400
C
C                                               UPDATE COUNT OF
C                                               MASTERS BY THETA
      NMEQV(K)=NMEQV(K)+IDECA
      NMNEQ(K)=NMNEQ(K)+IDECB
      IBOTH=IDECA+IDECB
      IF ((IBOTH.EQ.0).OR.(IBOTH.EQ.2)) NSAME(K)=NSAME(K)+1
C
C                                               WRITE RESULTS TO
C                                               CLASSIFICATION FILE
            W R I T E ( I O U T 2 , 1 0 0 0 )
 ISUB,K,WEIGHT,JA,NTOTA,IDECA,JB,NTOTB,IDECB
  400 CONTINUE
      XLENA(K)=XLENA(K)/XREP
      XLENB(K)=XLENB(K)/XREP
  500 CONTINUE
C
C
C
C
            W R I T E ( I O U T 1 , ' ( A ) ' )
 '1-------------------------------------------------
    $--------------------'
      WRITE(IOUT1,'(A)') '                        No. of Masters
      Avg.Test
    $ Len.    No.Fail at St2'
      WRITE(IOUT1,'(A)') '  Theta    Weight       EQ.    NON-EQ
 CONSIST.  EQ.   NON
    $-EQ     EQ.   NON-EQ'
            W R I T E ( I O U T 1 , ' ( A ) ' )       '
 -------------------------------------------------------
    $----------------------'
      DO 700 K=1,NTHET
         WRITE(IOUT1,'(F4.0,F8.3,F8.2,3I6,2F8.2,2I4)')
 RAW(K),theta(k),
    $    WT(K),NMEQV(K),NMNEQ(K),NSAME(K),XLENA(K),XLENB(K),
    $    NFLA(K),NFLB(K)
  700 CONTINUE
C
```

```
C
C                                                      CALCULATE
C                                                   CLASSIFICATION
C                                                       ACCURACY
C
      RLO=REAL(NLOWT)
      RHI=REAL(NHIWT)
      TOTNON=RLO
      TOTMAS=RHI
      TRUENA=0.
      TRUENB=0.
      TRUEMA=RHI
      TRUEMB=RHI
      ALENNA=RLO*XLENA(1)
      ALENNB=RLO*XLENB(1)
      ALENMA=RHI*XLENA(NTHET)
      ALENMB=RHI*XLENB(NTHET)
      DO 800 K=1,NTHET
      ADDA=(WT(K)*REAL(NMEQV(K)))/XREP
      ADDB=(WT(K)*REAL(NMNEQ(K)))/XREP
      IF (THETA(K).LT.CUT) THEN
         TOTNON=TOTNON + WT(K)
         TRUENA=TRUENA + ADDA
         TRUENB=TRUENB + ADDB
         ALENNA=ALENNA + (WT(K)*XLENA(K))
         ALENNB=ALENNB + (WT(K)*XLENB(K))
      ELSE
         TOTMAS=TOTMAS + WT(K)
         TRUEMA=TRUEMA + ADDA
         TRUEMB=TRUEMB + ADDB
         ALENMA=ALENMA + (WT(K)*XLENA(K))
         ALENMB=ALENMB + (WT(K)*XLENB(K))
      END IF
  800 CONTINUE
      TRUENA=TRUENA/TOTNON
      TRUENB=TRUENB/TOTNON
      ALENNA=ALENNA/TOTNON
      ALENNB=ALENNB/TOTNON
      TRUEMA=TRUEMA/TOTMAS
      TRUEMB=TRUEMB/TOTMAS
      ALENMA=ALENMA/TOTMAS
      ALENMB=ALENMB/TOTMAS
C
            WRITE ( I O U T 1 , ' ( A ) ' .)
'1----------------------------------------'
      WRITE(IOUT1,'(A29,F6.0)') ' No. OF TRUE NONMASTERS=
',TOTNON
      WRITE(IOUT1,'(A29,F6.2)')  ' PCT   CLASS   AS   MASTER
(EQUIV)=',TRUENA
      WRITE(IOUT1,'(A29,F6.2)')  ' PCT  CLASS  AS  MASTER  (NE)
=',TRUENB
      WRITE(IOUT1,'(A32,F6.1)')    '   AVERAGE    TEST    LENGTH
(EQUIV)=',ALENNA
      WRITE(IOUT1,'(A29,F6.1)')  ' AVERAGE TEST LENGTH (NE)
=',ALENNB
            WRITE ( I O U T 1 , ' ( A ) ' )        '
-----------------------------------------'
      WRITE(IOUT1,'(A29,F6.0)') ' No. OF TRUE MASTERS=
',TOTMAS
      WRITE(IOUT1,'(A29,F6.2)')  ' PCT   CLASS   AS   MASTER
(EQUIV)=',TRUEMA
      WRITE(IOUT1,'(A29,F6.2)')  ' PCT  CLASS  AS  MASTER  (NE)
=',TRUEMB
      WRITE(IOUT1,'(A32,F6.1)')     '   AVERAGE   TEST   LENGTH
```

```
      (EQUIV)=',ALENMA
      WRITE(IOUT1,'(A29,F6.1)') ' AVERAGE TEST LENGTH   (NE)
     =',ALENMB
                  W R I T E ( I O U T 1 , ' ( A ) ' )     '
     ------------------------------------------'
      TOT=TOTNON+TOTMAS
      WRITE(IOUT1,'(A29,F6.0)') ' TOTAL SIMULATED EXAMINEES=
     ',TOT
C
C
      IF (NTESTS.EQ.1) RETURN
      WRITE(IOUT1,'(A)') '1DISTRIBUTION OF TEST LENGTHS BY THETA'

WRITE(IOUT1,'(A)') ' ----------------------------------'

DO 900 K=1,NTHET
                  W R I T E ( I O U T 1 , 2 0 0 0 )
     RAW(K),THETA(K),WT(K),(ITABA(K,J),J=2,NTESTS),
     $      (ITABB(K,L),L=2,NTESTS)
  900 CONTINUE
      RETURN
C
 1000 FORMAT(I6,I4,F10.4,6I4)
 2000 FORMAT(F4.0,F8.3,F8.2,10I4)
C
C
C
      END
C================================================================
C     SUBROUTINE GGUBS(DSEED,NR,R)
C
C     RANDOM NUMBER GENERATOR (COPY OF PC-IMSL SOURCE)
C
C     INTEGER NR
C     REAL*4  R(NR)
C     REAL*8  DSEED,D2P31M,D2P31
C     DATA D2P31M/2147483647.D0/
C     DATA D2P31/2147483648.D0/
C
C
C     DO 5 I=1,NR
C     DSEED=DMOD(16807.D0*DSEED,D2P31M)
C     R(I)=DSEED/D2P31
C   5 CONTINUE
C
C
C     RETURN
C     END
C================================================================
C     SUBROUTINE GETP(IPERM,NPERM,R)
C
C     REAL*4 R,Y,SLOPE
C
C     R = INPUT, A RANDOM NUMBER BETWEEN 0 AND 1
C     IPERM = OUTPUT, A RANDOM NUMBER BETWEEN 1 AND NPERM
C
C     SLOPE=REAL(NPERM-1)
C     Y=SLOPE*R + 1.
C     IPERM=INT(Y+.5)
C
C     RETURN
C     END
C================================================================
```

```
      SUBROUTINE IZERO(IARRAY,NROW)
C
      INTEGER*4 IARRAY(NROW)
C
      DO 100 I=1,NROW
      IARRAY(I)=0
  100 CONTINUE
C
      RETURN
      END
C==============================================================
      SUBROUTINE IYZ(IARRAY,NROW,NCOL)
C
      INTEGER*4 IARRAY(NROW,NCOL)
C
      DO 200 I=1,NROW
      DO 100 J=1,NCOL
      IARRAY(I,J)=0
  100 CONTINUE
  200 CONTINUE
C
      RETURN
      END
C==============================================================
      SUBROUTINE ZERO(ARRAY,NROW)
C
      REAL*4 ARRAY(NROW)
C
      DO 100 I=1,NROW
      ARRAY(I)=0.
  100 CONTINUE
C
      RETURN
      END
^Z
```

CMT ADMINISTRATION SYSTEM source code for
presentation and scoring of testlets.[5]

```c
/*    \CMT\PgmStart.c                                        ls   */
/*                                                         CMTLIB
   */
/*    CMT-specific Testadm start-up routine.
   */
/*
      */
/*******************************************************************/
#include <stdio.h>
include <stdlib.h>
#include <string.h>
#include <math.h>
#include <Catdefs.h>
#include <ALGdefs.h>
include <Log.h> extern
include <Catcom.c>                    /* common area */ extern
include <Instcfg.c>                   /* config info */ extern
include <Testinfo.c>                  /* test info */ extern STDLOG Stdlog;

ALGdef ALG;                        /* ALG common */

/*-----------------------------------------------------------------
-----*/
/*   PgmStart (opt);
     */
/*
     */
/*   Store CMT ECF data, download files to virtual, and
  */
/*   position inst.cfg.
     */
/*-----------------------------------------------------------------
-----*/ void PgmStart (opt)
     int opt;
{
    FILE *fp;
    int i, n;
    long fpos;
    char oldtlet[5], div[6], s[60], virtual[10];
    INSTTESTS insttests;

if (opt != 1) return;              /* (entry from INITStd not
used) */
```

---

[5] ©Educational Testing Service, 1989

```c
    workmssg ();                        /* give working message */

/* get CMT.ECF */
    if ((fp = fopen ("CMT.ECF", "rb")) == NULL)
        Catabort ("14");
    fread (ALG.candid, 11, 1, fp);      /* ticket #, div, handcp */
    if (ALG.candid[10] == '1') ALG.handicap = 1;
    else ALG.handicap = 0;
    ALG.candid[10] = oldtlet[4] = 0;    /* terminate strings */
    ALG.candid[9] = toupper (ALG.candid[9]);   /* make sure caps */
    strcpy (Stdlog.stdid, ALG.candid);
    i = 0;                              /* read old tlets */
    fread (oldtlet, 4, 1, fp);
    while (!feof (fp))
      { ALG.tlist[i++] = atoi (oldtlet+1);    /* save in tlist */
        fread (oldtlet, 4, 1, fp);
      }
    fclose (fp);
    ALG.nold = i;

/* construct DIV & virtual names */
    strcpy (div, "DIVx");
    div[3] = ALG.candid[9];
    strcpy (virtual, instcfg.virtual);
    if (strlen(virtual) == 1) strcat (virtual, ":");

/* download files to virtual */
    for (n=0; n<instcfg.ntests; n++)    /* get cfg segment */
      { fread   ((char *)(&insttests), sizeof(insttests), 1,
                    Catcom.fpcfg);
        Decrypt ((char *)(&insttests), sizeof(insttests));
        if (n < (instcfg.ntests - 1))   /* download TIFs */
            Download (insttests.filename, ".tif",
                    insttests.filename);
        else
          { strcpy (ALG.filename, insttests.filename);
            Download (div, ".tif", ALG.filename);
            strcat (strcat (strcpy (s, virtual),    /* read test tif */
                    ALG.filename), ".tif");
            if ((fp = fopen (s, "rb")) == NULL)
                Catabort ("11");
            fread   ((char *)(&test), sizeof(test), 1, fp);
            Decrypt ((char *)(&test), sizeof(test));
            fclose (fp);
            if (test.intro[0])          /* download intro tif */
                Download (test.intro, ".tif", test.intro);
            strcat (div, "0");          /* download first test pak */
            Download (div, ".pak", ALG.filename);
          }
      }
    fpos = sizeof(instcfg);             /* re-position inst.cfg */
    fseek (Catcom.fpcfg, fpos, 0);
```

```
                                     /* see if restart (log
non-empty) */
     ALG.restart = 0;
     if (Catcom.eofpos > 0L)
          { fseek (Catcom.fplog, 0L, 0);      /* rewind */
            if (ALGnxtlog ())
               { ALG.restart = 1;             /* restart */
                 fpos = sizeof(instcfg) +     /* skip front
screens */
                    sizeof(insttests) * (instcfg.ntests - 1);
                 fseek (Catcom.fpcfg, fpos, 0);
               }
            fseek (Catcom.fplog, 0L, 2);      /* pos log to EOF
*/
          }
     return;
}

/*---------------------------------------------------------------
-----*/
/*   onscrrpt () and issr ();
     */
/*
     */
/*   There are no on-screen or printed reports for CMT.
   */
/*---------------------------------------------------------------
-----*/ void onscrrpt ()
{
     return;
} void issr ()
{
     return;
}
/*****************************************************************
******/
/*   \CMT\ALG.c                                          ls   */
/*                                                      ALGLIB
   */
/*   CMT item selection algorithm.
   */
*/
/*****************************************************************
******/
include <stdio.h>
include <stdlib.h>
#include <string.h>
#include <math.h>
#include <Catdefs.h>
#include <ALGdefs.h>
include <Log.h> define PASS    1
define FAIL    0 extern
include <Catcom.c>                           /* common area */
```

```
extern
include <Instcfg.c>                        /* config info */ extern
include <Testinfo.c>                       /* test info */ extern
include <Iteminfo.c>                       /* item info */ extern STDLOG Stdlog;                       /* log data areas */
extern TESTLOG Testlog;
extern ITEMLOG Itemlog;

extern ALGdef ALG;

/*---------------------------------------------------------------
-----*/
/*   ALGinit ();
     */
/*
     */
/*   Load decision table, handle restart, determine testlet
     */
/*   order and construct testlet list, and select first item.
     */
/*---------------------------------------------------------------
-----*/ void ALGinit ()
{
    FILE *fp;
    unsigned int i, j, k, n;
    unsigned int nb;
    char *p, *pp, *pend;
    char div[5], s[60];

/* read decision table */
    strcpy (div, "DIVx");
    div[3] = ALG.candid[9];
    strcat (strcat (strcpy (s, instcfg.fileserver), div), ".tbl");
    if ((fp = fopen (s, "rb")) == NULL) Catabort ("14");
    fseek (fp, 0L, 2);
    nb = ftell (fp);                        /* get file size */
    rewind (fp);
    p = pp = tempmem (nb);
    pend = p + nb - 1;
    fread (p, nb, 1, fp);                   /* read to memory */
    fclose (fp);
    Decrypt (p, nb);                        /* decrypt */
    i = 0;
    while (p < pend)                        /* get data */
        { while (*pp != 13) pp++;           /* scan to CR */
          *pp = 0;                          /* terminate str */
          sscanf (p, "%d %d", &ALG.low[i], &ALG.high[i]);
          p = pp = pp + 2;
          i++;
        }
```

```
    fclose (fp);

/* miscellaneous
initialization */
    if (ALG.handicap) test.timelimit = 0;
    ALG.nitmtlet = Catcom.maxitm/test.maxtlets;
    ALG.curritm = ALG.tiv = -1;
    ALG.result = FAIL;
    if (test.testnbr > 90)                    /* make sure caps
*/
        test.testnbr = Testlog.testnbr = ALG.candid[9];
                                        /* shift old tlet list to end
*/
    for (i=j=0; i<ALG.nold; i++)
        { k = ALG.tlist[ALG.nold-i-1];
          if ((k > 0) && (k <= test.maxtlets))
              { ALG.tlist[test.maxtlets-j-1] = k;
                j++;
              }
        }
    ALG.nold = j;
    ALG.tnext = 0;

if (ALG.restart)                    /* process restart if
necessary */
        cand_restart ();

/* set ALG.maxtlet to suppress
re-
                                           admin of old tlets.  To
allow
                                           re-admin  set   to
test.maxtlets */
    ALG.maxtlet = test.maxtlets - ALG.nold;

/* randomly generate remaining
list
                                           of testlets to be admin,
in order */
    if (ALG.nold < test.maxtlets)
        { i = ALG.tnext;                 /* first pos to fill
*/
          n = test.maxtlets - ALG.nold - 1; /* last pos to fill
*/
          for (j=i; j<=n; j++) ALG.tlist[j] = 0;
          for (k=1; k<=test.maxtlets; k++)
              { j = 0;                   /* see if k is used
*/
                while ((j < test.maxtlets) &&
                       (ALG.tlist[j] != k)) j++;
                if (j == test.maxtlets)  /* not used - store
it */
                    ALG.tlist[i++] = k;
              }
                                        /* now randomly order
                                           between tnext and
n */
          for (i=ALG.tnext; i<n; i++)
              { k = 32768/(n-i+1);
                j = i + rand()/(k + 1);
```

```c
                  k = ALG.tlist[i];              /* swap i and j */
                  ALG.tlist[i] = ALG.tlist[j];
                  ALG.tlist[j] = k;
                }
            }

/* select first item */
        if (!ALG.restart)
          { if (ALG.tnext >= ALG.maxtlet)
                Catcom.nextitem = 0;
            else Catcom.nextitem =
                    ALG.nitmtlet * (ALG.tlist[ALG.tnext] - 1) + 1;
            ALG.tnext += 1;
          } return;
    }

/* Process candidate restart */ static cand_restart ()
{
        int i, k;
        unsigned int testtime;

fseek (Catcom.fplog, 0L, 0);          /* rewind */
        testtime = k = 0;
        while (ALGnxtlog())                    /* pass through log file */
          { testtime += Testlog.testtime;      /* accum time spent */
            Testlog.testtime = 0;              /* (avoid dupl) */
            if (Itemlog.resp[0])
              { i = 0;                         /* search review tbl */
                while ((i < k) &&
                       ((Catcom.review+i)->itm != Itemlog.itemno))
                    i++;
                if (i == k)                    /* add to review tbl */
                  { k += 1;
                    Catcom.nextitem = (Catcom.review+i)->itm =
                            Itemlog.itemno;
                    if ((Itemlog.itemno % ALG.nitmtlet) == 1)
                                              /* add to tlet list */
                      { ALG.tlist[ALG.tnext++] =
                              (Itemlog.itemno/ALG.nitmtlet) + 1;
                        Catcom.revhome = i;
                      }
                  }
                                              /* store in review tbl */
                (Catcom.review+i)->resp   = Itemlog.resp[0];
                (Catcom.review+i)->iscore = Itemlog.resp[1];
                if (i > 0) (Catcom.review+i)->prior = i - 1;
              }
          }
        if (Catcom.nextitem % ALG.nitmtlet)   /* select next item */
```

```
        { Catcom.nadm = k + 1;
          Catcom.nextitem += 1;
        }
    else Catcom.nadm = k;

fseek (Catcom.fplog, 0L, 2);          /* re-pos log to EOF
*/

Catcom.revcurr = Catcom.nadm - 1;           /* misc
initialization */
    if (Catcom.revcurr > 0)
        (Catcom.review+Catcom.revcurr)->prior = Catcom.revcurr
- 1;
    Catcom.revnext = -1;
    Catcom.ntadm = instcfg.ntests - 1;
    dnldtlet ();                          /* download current
tlet */ if (test.timelimit)                   /* reset time limits */
        { test.timelimit -= testtime/60;
          if (test.timelimit < 2) test.timelimit = 2;
          Settmwarn ();
        }

/*  if (ALG.candid[9] == 'X') dmp_rst ();      DEBUG ONLY */ return;
}

/*.....................              DEBUG    ONLY
..........................
static dmp_rst ()
{
    FILE *fprt;
    int i;

fprt = fopen ("lpt1", "wa");
    fprintf (fprt, "Catcom:\n      nadm = %d, ntadm = %d\n",
        Catcom.nadm, Catcom.ntadm);
    fprintf (fprt, "    revhome = %d, revcurr = %d, revnext =
%d\n",
        Catcom.revhome, Catcom.revcurr, Catcom.revnext);
    fprintf (fprt, "    relative tmwarn = %d\n",
        (int)(Catcom.tmwarn - Catcom.testtime));
    fprintf (fprt, "Catcom.review:\n");
    for (i=0; i<=Catcom.nadm; i++)
        fprintf (fprt, "      %d - itm = %d, resp = %d, iscore
= %d\n", i,
        (Catcom.review+i)->itm,
        (Catcom.review+i)->resp,
        (Catcom.review+i)->iscore);
    fprintf (fprt, "Test:\n      timelimit = %d, tmfreq = %d,
tmint = %d\n",
        test.timelimit, test.tmfreq, test.tmint);
    fprintf (fprt, "ALG:\n      tnext = %d, nold = %d, candid =
%s\n",
        ALG.tnext, ALG.nold, ALG.candid);
    fprintf (fprt, "ALG.tlist:\n");
    for (i=0; i<=ALG.tnext; i++)
        fprintf (fprt, "      %d - %d\n", i, ALG.tlist[i]);
    fputc (12, fprt);
    fclose (fprt);
    return;
```

}
..................                                    DEBUG    ONLY
......................*/

/*--------------------------------------------------------------
-----*/
/*    state = ALGselect (&nextitem);
    */
/*
    */
/*    Select next item, return 1 if active else 0.
    */
/*--------------------------------------------------------------
-----*/

ALGselect (nextitem)
    int *nextitem;
{
    int state;

if (ALG.curritm != item.itemno)
        { ALG.curritm = item.itemno;
          ALG.selitm = -1;
          if (((ALG.curritm % ALG.nitmtlet) == 1) &&
              (ALG.tiv != ALG.tlist[ALG.tnext-1]))
                dnldtlet ();       /* download if 1st itm in tlet
*/
        } state = ACTIVE;
                                    /* see if inactive */
    if ((Catcom.itemscore < 0) && (ALG.selitm >= 0))
        state = INACTIVE;
                                    /* see if within testlet */
    else if (ALG.curritm % ALG.nitmtlet)
        ALG.selitm = ALG.curritm + 1;
                                    /* apply decision table */
    else if (Catcom.itemscore >= 0) ALG.selitm = algdectbl ();
                                    /* see if end of test */
    else if (Catcom.nadm == Catcom.maxitm)
        ALG.selitm = 0;
                                    /* select next testlet */
    else ALG.selitm = ALG.nitmtlet * (ALG.tlist[ALG.tnext] - 1)
+ 1;

*nextitem = ALG.selitm;
    return (state);
}

/* Apply decision rule for end of testlet, return next item or
0.
   If 0 then also update tnext or, if end of test, put result in
   ALG common.  */ static algdectbl ()
{
    int i, itm, nright;

itm = -1;                       /* see if test ended */
    if (Catcom.nadm >= 2 * ALG.nitmtlet)

```
        { itm = nright = 0;
          for (i=0; i<Catcom.nadm; i++)        /* compute # right
score */
             nright += (Catcom.review+i)->iscore;
          if (nright >= ALG.high[ALG.tnext-2]) ALG.result = PASS;

else if (nright <= ALG.low[ALG.tnext-2]) ALG.result
= FAIL;
          else itm = -1;
        }
     if (itm < 0)                             /* not ended - start next
testlet */
        { if (ALG.tnext >= ALG.maxtlet)
             itm = 0;
          else itm = ALG.nitmtlet * (ALG.tlist[ALG.tnext] - 1)
+ 1;
          ALG.tnext += 1;
        } return (itm);
}

/*  Download testlet  */ static dnldtlet ()
{
     char div[6], s[60];

fclose (Catcom.fpitems);                  /* close old */
     ALG.tiv = ALG.tlist[ALG.tnext-1];
     sprintf (div, "DIV%c%d", ALG.candid[9],
         ALG.tiv);                             /* download new */
     Download (div, ".pak", ALG.filename);
     strcpy (s, instcfg.virtual);              /* re-open new */
     if (strlen(s) == 1) strcat (s, ":");
     strcat (strcat (s, ALG.filename), ".pak");
     Catcom.fpitems = fopen (s, "rb");
     return;
}

/*-------------------------------------------------------------
-----*/
/*   score = ALGclose
     */
/*
     */
/*   Compute and return test score.  Delete test.pak.
     */
/*-------------------------------------------------------------
-----*/ float ALGclose ()
{
     float fscore;
     char dsn[60];

strcpy (dsn, instcfg.virtual);
     if (strlen(dsn) == 1) strcat (dsn, ":");
     strcat (dsn, "test.pak");
     remove (dsn);
```

```
        if (ALG.selitm)
             ALG.result = 2;                /* timed out */
        fscore = ALG.result;                /* return last PASS/FAIL
result */
        return (fscore);
}

/*-------------------------------------------------------------
-----*/
/*   ret = ALGnxtlog ();
     */
/*
     */
/*   Get next item log for this test, return 0 if eof.
     */
/*-------------------------------------------------------------
-----*/

ALGnxtlog ()
{
        int testnbr, nb, done;

testnbr = ALG.candid[9];
        done = 0;
        while (!done)
             { fread ((char *)(&nb), 2, 1, Catcom.fplog);
               if (feof(Catcom.fplog)) done = 1;
               else if (nb == 0)                    /* student log */
                  { fread    ((char *)(&Stdlog), sizeof(Stdlog), 1,
                              Catcom.fplog);
                    Decrypt ((char *)(&Stdlog), sizeof(Stdlog));
                  }
               else if (nb == 1)                    /* test log */
                  { fread    ((char *)(&Testlog), sizeof(Testlog), 1,
                              Catcom.fplog);
                    Decrypt ((char *)(&Testlog), sizeof(Testlog));
                  }
               else                                 /* item log */
                  { fread    ((char *)(&Itemlog), nb, 1,
                              Catcom.fplog);
                    Decrypt ((char *)(&Itemlog), nb);
                    if ((Testlog.testnbr == testnbr) &&
                        (strcmp (Stdlog.stdid, ALG.candid) == 0))
                          done = 1;
                  }
             }
        strcpy (Stdlog.stdid, ALG.candid);
        if (feof(Catcom.fplog)) return (0);
        else return (1);

/*************************************************************
******/
/*   \cat\CMT\Nextlog.c                              6/21/88 ls
  */
/*                                                revised 9/1/88
ls  */
/*                                                revised 1/3/89
ls  */
/*
     */
/*   This routine retrieves the next logical log record and
     */
```

```
/*   returns a record code and a pointer to an appropriate
 */
/*   data area.
 */
/*
 */
/*   Calling sequence:   ret = Nextlog (drive_path, &p);
 */
/*   -----------------
 */
/*                        int ret;           return code
 */
/*                   char *drive_path; drive & path of files
 */
/*                        char *p;           pointer to record
 */
/*
 */
/*   Input:
 */
/*   -----
 */
/*        ADM.LOG     -   log file
 */
/*        DIV_.SST    -   scaled score table for
 */
/*                        appropriate division
 */
/*        DIV_.TBL    -   decision table for division
 */
/*
 */
/*
 */
/*   Output:
 */
/*   ------
 */
/*   function returns 0 if end-of-file
 */
/*                    1 if candidate record
 */
/*                    2 if test (division) record
 */
/*                    3 if item record
 */
/*
 */
/*   function returns pointer to candidate, test, or item
 */
/*   records as follows:
 */
/*
 */
/*                  Field            Type       Length
 */
/*                  -----            ----       ------
 */
/*   Candidate    Ticket number      AN           9
 */
/*   record       Division           AN           1
 */
/*
 */
```

```
/*     Test           Decision        AN      1
 */
/*     record         Interrupt       N       1
 */
/*                    Test time       N       5
 */
/*                    Scaled score    N       3
 */
/*                    # testlets      N       2
 */
/*                    Date            mmddyy  6
 */
/*                    Start time      hhmm    4
 */
/*
 */
/*     Item           Testlet #       N       4
 */
/*     record         Item #          N       8
 */
/*                    Response        N       2
 */
/*                    Response time   N       3
 */
/*                    Item score      N       1
 */
/*
 */
/*
 */
/*   The interrupt code in the test record is as follows:
 */
/*       0 ==> no interruption (test completed)
 */
/*       1 ==> test escaped, never restarted
 */
/*       2 ==> timed out (decision may be either pass or fail)
 */
/*       3 ==> ran out of testlets (decision will be fail)
 */
/*
 */
/*****************************************************************
******/ include <stdio.h>
include <stdlib.h>
#include <string.h>
#include <math.h>
include <Log.h> define SEEK_END 2

/* Log data area */ static STDLOG Stdlog;
static TESTLOG Testlog;
static ITEMLOG Itemlog;

/* Output data areas */ static char candinfo[11];
```

```c
static char testinfo[30];
static char iteminfo[19];

/* Internal data areas */ static int itmno[999];
static int resptime[999];
static char resp[999];
static char iscore[999];
static int nitm;                        /* # items in memory */
static int nextitem;                    /* next tbl pos to return
*/
static float score;                     /* test score, from log
*/
static unsigned int testtime;           /* test time */
static long stdtime;                    /* session start in GMT
*/
static FILE *fplog;                     /* log file pointer */
static int nextret = 0;                 /* next return:
                                            0 for 1st call,
                                            1 to return cand data, 2 to return test data, 3 to return next item
*/

/* Scaled score table */ static char tblbuff[1500];              /* buffer to hold sst &
tbl */
static double divsst[101];
static int division = 0;                /* div currently in
memory */
static int nitmtlet;                    /* # items per testlet
*/

/* Decision table */ static int pass[100];                   /* minimum n.r. to pass
*/
static int fail[100];                   /* maximum n.r. to fail
*/

Nextlog (drive_path, p)
        char *drive_path;
        char **p;
{
        char filename[80];
        int nb;

/* prior EOF */ if (nextret < 0) {
            fclose(fplog);
            nextret = 0;
            return (0);
        }

/* first call - open log, read cand */
```

```
     if (nextret == 0)
             {
         strcpy(filename, drive_path);
         strcat(filename, "adm.log");

if ((fplog = fopen (filename, "rb")) == NULL)
             return (-1);
         fread ((char *)(&nb), 2, 1, fplog);
         if (feof(fplog))
             return (0);
         fread   ((char *)(&Stdlog), sizeof(Stdlog), 1, fplog);
         Decrypt ((char *)(&Stdlog), sizeof(Stdlog));
         stdtime = Stdlog.stdtime;              /* save start
time */
         nextret = 1;
     } if (nextret == 1)                  /* return cand record */
         { cand_process ();
         *p = candinfo;
         return (1);
         } else if (nextret == 2)             /* return test record */
         { test_process (drive_path);
         *p = testinfo;
         return (2);
         } else if (nextret == 3)             /* return item record */
         { item_process ();
         *p = iteminfo;
         return (3);
         }
}

/* Process candidate log, return candidate record */ cand_process ()
{
     int done, nb, i;

strcpy (candinfo, Stdlog.stdid);           /* save cand info
*/ testtime = 0;                              /* init test info
*/
     score = -2.0;                              /* -2 till found,
-1 if
                                                   timed out, else
score */
     nitm = 0;

done = 0;
     while (!done)            /* process log till eof or new cand
*/
         { fread ((char *)(&nb), 2, 1, fplog);
         if (feof(fplog)) done = 1;
         else if (nb == 0)                      /* cand log */
             { fread    ((char *)(&Stdlog), sizeof(Stdlog), 1,
fplog);
```

```
                Decrypt ((char *)(&Stdlog), sizeof(Stdlog));
                if (stricmp (Stdlog.stdid, candinfo)) done = 1;
            }
        else if (nb == 1)                      /* test log */
            { fread    ((char *)(&Testlog), sizeof(Testlog), 1,
fplog);

Decrypt ((char *)(&Testlog), sizeof(Testlog));
                if (Testlog.testnbr == candinfo[9])
                    { testtime += Testlog.testtime;     /* accum
time */
                      if (Testlog.score > score)         /* save
score */
                          score = Testlog.score;
                    }
            }
        else                                    /* item log */
            { fread    ((char *)(&Itemlog), nb, 1, fplog);
              Decrypt ((char *)(&Itemlog), nb);
              if (Testlog.testnbr == candinfo[9])
                  { i = 0;
                    while ((i < nitm) &&           /* search tbl
*/
                           (Itemlog.itemno != itmno[i])) i++;
                    if (i == nitm)                 /* add to tbl
*/
                        { nitm += 1;
                          itmno[i] = Itemlog.itemno;
                          resptime[i] = resp[i] = iscore[i] = 0;
                        }                          /* store in tbl
*/
                    resptime[i] += Itemlog.resptime;
                    if (Itemlog.resp[0])
                        { resp[i]   = Itemlog.resp[0];
                          iscore[i] = Itemlog.resp[1];
                        }
                  }
            }
    } nextitem = 0;              /* init next tbl pos to return */
    nextret = 2;               /* set next entry to process test
*/
    return;
}

/* Process and return test data */ test_process (drive_path)
        char    *drive_path;
{
    FILE *fp;
    int i, j, k, ntladm, nr, decision, interrupt, ss;
    unsigned int nb;
    double x, lastx;
    char *p, *pp, *pend;
    char s[60], filename[60];

if (division != candinfo[9])    /* read sst if not already
in */
        { strcpy(filename, drive_path);

strcpy (s, "divx.sst");
          s[3] = division = candinfo[9];
```

```
                strcat(filename, s);

if ((fp = fopen (filename, "rb")) == NULL)
                    { nextret = -1;
                       return;
                    }
                fseek(fp, 0L, SEEK_END);            /* get file size
*/
                nb = ftell(fp);
                rewind(fp);
                p = pp = tblbuff;
                pend = p + nb - 1;
                fread (p, nb, 1, fp);               /* read to memory
*/
                fclose (fp);
                Decrypt (p, nb);
                while (*pp != '\r')
                    pp++;
                *pp = 0;

sscanf (p, "%d", &nitmtlet);    /* get #
items/testlet */ if (nitmtlet == 0) nitmtlet = 1;
                p = pp = pp + 2;

i = 0;
                lastx = -1.0;

while (p < pend)                  /* get data */
                    { while (*pp != '\r')           /* scan to CR
*/
                            pp++;
                        *pp = 0;
                        sscanf (p, "%d %lf", &k, &x);
                        while (i < k)
                            divsst[i++] = lastx;
                        divsst[k] = lastx = x;
                        p = pp = pp + 2;
                    } strcpy (filename, drive_path);

strcpy (s, "divx.tbl");             /* read decision
tbl */
                s[3] = division;

strcat (filename, s);

if ((fp = fopen (filename, "rb")) == NULL)
                    { nextret = -1;
                       return;
                    } fseek(fp, 0L, SEEK_END);           /* get file size
*/
                  nb = ftell(fp);
                  rewind(fp);
                  p = pp = tblbuff;
                  pend = p + nb - 1;
                  fread (p, nb, 1, fp);             /* read to
```

```
memory */
                fclose (fp);
                Decrypt (p, nb);
                i = 0;
                while (p < pend)                /* get data */
                    { while (*pp != '\r')       /* scan to
CR */
                            pp++;
                      *pp = 0;                  /* terminate
str */
                      sscanf (p, "%d %d", &fail[i], &pass[i]);
                      p = pp = pp + 2;
                      i++;
                    }
            }
    ntladm = ((nitm - 1)/nitmtlet) + 1;     /* # tlets started
*/
    if (ntladm < 2) j = 2;
    else j = ntladm;

nr = 0;                                 /* compute proportion correct
*/
    for (i=0; i<nitm; i++)
        nr += iscore[i];
    x = (double)nr/(double)(j * nitmtlet);

ss = 0;                                 /* compute scaled score */
    while ((ss < 101) && (x > divsst[ss]))
            ss++;

if (score < 0.0)            /* set interrupt code */
        interrupt = 1;                      /* escape */
    else if (score > 1.0)
        interrupt = 2;
                                            /* timed out */
    else if (ntladm < 2)
        interrupt = 3;                      /* ran out of
testlets */
    else interrupt = 0;

if (nr >= pass[j-2])        /* look up decision */
        decision = 1;
    else
        { decision = 0;
          if ((nr > fail[j-2]) && (interrupt == 0))
                interrupt = 3;      /* ran out of testlets */
        }

/* (force ss 73 if failed) */
    if ((decision == 0) && (ss > 74))
        ss = 73;

/* build test record */
    if (nitm == 0) ss = ntladm = 0;

sprintf (testinfo, "%d%d%c5u%03d%02d%0101d",
            decision, interrupt, testtime, ss, ntladm,
stdtime);

stdtime = Stdlog.stdtime;               /* save next start
time */
    if (nitm)
            nextret = 3;        /* set next entry to process item
*/
```

```
        else if (feof(fplog))
                nextret = -1;
        else
                nextret = 1;
        return;
}

/* Process and return next       */ item_process ()
{
        int tlet;

/* compute testlet # */
        tlet = ((itmno[nextitem] - 1)/nitmtlet) + 1;

/* construct item record */
        if (resptime[nextitem] > 999)
            resptime[nextitem] = 999;

sprintf (iteminfo, "%c%03d00000%03d%02d%03d%d",
                division, tlet, itmno[nextitem], resp[nextitem],
                resptime[nextitem], iscore[nextitem]);

++nextitem;             /* pos to next */ if (nextitem >= nitm)   /* done */
            { if (feof(fplog))
                    { fclose (fplog);
                      nextret = -1;
                    }
              else nextret = 1;
            }
        return;
}
```

We claim:

1. A method of computerized mastery testing for deciding whether an examinee has attained a specified mastery of a given subject by using a computer system means, said method comprising:
   a. determining test specifications;
   b. creating a pool of test items which meet the test specifications;
   c. determining the dimensionally of the pool of test items;
   d. obtaining item response theory (IRT) statistics and assessing IRT model fit for each test item;
   e. determining mastery ability values;
   f. assembling the test items into testlets;
   g. verifying all of the testlets meet testing criteria;
   h. selecting loss functions and prior probability of mastery;
   i. estimating computerized mastery testing (CMT) cutscores which minimize expected posterior loss;
   j. estimating expected error rates and average test length;
   k. authoring and packaging the test for administration; and
   l. administering presentation and scoring of the testlets in a sequential manner to the examinee.

2. A method according to claim 1 wherein the pool of test items is unidimensional and said IRT statistics are estimated for each said item by using a marginal maximum likelihood estimation procedure.

3. A method according to claim 2 wherein the marginal maximum likelihood estimation procedure is implemented by using the BILOG calibration program.

4. A method according to claim 1 wherein the pool of test items is unidimensional and said IRT statistics are estimated for each said item by using a joint maximum likelihood logistic estimation procedure.

5. A method according to claim 4 wherein the joint maximum likelihood logistic estimation procedure is implemented by using the LOGIST calibration program.

6. A method according to claim 1 wherein the pool of test items is multidimensional and said IRT statistics are estimated for each test item by using a multidimensional IRT model estimation procedure.

7. A method according to claim 6 wherein the multidimensional IRT model estimation procedure is implemented by using the TESTFACT program software.

8. A method according to claim 1 wherein the number of on-line calculations performed during the step of administrating presentation and scoring of the testlets is reduced by determining the probability metric cutscore values prior to the step of administrating presentation and scoring of the testlets.

9. A method according to claim 8 wherein the number of on-line calculations performed during the step of administrating presentation and scoring of the testlets is reduced by using the CMT cutscore estimation program.

10. A method according to claim 1 wherein the number of on-line calculations performed during the step of administrating presentation and scoring of the testlets is reduced by determining cumulative number of right cutscore values prior to the step of administrating presentation and scoring of the testlets.

11. A method according to claim 10 wherein the number of on-line calculations performed during the step of administrating presentation and scoring of the testlets is reduced by using the CMT cutscore estimation program.

12. A method according to claim 1 wherein the testlets are substantially parallel.

13. A method according to claim 1 wherein the testlets are nonparallel.

14. A method according to claim 1 wherein the testlets are administered to the examinee in a random manner for all testlets not as yet administered to the examinee so that a testlets is not administered more than once to the same examinee.

15. A method according to claim 1 wherein the CMT cutscore is determined for a fixed-length test.

16. A method according to claim 15 wherein the CMT cutscore is determined by using the CMT cutscore estimation program.

17. A method according to claim 1 wherein the CMT cutscores are determined for a variable-length test.

18. A method according to claim 17 wherein the CMT cutscores are determined by using the CMT cutscore examination program.

19. A method according to claim 1 wherein the test items are assembled into testlets by using the CMT testlet assembly procedure.

20. A method according to claim 1 wherein the step of presentation and scoring is determined by using the CMT-administration system program.

21. A method according to claim 1 wherein the step of determining mastery ability values comprises:
   a. performing an Angoff-design cutscore study comprising:
      (1) estimating a percentage of borderline examinee expected to give a correct response for each test item in the pool of the test items; and
      (2) determining a proportion correct cutscore for a pool of selected test items;
   b. translating the proportion correct cutscore into an ability value ($\Theta_c$) on the IRT scale by using a test characteristic curve of the selected test items; and
   c. determining the lowest ability value at which an examinee will be considered a master ($\Theta_m$) and the highest ability value at which an examinee will be considered a nonmaster ($\Theta_n$) for the pool of test items in a method comprising:
      (1) estimating the standard error of measurement at $\Theta_c$; and
      (2) selecting $\Theta_m$ and $\Theta_n$ to lie outside a certain error interval centered about $\Theta_c$.

22. A method according to claim 21 wherein the test characteristic curve is determined by using the CMT cutscore validation program.

23. A method according to claim 1 wherein the step of determining mastery ability values comprises:
   a. performing an Ebel-design cutscore study for determining a proportion correct cutscore;
   b. translating the proportion correct cutscore into an ability value ($\Theta_c$) on the IRT scale by using a test characteristic curve of the selected test items; and
   c. determining the lowest ability value at which an examinee will be considered a master ($\Theta_m$) and the highest ability value at which an examinee will be considered a nonmaster ($\Theta_n$) for the pool of test items in a method comprising:
      (1) estimating the standard error of measurement at $\Theta_c$; and
      (2) selecting $\Theta_m$ and $\Theta_n$ to lie outside a certain error interval centered about $\Theta_c$.

24. A computerized mastery testing system having a computer system means for testing whether an examinee has attained specified mastery of a given subject comprising:
   a. means for inputing test specifications and test items into a computer database;
   b. means for applying item response theory (IRT) so as to obtain IRT statistics for the test items and determine mastery ability values;
   c. means for assembling the test items into testlets;
   d. means for verifying the testlets meet testing criteria;
   e. means for selecting loss functions and the prior probability of mastery;
   f. means for applying Bayesian decision theory so as to estimate computerized mastery testing (CMT) cutscores which minimize the expected posterior loss and determine the associated operating characteristics;
   g. means for authoring and packaging the test for administration; and
   h. means for administering presentation and scoring of an examinee response dependent variable number of the testlets in a random, sequential manner to the examinee.

25. A method of computerized mastery testing for deciding whether an individual examinee has attained a specified mastery of a given subject by using a computer system means, said method comprising: determining test specifications; creating a pool of test items which meet the test specifications; determining the dimensionality of the pool of test items; obtaining item response theory (IRT) statistics and assessing IRT model fit for each test item, wherein the pool of test items is unidimensional and said IRT statistics are estimated for each test item by using a joint maximum likelihood logistic estimation procedure implemented by executing LOGIST calibration program; determining mastery ability values; assembling the test items into testlets by using the computerized mastery testing (CMT) testlet assembly procedure; verifying all of the testlets meet testing criteria; selecting loss functions and prior probability of mastery; estimating CMT cutscores which minimize expected posterior loss, wherein the CMT cutscores are determined for a variable-length test by executing the CMT cutscore estimation program; estimating expected error rates and average test length; authoring and packaging the test for administration; and administering presentation and scoring of the testlets in a sequential manner and wherein the testlets are chosen in a random manner for all testlets not as yet administered to the examinee by executing the CMT testlets presentation and scoring procedure.

* * * * *